United States Patent
Shin et al.

(10) Patent No.: US 11,943,814 B2
(45) Date of Patent: *Mar. 26, 2024

(54) METHOD FOR TRANSMITTING AND RECEIVING NPRACH PREAMBLE IN WIRELESS COMMUNICATION SYSTEM SUPPORTING TDD AND APPARATUS THEREFOR

(71) Applicant: LG ELECTRONICS INC., Seoul (KR)

(72) Inventors: Seokmin Shin, Seoul (KR); Changhwan Park, Seoul (KR); Jaehyung Kim, Seoul (KR); Joonkui Ahn, Seoul (KR); Suckchel Yang, Seoul (KR); Seunggye Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/846,171

(22) Filed: Jun. 22, 2022

(65) Prior Publication Data

US 2022/0346153 A1 Oct. 27, 2022

Related U.S. Application Data

(63) Continuation of application No. 17/124,150, filed on Dec. 16, 2020, now Pat. No. 11,425,761, which is a (Continued)

(30) Foreign Application Priority Data

Mar. 20, 2018 (KR) .................. 10-2018-0031843
Apr. 2, 2018 (KR) .................. 10-2018-0037996
(Continued)

(51) Int. Cl.
    *H04W 74/08* (2009.01)
    *H04W 16/14* (2009.01)
    *H04W 74/00* (2009.01)

(52) U.S. Cl.
    CPC ....... *H04W 74/0833* (2013.01); *H04W 16/14* (2013.01); *H04W 74/008* (2013.01)

(58) Field of Classification Search
    CPC ............ H04W 74/0833; H04W 16/14; H04W 74/008; H04W 74/08; H04W 74/0891;
    (Continued)

(56) References Cited

U.S. PATENT DOCUMENTS 9,661,663 B1 * 5/2017 Lin ................ H04W 74/0833
10,284,255 B1 5/2019 Hwang et al.
(Continued)

FOREIGN PATENT DOCUMENTS

CN     103597765     2/2014
CN     105009479     10/2015
(Continued)

OTHER PUBLICATIONS

CN Office Action in Chinese Appln. No. 201980000880.3, dated Jul. 2, 2021, 13 pages (with English translation).
(Continued)

*Primary Examiner* — Ivan O Latorre
(74) *Attorney, Agent, or Firm* — Fish & Richardson P.C.

(57) ABSTRACT

This specification provides a method for transmitting an NPRACH preamble in a wireless communication system supporting TDD. More specifically, the method performed by the UE includes: receiving, from a base station, NPRACH configuration information including control information for a repetition number of NPRACH preambles including symbol groups through a higher layer signaling; and transmitting, to the base station, the NPRACH preamble
(Continued)

repeatedly through frequency hopping of a symbol group based on the NPRACH configuration information, in which a frequency location of the symbol group is determined based on a first parameter related to a start subcarrier and a second parameter related to the frequency hopping.

9 Claims, 37 Drawing Sheets

Related U.S. Application Data continuation of application No. 16/782,284, filed on Feb. 5, 2020, now Pat. No. 10,880,929, which is a continuation of application No. 16/541,879, filed on Aug. 15, 2019, now Pat. No. 10,813,141, which is a continuation of application No. PCT/KR2019/001103, filed on Jan. 25, 2019.

(60) Provisional application No. 62/669,976, filed on May 10, 2018, provisional application No. 62/668,771, filed on May 8, 2018, provisional application No. 62/653,525, filed on Apr. 5, 2018, provisional application No. 62/637,324, filed on Mar. 1, 2018, provisional application No. 62/622,097, filed on Jan. 25, 2018.

(30) Foreign Application Priority Data

| Apr. 12, 2018 | (KR) | 10-2018-0042870 |
|---|---|---|
| Apr. 26, 2018 | (KR) | 10-2018-0048702 |
| Jun. 12, 2018 | (KR) | 10-2018-0067134 |
| Jun. 14, 2018 | (KR) | 10-2018-0067837 |

(58) Field of Classification Search
CPC ..... H04W 72/23; Y02D 30/70; H04L 5/0092; H04L 5/0007; H04L 5/0012; H04L 5/0053; H04L 5/1469; H04L 27/2692; H04L 5/001; H04L 5/0078; H04L 2027/0095; H04J 1/08
See application file for complete search history.

(56) References Cited

U.S. PATENT DOCUMENTS

| 2015/0189675 | A1 | 7/2015 | Feuersaenger et al. | |
|---|---|---|---|---|
| 2015/0365977 | A1 | 12/2015 | Tabet et al. | |
| 2017/0202028 | A1 | 7/2017 | Gaal et al. | |
| 2017/0223743 | A1 | 8/2017 | Lin et al. | |
| 2017/0265230 | A1 | 9/2017 | Liu et al. | |
| 2017/0367121 | A1 | 12/2017 | Wei et al. | |
| 2018/0248673 | A1 | 8/2018 | Bhattad et al. | |
| 2018/0279363 | A1* | 9/2018 | Su | H04J 11/005 |
| 2018/0310341 | A1* | 10/2018 | Yerramalli | H04L 5/0012 |
| 2019/0075594 | A1* | 3/2019 | Lin | H04L 5/0048 |
| 2019/0149365 | A1 | 5/2019 | Chatterjee et al. | |
| 2019/0150199 | A1* | 5/2019 | Cho | H04L 5/0012 370/329 |
| 2019/0274168 | A1 | 9/2019 | Hwang et al. | |
| 2019/0373646 | A1* | 12/2019 | Shin | H04L 5/0007 |
| 2020/0100271 | A1* | 3/2020 | Fang | H04W 4/80 |
| 2020/0236524 | A1* | 7/2020 | Ye | H04W 24/08 |
| 2020/0236635 | A1* | 7/2020 | Yan | H04L 5/0053 |

FOREIGN PATENT DOCUMENTS

| CN | 106559905 | 4/2017 | |
|---|---|---|---|
| CN | 107211466 | 9/2017 | |
| CN | 107432042 | 12/2017 | |
| CN | 107529210 | 12/2017 | |
| JP | 2017-092508 | 5/2017 | |
| KR | 1020150113072 | 10/2015 | |
| WO | WO2016208897 | 12/2016 | |
| WO | WO2017160221 | 9/2017 | |
| WO | WO2017212443 | 12/2017 | |
| WO | WO-2018130017 A1 * | 7/2018 | H04L 27/26 |
| WO | WO-2019028991 A1 * | 2/2019 | H04J 11/005 |
| WO | WO2017131577 | 8/2019 | |

OTHER PUBLICATIONS

Ericsson, "Improved FH randomization for NB-IoT Rel-14," R1-1717027, Presented at 3GPP TSG-RAN WG1#90bis, Prague, Czech Republic, Oct. 9-13, 2017, 5 pages.
Ericsson, UL aspects of TDD for NB-Iot, R1-1719362, 3GPP TSG-RAN WG1 Meeting #91, Reno Nevada, USA Nov. 27-Dec. 1, 2017, 14 pages.
Extended European Search Report in European Patent Appln. No. 19743235.4, dated Oct. 30, 2020, 11 pages.
Huawei, HiSilicon, On uplink TDD NB-Iot, R1-1719478, 3GPP TSG RAN WG1 Meeting #91, Reno, USA, Nov. 27-Dec. 1, 2017, 7 pages.
Indian Office Action in Indian Appln. No. 201927054337, dated Mar. 17, 2021, 7 pages.
Jialin et al., "LTE network physical uplink random access channel preamble planning method," Guangxi Communication Technology, 2016, 8 pages (with English machine translation).
JP Office Action in Japanese Appln. No. 2020-512396, dated May 25, 2021, 4 pages (with English translation).
Korean Notice of Allowance in Korean Appln. No. 10-2020-7019096, dated Feb. 22, 2021, 6 pages (with English translation).
LG Electronics, "Discussion on UL aspects in TDD NB-IoT," R1-1806596, 3GPP TSG RAN WG 1 Meeting #93, Busan, Korea, May 21-25, 2018, 12 pages.
LG Electronics, Discussion on UL aspects in TDD NB-IoT, R1-1719884, 3GPP TSG RAN WG1 Meeting #91, Reno, USA, Nov. 27-Dec. 1, 2017, 15 pages.
Luo et al., "A New PRACH Transmission Scheme in Unlicensed Spectrum," Presented at 2017 IEEE 85th Vehicular Technology Conference (VTC Spring), 6 pages.
PCT International Search Report in International Appln. No. PCT /KR2019/001103, dated May 29, 2019, 6 pages (with English translation).
ZTE, Sanechips, "Summary of remaining UL aspects for TDD NB-IoT," R1-1803145, 3GPP TSG RAN WG1 Meeting #92, Athens, Greece, Feb. 26- Mar. 2, 2018, 8 pages.
ZTE, Sanechips, Improved frequency hopping randomization for NPRACH, R1-1717193, 3 GPP TSG RAN WG 1 Meeting #90, Prague, Czech Republic, Oct. 9-13, 2017, 8 pages.
LG Electronics, Qualcomm, "WF on NPRACH preamble format for single UL subframe," 3GPP TSG RAN WG1 Meeting 91, R1-1721179, Reno, USA, Nov. 27-Dec. 1, 2017, 5 pages.
Office Action in Korean Appln. No. 10-2022-7024811, dated Aug. 16, 2023, 6 pages (with English translation).
Ericsson, "UL aspects of TDD for NB-IoT," R1-1804165, 3GPP TSG-RAN WG1 Meeting #92bis, Sanya, China, dated Feb. 16-Apr. 20, 2018, 21 pages.
Office Action in Japanese Appln. No. 2022-160703, dated Dec. 5, 2023, 8 pages (with English translation).

* cited by examiner

METHOD FOR TRANSMITTING AND RECEIVING NPRACH PREAMBLE IN WIRELESS COMMUNICATION SYSTEM SUPPORTING TDD AND APPARATUS THEREFOR

CROSS-REFERENCE TO RELATED APPLICATIONS

This application is a continuation of U.S. application Ser. No. 17/124,150, filed on Dec. 16, 2020, which is a continuation of U.S. application Ser. No. 16/782,284, filed on Feb. 5, 2020 which is a continuation of U.S. application Ser. No. 16/541,879, filed on Aug. 15, 2019, which is a continuation of International Application No. PCT/KR2019/001103, filed on Jan. 25, 2019, which claims the benefit of U.S. Provisional Application No. 62/622,097, filed on Jan. 25, 2018, U.S. Provisional Application No. 62/637,324, filed on Mar. 1, 2018, Korean Application No. 10-2018-0031843, filed on Mar. 20, 2018, Korean Application No. 10-2018-0037996, filed on Apr. 2, 2018, U.S. Provisional Application No. 62/653,525, filed on Apr. 5, 2018, Korean Application No. 10-2018-0042870, filed on Apr. 12, 2018, Korean Application No. 10-2018-0048702, filed on Apr. 26, 2018, U.S. Provisional Application No. 62/668,771, filed on May 8, 2018, U.S. Provisional Application No. 62/669,976, filed on May 10, 2018, Korean Application No. 10-2018-0067134, filed on Jun. 12, 2018, and Korean Application No. 10-2018-0067837, filed on Jun. 14, 2018, the contents of which are all hereby incorporated by reference herein in their entirety.

TECHNICAL FIELD

The present invention relates to a method for sending or receiving, by a UE, data in a wireless communication system and, more particularly, to a method and apparatus for sending or receiving data using an unlicensed spectrum.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of this specification is to newly define a rule between a frequency location (or subcarrier index) of a symbol group of an odd-numbered NPRACH preamble and a frequency location (or subcarrier index) of a symbol group of an even-numbered NPRACH preamble when repeatedly transmitting an NPRACH preamble in a TDD system.

Furthermore, an object of this specification is to provide a solving method for a case where a valid UL subframe is not present, which is capable of transmitting consecutive symbol groups of the NPRACH preamble in the TDD system.

The technical objects of the present invention are not limited to the aforementioned technical objects, and other technical objects, which are not mentioned above, will be apparently appreciated by a person having ordinary skill in the art from the following description.

Technical Solution

In this specification, a method for transmitting, by a user equipment (UE), a narrowband physical random access channel (NPRACH) preamble in a wireless communication system supporting time division duplexing (TDD) includes: receiving, from a base station, NPRACH configuration information including control information for a repetition number of NPRACH preambles including symbol groups through a higher layer signaling; and transmitting, to the base station, the NPRACH preamble repeatedly through frequency hopping of a symbol group based on the NPRACH configuration information, in which a frequency location of the symbol group is determined based on a first parameter related to a start subcarrier and a second parameter related to the frequency hopping, the second parameter for a first symbol group of a first NPRACH preamble is determined by a medium access control (MAC) layer, and the second parameter for the symbol group of a second NPRACH preamble is defined by the second parameter for the symbol group of the first NPRACH preamble and a third parameter generated based on a symbol group index of the second NPRACH preamble.

Furthermore, in this specification, the second parameter is a subcarrier index corresponding to any one of 0 to 11.

Furthermore, in this specification, the NPRACH preamble includes two symbol groups and four symbol groups which are consecutive.

Furthermore, in this specification, a preamble format of the NPRACH preamble is 0, 1, or 2.

Furthermore, in this specification, the second parameter for the first symbol group of the second NPRACH preamble is determined based on a first value and a second value, the first value is a value of the second parameter for the first symbol group of the first NPRACH preamble, and the second value is a value generated based on a pseudo random sequence and an index of the first symbol group of the second NPRACH preamble.

Furthermore, in this specification, when the first value is an even number, the value of the second parameter for the first symbol group of the second NPRACH preamble is defined as an odd number based on the first value and the second value.

Furthermore, in this specification, when the first value is 0, 2, 4, 6, 8, or 10 and the second value is 0, 2, 4, 6, 8, or 10, the second parameter for the first symbol group of the second NPRACH preamble is a value obtained by adding 1 to the second value.

Furthermore, in this specification, when the first value is 0, 2, 4, 6, 8, or 10 and the second value is 1, 3, 5, 7, 9, or 11, the second parameter for the first symbol group of the second NPRACH preamble is the second value.

Furthermore, in this specification, when the first value is the odd number, the value of the second parameter for the first symbol group of the second NPRACH preamble is defined as the even number based on the first value and the second value.

Furthermore, in this specification, when the first value is 1, 3, 5, 7, 9, or 11 and the second value is 0, 2, 4, 6, 8, or 10, the second parameter for the first symbol group of the second NPRACH preamble is the second value.

Furthermore, in this specification, when the first value is 1, 3, 5, 7, 9, or 11 and the second value is 1, 3, 5, 7, 9, or 11, the second parameter for the first symbol group of the second NPRACH preamble is a value obtained by subtracting 1 from the second value.

Furthermore, in this specification, the second parameter for a third symbol group of the second NPRACH preamble is determined based on a third value and a fourth value, the third value is a value of the second parameter for the third symbol group of the first NPRACH preamble, and the fourth value is a value generated based on the pseudo random sequence and the index of the third symbol group of the second NPRACH preamble.

Furthermore, in this specification, when the third value is 0, 1, 2, 3, 4, or 5 and the fourth value is 0, 1, 2, 3, 4, or 5, the second parameter for the third symbol group of the second NPRACH preamble is a value obtained by adding 6 to the fourth value.

Furthermore, in this specification, when the third value is 0, 1, 2, 3, 4, or 5 and the fourth value is 6, 7, 8, 9, 10, or 11, the second parameter for the third symbol group of the second NPRACH preamble is the fourth value.

Furthermore, in this specification, when the third value is 6, 7, 8, 9, 10, or 11 and the fourth value is 0, 1, 2, 3, 4, or 5, the second parameter for the third symbol group of the second NPRACH preamble is the fourth value.

Furthermore, in this specification, when the third value is v, or 11 and the fourth value is 6, 7, 8, 9, 10, or 11, the second parameter for the third symbol group of the second NPRACH preamble is a value obtained by subtracting 6 from the fourth value.

Furthermore, in this specification, the third parameter is defined by $(\tilde{n}_{sc}^{RA}(0)+f(i/2)) \mod N_{sc}^{RA}$, and the is the second parameter for the first symbol group of the first NPRACH preamble.

Further, in this specification, a method for transmitting, by a user equipment (UE), a narrowband physical random access channel (NPRACH) preamble in a wireless communication system supporting time division duplexing (TDD), includes: receiving, from a base station, NPRACH configuration information including first information for a repetition number of NPRACH preambles including symbol groups through a higher layer signaling; and transmitting, to the base station, the NPRACH preamble repeatedly through frequency hopping between the symbol groups based on the NPRACH configuration information, in which a frequency location of the symbol group is determined based on a first parameter related to a start subcarrier and a second parameter related to the frequency hopping, the NPRACH preamble includes first consecutive three symbol groups and second consecutive three symbol groups, and each of a first symbol group among the first consecutive three symbol groups and the first symbol group among the second consecutive three symbol groups is defined by parameters generated by a medium access control (MAC) layer, a pseudo random sequence, and a symbol group index.

Further, in this specification, the method further includes: receiving, from the base station, configuration information related to an uplink-downlink configuration; and dropping the consecutive symbol groups when there is no valid uplink subframe to transmit the consecutive symbol groups based on the configuration information.

Advantageous Effects

In this specification, a relationship between a frequency location of an odd-numbered NPRACH preamble and a frequency location of an even-numbered NPRACH preamble is newly defined when repeatedly transmitting an NPRACH preamble in a TDD system, thereby enhancing reception performance for an NPRACH preamble at a receiver.

Furthermore, in this specification, when a valid UL subframe to which consecutive symbol groups included in the NPRACH preamble are to be transmitted is not present, the consecutive symbol groups are dropped, thereby reducing a collision with another signal.

Advantages which can be obtained in the present invention are not limited to the aforementioned effects and other unmentioned advantages will be clearly understood by those skilled in the art from the following description.

DESCRIPTION OF DRAWINGS

The accompanying drawings, which are included herein as a part of the description for help understanding the present invention, provide embodiments of the present invention, and describe the technical features of the present invention with the description below.

MODE FOR INVENTION

Figure 1A:
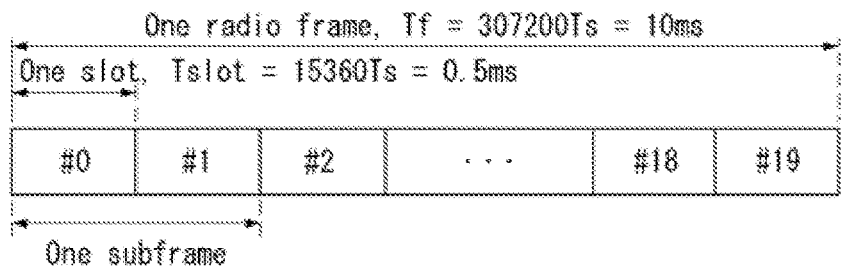
FIGS. 1A and 1B illustrate the structure of a radio frame in a wireless communication system to which the present invention may be applied.

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which the Present Invention May be Applied

Figure 1B:
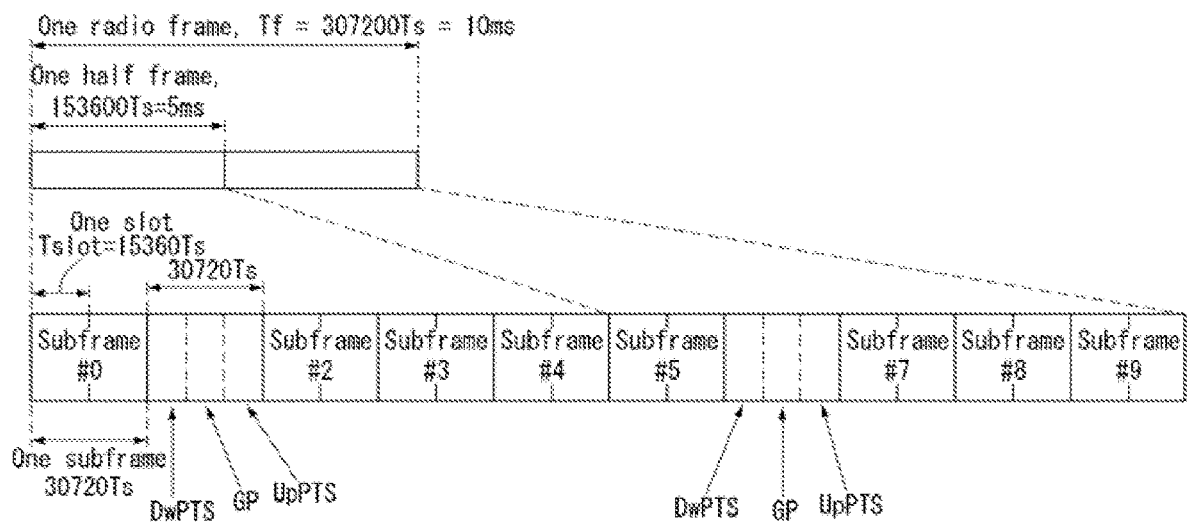

FIGS. 1A and 1B show the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T_s=1/(15000*2048)$. A UL and DL transmission includes the radio frame having a duration of $T_f=307200*T_s=10$ ms.

FIG. 1A exemplifies a radio frame structure type 1. The type 1 radio frame may be applied to both of full duplex FDD and half duplex FDD.

A radio frame includes 10 subframes. A radio frame includes 20 slots of $T_{slot}=15360*T_s=0.5$ ms length, and 0 to 19 indexes are given to each of the slots. One subframe includes contiguous two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1B shows frame structure type 2.

A type 2 radio frame includes two half frame of $153600*T_s=5$ ms length each. Each half frame includes 5 subframes of $30720*T_s=1$ ms length.

In the frame structure type 2 of a TDD system, an uplink-downlink configuration is a rule indicating whether uplink and downlink are allocated (or reserved) to all subframes. Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and an Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of $T_{slot}=15360*T_s=0.5$ ms.

The UL-DL configuration may be classified into 7 types, and the position and/or the number of a DL subframe, a special subframe and a UL subframe are different for each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 represents configuration (length of DwPTS/GP/UpPTS) of a special subframe.

TABLE 2

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of a radio subframe according to the example of FIGS. 1A and 1B is just an example, and the number of subcarriers included in a radio frame, the number of slots included in a subframe and the number of OFDM symbols included in a slot may be changed in various manners.

Figure 2:
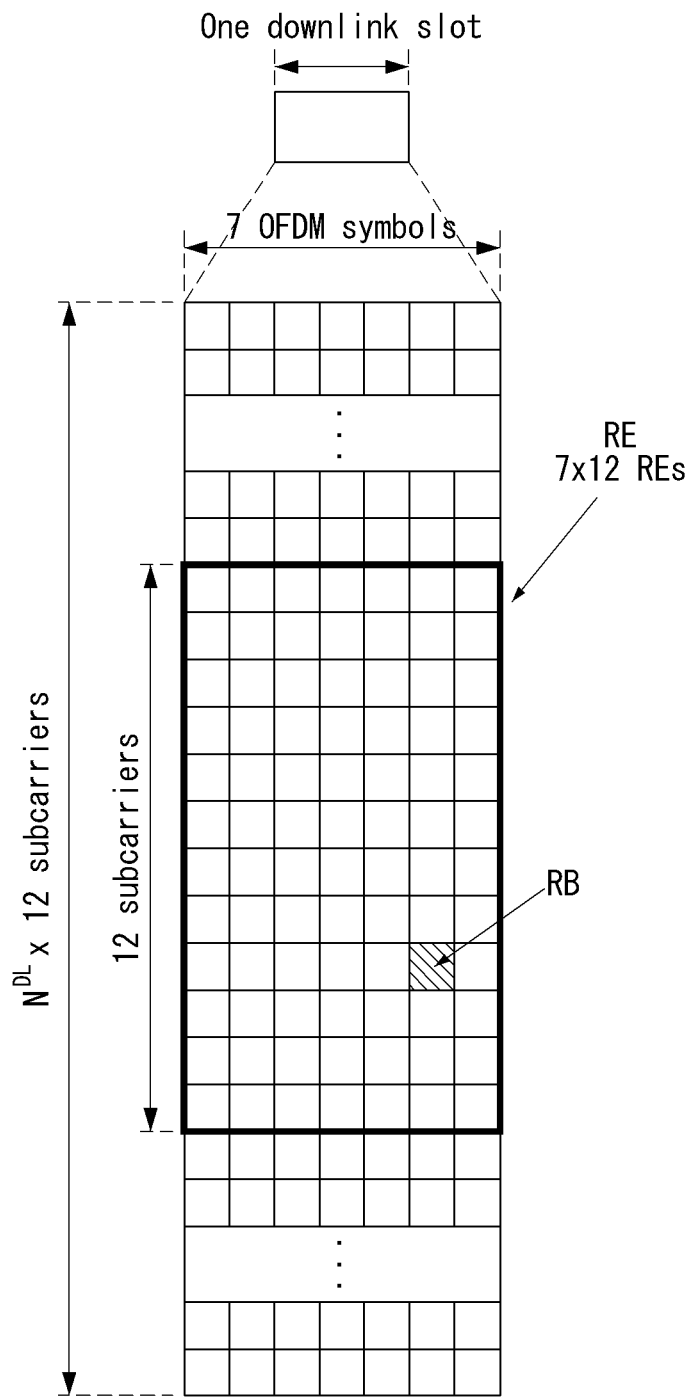
FIG. 2 is a diagram illustrating a resource grid for a downlink slot in a wireless communication system to which the present invention may be applied.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12☐7 resource elements. The number of RBs N^DL included in a downlink slot depends on a downlink transmission bandwidth.

The structure of an uplink slot may be the same as that of a downlink slot.

Figure 3:
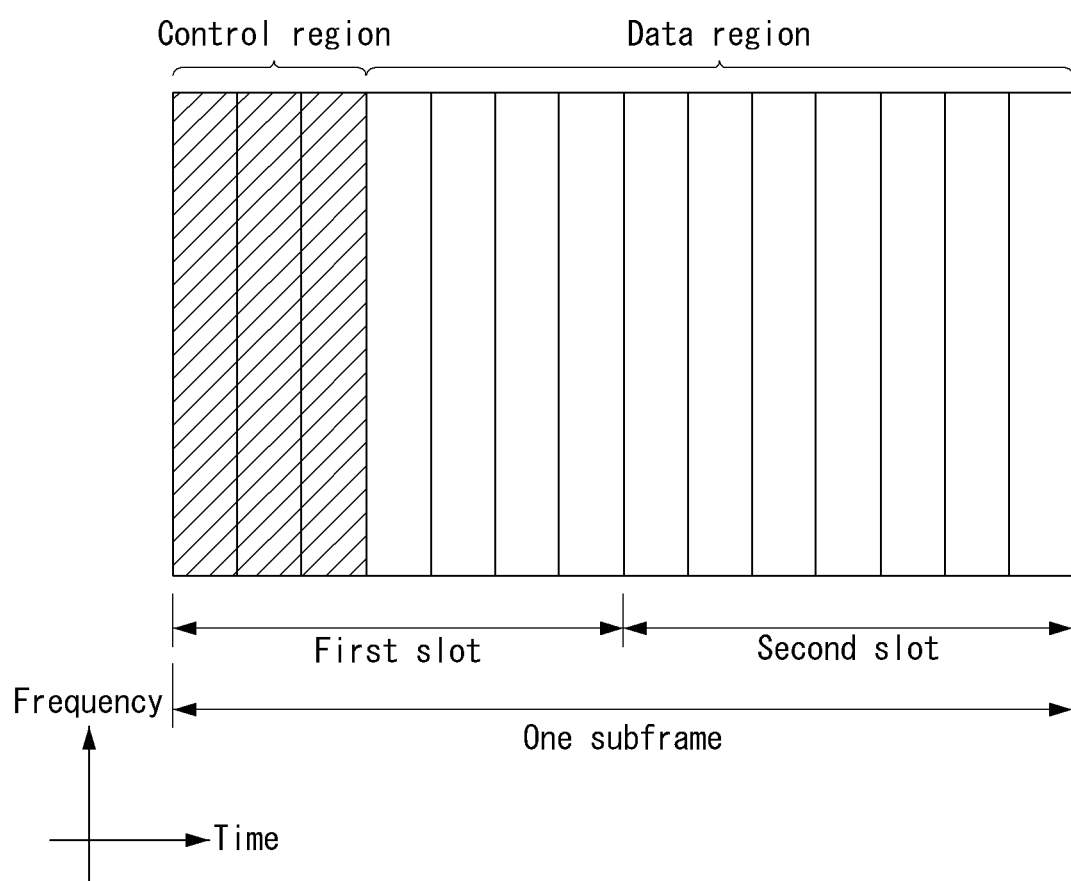
FIG. 3 illustrates a structure of downlink subframe in a wireless communication system to which the present invention may be applied.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource v and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

Figure 4:
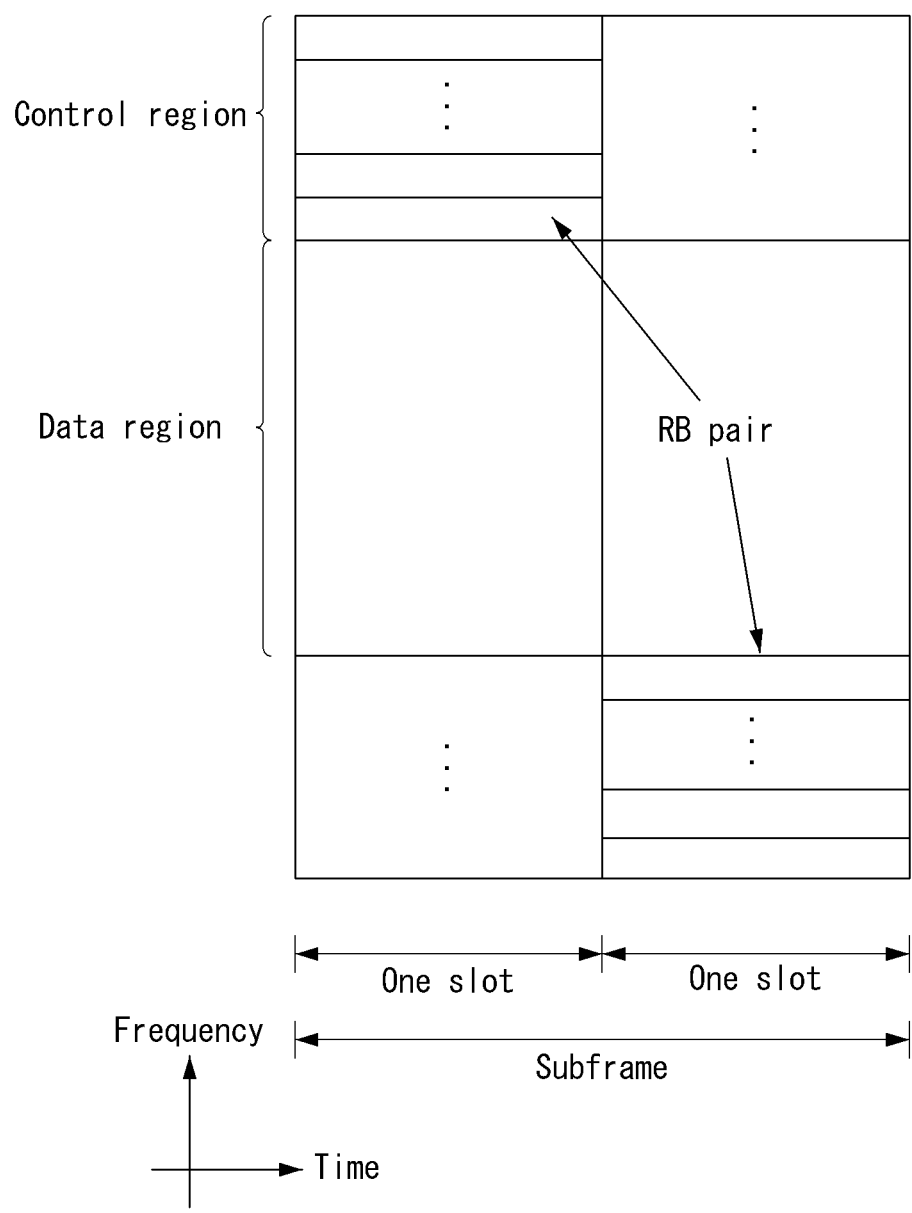
FIG. 4 illustrates a structure of uplink subframe in a wireless communication system to which the present invention may be applied.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

General Carrier Aggregation

A communication environment considered in embodiments of the present invention includes multi-carrier supporting environments. That is, a multi-carrier system or a carrier aggregation system used in the present invention means a system that aggregates and uses one or more component carriers (CCs) having a smaller bandwidth smaller than a target band at the time of configuring a target wideband in order to support a wideband.

In the present invention, multi-carriers mean aggregation of (alternatively, carrier aggregation) of carriers and in this case, the aggregation of the carriers means both aggregation between continuous carriers and aggregation between non-contiguous carriers. Further, the number of component carriers aggregated between the downlink and the uplink may be differently set. A case in which the number of downlink component carriers (hereinafter, referred to as 'DL CC') and the number of uplink component carriers (hereinafter, referred to as 'UL CC') are the same as each other is referred to as symmetric aggregation and a case in which the number of downlink component carriers and the number of uplink component carriers are different from each other is referred to as asymmetric aggregation. The carrier aggregation may be used mixedly with a term such as the carrier aggregation, the bandwidth aggregation, spectrum aggregation, or the like.

The carrier aggregation configured by combining two or more component carriers aims at supporting up to a bandwidth of 100 MHz in the LTE-A system. When one or more carriers having the bandwidth than the target band are combined, the bandwidth of the carriers to be combined may be limited to a bandwidth used in the existing system in order to maintain backward compatibility with the existing IMT system. For example, the existing 3GPP LTE system supports bandwidths of 1.4, 3, 5, 10, 15, and 20 MHz and a 3GPP LTE-advanced system (that is, LTE-A) may be configured to support a bandwidth larger than 20 MHz by using on the bandwidth for compatibility with the existing system. Further, the carrier aggregation system used in the preset invention may be configured to support the carrier aggregation by defining a new bandwidth regardless of the bandwidth used in the existing system.

The LTE-A system uses a concept of the cell in order to manage a radio resource.

The carrier aggregation environment may be called a multi-cell environment. The cell is defined as a combination of a pair of a downlink resource (DL CC) and an uplink resource (UL CC), but the uplink resource is not required. Therefore, the cell may be constituted by only the downlink resource or both the downlink resource and the uplink resource. When a specific terminal has only one configured serving cell, the cell may have one DL CC and one UL CC, but when the specific terminal has two or more configured serving cells, the cell has DL CCs as many as the cells and the number of UL CCs may be equal to or smaller than the number of DL CCs.

Alternatively, contrary to this, the DL CC and the UL CC may be configured. That is, when the specific terminal has multiple configured serving cells, a carrier aggregation environment having UL CCs more than DL CCs may also be supported. That is, the carrier aggregation may be appreciated as aggregation of two or more cells having different carrier frequencies (center frequencies). Herein, the described 'cell' needs to be distinguished from a cell as an area covered by the base station which is generally used.

The cell used in the LTE-A system includes a primary cell (PCell) and a secondary cell (SCell. The P cell and the S cell may be used as the serving cell. In a terminal which is in an RRC_CONNECTED state, but does not have the configured carrier aggregation or does not support the carrier aggregation, only one serving constituted by only the P cell is present. On the contrary, in a terminal which is in the RRC_CONNECTED state and has the configured carrier aggregation, one or more serving cells may be present and the P cell and one or more S cells are included in all serving cells.

The serving cell (P cell and S cell) may be configured through an RRC parameter. PhysCellId as a physical layer identifier of the cell has integer values of 0 to 503. SCellIndex as a short identifier used to identify the S cell has integer values of 1 to 7. ServCellIndex as a short identifier used to identify the serving cell (P cell or S cell) has the integer values of 0 to 7. The value of 0 is applied to the P cell and SCellIndex is previously granted for application to the S cell. That is, a cell having a smallest cell ID (alternatively, cell index) in ServCellIndex becomes the P cell.

The P cell means a cell that operates on a primary frequency (alternatively, primary CC). The terminal may be used to perform an initial connection establishment process or a connection re-establishment process and may be designated as a cell indicated during a handover process. Further, the P cell means a cell which becomes the center of control associated communication among serving cells configured in the carrier aggregation environment. That is, the terminal may be allocated with and transmit the PUCCH only in the P cell thereof and use only the P cell to acquire the system information or change a monitoring procedure. An evolved universal terrestrial radio access (E-UTRAN) may change only the P cell for the handover procedure to the terminal supporting the carrier aggregation environment by using an RRC connection reconfiguration message (RRC-ConnectionReconfigutaion) message of an upper layer including mobile control information (mobilityControlInfo).

The S cell means a cell that operates on a secondary frequency (alternatively, secondary CC). Only one P cell may be allocated to a specific terminal and one or more S cells may be allocated to the specific terminal. The S cell may be configured after RRC connection establishment is achieved and used for providing an additional radio resource. The PUCCH is not present in residual cells other than the P cell, that is, the S cells among the serving cells configured in the carrier aggregation environment. The E-UTRAN may provide all system information associated with a related cell which is in an RRC_CONNECTED state through a dedicated signal at the time of adding the S cells to the terminal that supports the carrier aggregation environment. A change of the system information may be controlled by releasing and adding the related S cell and in this case, the RRC connection reconfiguration (RRCConnectionReconfigutaion) message of the upper layer may be used. The E-UTRAN may perform having different parameters for each terminal rather than broadcasting in the related S cell.

After an initial security activation process starts, the E-UTRAN adds the S cells to the P cell initially configured during the connection establishment process to configure a network including one or more S cells. In the carrier aggregation environment, the P cell and the S cell may operate as the respective component carriers. In an embodiment described below, the primary component carrier (PCC)

may be used as the same meaning as the P cell and the secondary component carrier (SCC) may be used as the same meaning as the S cell.

Figure 5A:
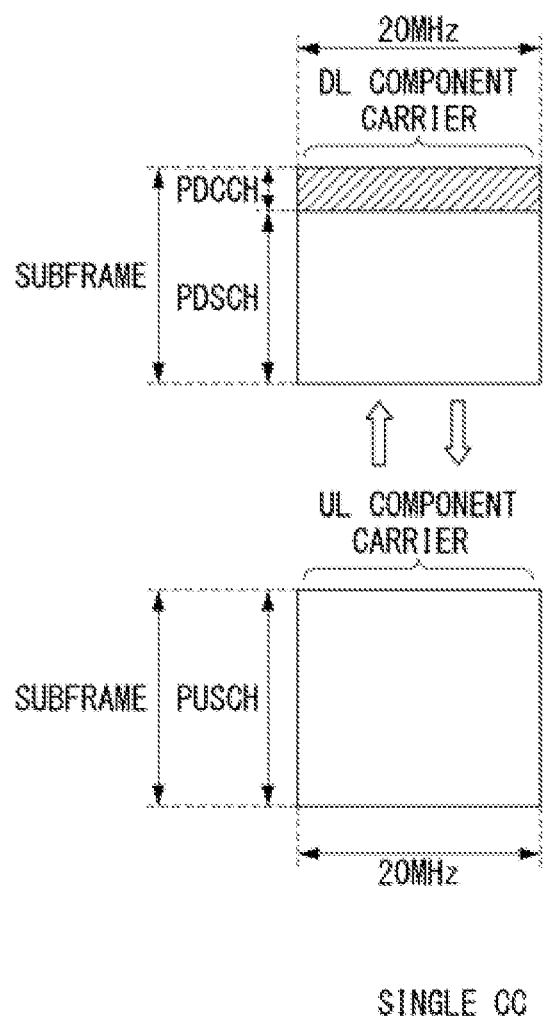
FIGS. 5A and 5B illustrate examples of component carriers and carrier aggregation in a wireless communication system to which the present invention may be applied.
Figure 5B:
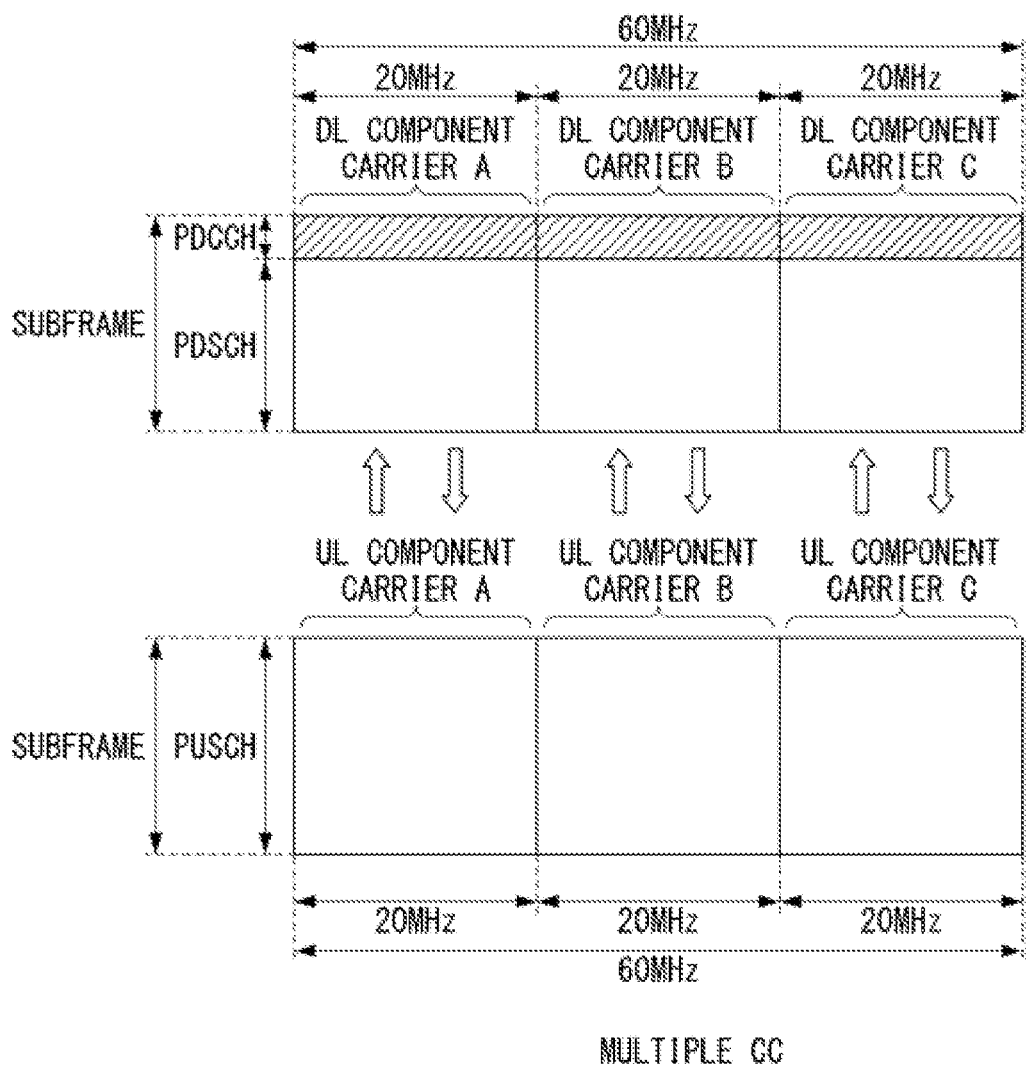

FIGS. 5A and 5B illustrate examples of a component carrier and carrier aggregation in the wireless communication system to which the present invention can be applied.

FIG. 5A illustrates a single carrier structure used in an LTE system. The component carrier includes the DL CC and the UL CC. One component carrier may have a frequency range of 20 MHz.

Figure 9:
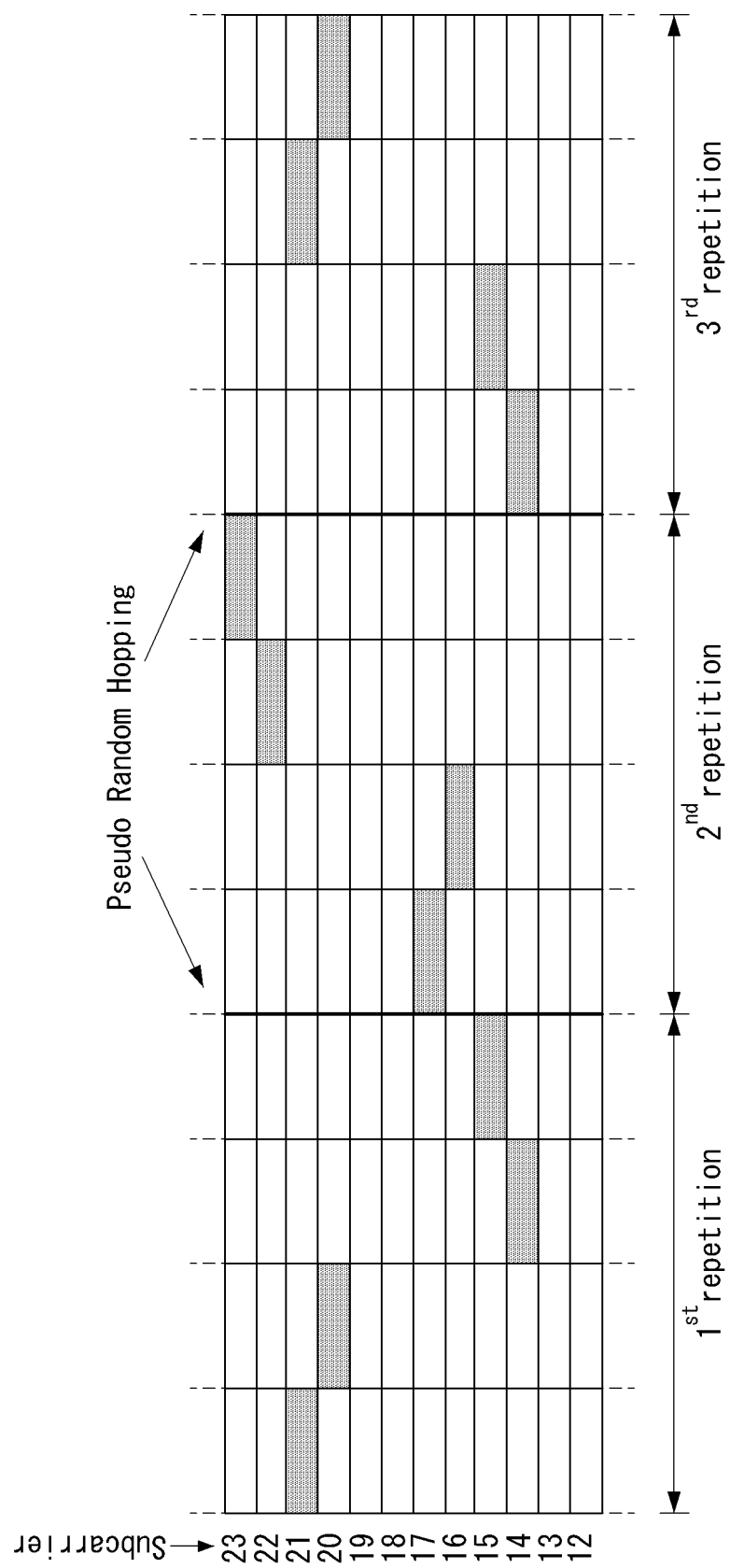
FIG. 9 is a diagram illustrating an example of repetition and a random hopping method of the NPRACH preamble.

FIG. 5B illustrates a carrier aggregation structure used in the LTE system. In the case of FIG. 9, a case is illustrated, in which three component carriers having a frequency magnitude of 20 MHz are combined. Each of three DL CCs and three UL CCs is provided, but the number of DL CCs and the number of UL CCs are not limited. In the case of carrier aggregation, the terminal may simultaneously monitor three CCs, and receive downlink signal/data and transmit uplink signal/data.

When N DL CCs are managed in a specific cell, the network may allocate M (M≤N) DL CCs to the terminal. In this case, the terminal may monitor only M limited DL CCs and receive the DL signal. Further, the network gives L DL CCs to allocate a primary DL CC to the terminal and in this case, UE needs to particularly monitor L DL CCs. Such a scheme may be similarly applied even to uplink transmission.

A linkage between a carrier frequency (alternatively, DL CC) of the downlink resource and a carrier frequency (alternatively, UL CC) of the uplink resource may be indicated by an upper-layer message such as the RRC message or the system information. For example, a combination of the DL resource and the UL resource may be configured by a linkage defined by system information block type 2 (SIB2). In detail, the linkage may mean a mapping relationship between the DL CC in which the PDCCH transporting a UL grant and a UL CC using the UL grant and mean a mapping relationship between the DL CC (alternatively, UL CC) in which data for the HARQ is transmitted and the UL CC (alternatively, DL CC) in which the HARQ ACK/NACK signal is transmitted.

Figure 6:
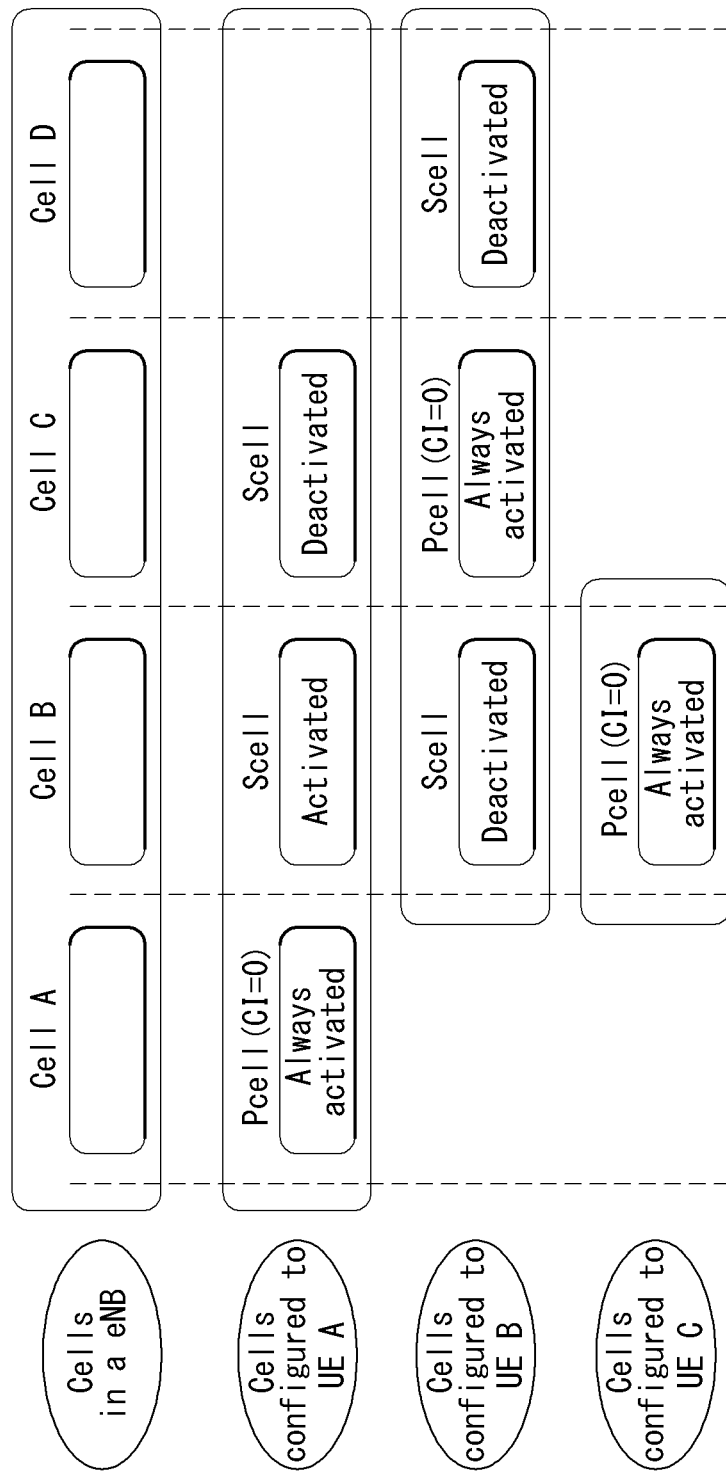
FIG. 6 is a diagram illustrating division of cells in a system that supports the carrier aggregation.

FIG. 6 is a diagram illustrating division of cells in a system that supports the carrier aggregation.

Referring to FIG. 6, a configured cell as a cell that may perform carrier aggregation based on a measurement report among cells of a base station as illustrated in FIGS. 5A and 5B may be configured for each UE. The configured cell may reserve resources for ack/nack transmission for PDSCH transmission in advance. An activated cell as a cell configured to transmit a PDSCH/PUSCH among the configured cells performs Channel State Information (CSI) reporting and (Sounding Reference Signal (SRS) transmission for PDSCH/PUSCH transmission. A de-activated cell as a cell that prevents PDSCH/PUSCH transmission due to a command of the base station or a timer operation may also stop the CSI reporting and the SRS transmission.

Hereinafter, a narrowband physical random access channel will be described.

A physical layer random access preamble is based on single-subcarrier frequency hopping symbol groups.

Figure 7:
FIG. 7 is a diagram illustrating an example of a symbol group of an NPRACH preamble.

The symbol group is illustrated in FIG. 7 and includes a cyclic prefix (CP) having a length of $T_{CP}$ and a sequence of five identical symbols having an overall length of $T_{SEQ}$.

Parameters of the physical layer random access preamble are listed in Table 3 below.

That is, FIG. 7 is a diagram illustrating an example of a symbol group of the NPRACH preamble and Table 3 illustrates an example of random access preamble parameters.

TABLE 3

| Preamble format | $T_{CP}$ | $T_{SEQ}$ |
| --- | --- | --- |
| 0 | $2048 T_s$ | $5 \cdot 8192\ T_s$ |
| 1 | $8192 T_s$ | $5 \cdot 8192\ T_s$ |

An NPRACH preamble including four symbol groups transmitted without gaps is transmitted $N_{rep}^{NPRACH}$ times.

The transmission of the random access preamble, when triggered by an MAC layer, is restricted to specific time and frequency resources.

An NPRACH configuration provided by a higher layer includes the following parameters.

NPRACH resource periodicity, $N_{period}^{NPRACH}$ (nprach-Periodicity),

Frequency location of a first subcarrier allocated to NPRACH, $N_{scoffset}^{NPRACH}$ (nprach-SubcarrierOffset), The number of subcarriers allocated to NPRACH, $N_{sc}^{NPRACH}$ (nprach-NumSubcarriers), The number of starting sub-carriers allocated to contention based NPRACH random access, $N_{sc\_cont}^{NPRACH}$ (nprach-NumCBRA-StartSubcarriers), The number of NPRACH repetitions per attempt, $N_{rep}^{NPRACH}$ (numRepetitionsPerPreambleAttempt), NPRACH starting time, $N_{start}^{NPRACH}$ (nprach-StartTime), Ratio for calculating a starting subcarrier index for an NPRACH subcarrier range reserved for indication of UE support for multi-tone msg3 transmission, $N_{MSG3}^{NPRACH}$ (nprach-SubcarrierMSG3-RangeStart).

The NPRACH transmission may start only in a time unit of $N_{start}^{NPRACH} \cdot 30720\ T_s$ since the start of a radio frame satisfying $n_f \bmod(N_{period}^{NPRACH}/10)=0$.

$4 \cdot 64(T_{CP}+T_{SEQ})$ After transmission of the time unit, a gap of a time unit of $40 \cdot 30720 T_s$ is inserted.

NPRACH configurations which are $N_{scoffset}^{NPRACH}+N_{sc}^{NPRACH}>N_{sc}^{UL}$ are invalid.

$\{0, 1, \ldots, N_{sc\_cont}^{NPRACH} N_{MSG3}^{NPRACH}-1\}$ and $\{N_{sc\_cont}^{NPRACH} N_{MSG3}^{NPRACH}, \ldots, N_{sc\_cont}^{NPRACH}-1\}$. Here, when there is a second set, the second set indicates UE support for the multi-tone msg3 transmission.

The frequency location of the NPRACH transmission is restricted within the subcarriers. Frequency hopping is used in 12 subcarriers, and the frequency location of an i-th symbol group is given by $n_{sc}^{RA}(i)=n_{start}+\tilde{n}_{SC}^{RA}(i)$, $n_{start}=N_{scoffset}^{NPRACH}+\lfloor n_{init}/N_{sc}^{RA}\rfloor \cdot N_{sc}^{RA}$ and follows Equation 1.

$$\tilde{n}_{sc}^{RA}(i) = \begin{cases} (\tilde{n}_{sc}^{RA}(0) + f(i/4)) \bmod N_{sc}^{RA} & i \bmod 4 = 0 \text{ and } i > 0 \\ \tilde{n}_{sc}^{RA}(i-1) + 1 & i \bmod 4 = 1, 3 \text{ and } \tilde{n}_{sc}^{RA}(i-1) \bmod 2 = 0 \\ \tilde{n}_{sc}^{RA}(i-1) - 1 & i \bmod 4 = 1, 3 \text{ and } \tilde{n}_{sc}^{RA}(i-1) \bmod 2 = 1 \\ \tilde{n}_{sc}^{RA}(i-1) + 6 & i \bmod 4 = 2 \text{ and } \tilde{n}_{sc}^{RA}(i-1) < 6 \\ \tilde{n}_{sc}^{RA}(i-1) - 6 & i \bmod 4 = 2 \text{ and } \tilde{n}_{sc}^{RA}(i-1) \geq 6 \end{cases}$$ [Equation 1]

$$f(t) = \left( f(t-1) + \left( \sum_{n=10t+1}^{10t+9} c(n) 2^{n-(10t+1)} \right) \bmod (N_{sc}^{RA} - 1) + 1 \right) \bmod N_{sc}^{RA}$$

$$f(-1) = 0$$

Here, $n_{init}$ represents a subcarrier selected from {0, 1, . . . , $N_{sc}^{NPRACH}$−1} by the MAC layer. In addition, the pseudo random generator is initialized to $c_{init} = N_{ID}^{Ncell}$.

Baseband Signal Generation

A time-continuous random access signal $s_i(t)$ for a symbol group i is defined by Equation 2 below.

$$s_i(t) = \beta_{NPRACH} e^{j2\pi(n_{SC}^{RA}(i) + Kk_0 1/2)\Delta f_{RA}(t - T_{CP})}$$ [Equation 2]

Here, $0 \leq t < T_{SEQ} + T_{CP}$, $\beta_{NPRACH}$ represents an amplitude scaling factor for following transmission power $P_{NPRACH}$, $k_0 = -N_{sc}^{UL}/2$, and $K = \Delta f/\Delta f_{RA}$ represents a difference in a subcarrier interval between transmissions of the random access preamble and uplink data.

In addition, a position in a frequency domain is controlled by a parameter $n_{SC}^{RA}(i)$.

A variable $\Delta f_{RA}$ is given by Table 4 below.

That is, Table 4 shows one example of random access baseband parameters.

TABLE 4

| Preamble format | $\Delta f_{RA}$ |
|---|---|
| 0, 1 | 3.75 kHz |

PUSCH-Config

IE PUSCH-ConfigCommon is used to designate a common PUSCH configuration and a reference signal configuration for PUSCH and PUCCH. IE PUSCH-ConfigDedicated is used to designate a UE-specific PUSCH configuration.

TABLE 5

```
--ASN1START
TDD-PUSCH-UpPTS-r14 ::=          CHOICE {
    release
    NULL,
    setup
    SEQUENCE {
        symPUSCH-UpPTS-r14
        ENUMERATED {sym1, sym2, sym3, sym4, sym5, sym6}
                                        OPTIONAL,
        -- Need ON
            dmrs-LessUpPTS-r14
        ENUMERATED {true}   OPTIONAL   -- Need OR
    }
}
--ASN1STOP
```

In Table 5, symPUSCH-UpPTS indicates the number of data symbols set for PUSCH transmission in UpPTS.

sym2, sym3, sym4, sym5, and sym6 values may be used for a normal cyclic prefix and sym1, sym2, sym3, sym4, and sym5 values may be used for an extended cyclic prefix.

Mapping to Physical Resources

For UpPTS, when dmrsLess-UpPts is set to 'true', then the physical resource mapping starts at l=$N_{symb}^{UL}$−symPUSCH_pUPts a symbol of a second slot of a special subframe, otherwise the physical resource mapping starts at l=$N_{symb}^{UL}$−symPUSCH_pUPts−1 of the second slot of the special subframe.

Hereinafter, when supporting Time Division Duplexing (TDD) in a Narrowband (NB)-IoT system supporting cellular Internet of Things (IoT) proposed in this specification (i.e., when supporting frame structure type 2), a method for designing the random access preamble will be described. As described above, the random access preamble used in the NB-IoT system may be referred to as a Narrowband Random Access Channel (NRACH) preamble.

First, narrowband (NB)-LTE may mean a system for supporting low complexity and low power consumption, which has a system bandwidth corresponding to one Physical Resource Block (PRB) of an LTE system. This may be primarily used as a communication scheme for implementing Internet of things (IoT) by supporting a device such as machine-type communication (MTC) in a cellular system.

The NB-IoT system uses the same OFDM parameters such as subcarrier spacing and the like as in an existing system (i.e., LTE system) to allocate 1 PRB to a legacy LTE band for NB-LTE without additional band allocation, thereby efficiently using a frequency. Hereinafter, the NB-IoT system will be described with reference to the LTE system, but the methods proposed in this specification may be extended and applied to a next generation communication system (e.g., a new RAT (NR) system), of course.

The physical channel of the NB-LTE may be defined as NPSS/NSSS, NPBCH, NPDCCH/NEPDCCH, NPDSCH, etc. in the case of downlink and may be named by adding N in order to distinguish the NB-LTE from the existing system (i.e., LTE system).

Figure 8:
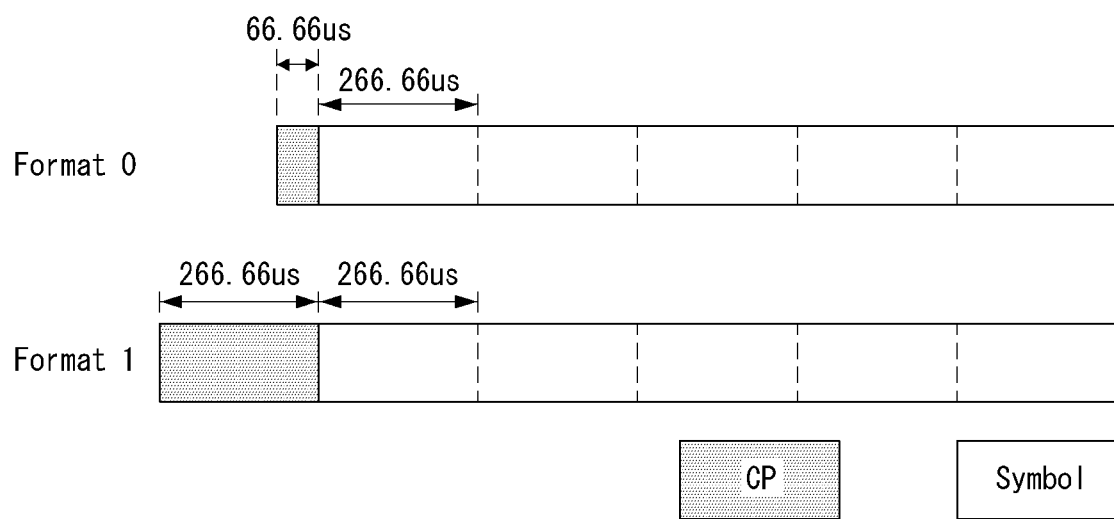
FIG. 8 illustrates an example of an NPRACH preamble format in an NB-IoT system.

The NPRACH preamble used in Frequency Division Duplexing (FDD) NB-IoT up to the existing system (e.g. 3GPP Rel.14) has two formats and a specific may be illustrated in FIG. 8.

FIG. 8 illustrates an example of an NPRACH preamble format in an NB-IoT system.

Referring to FIG. 8, the NPRACH preamble is used for single tone transmission and has a subcarrier spacing of 3.75 kHz. In addition, five symbols and one cyclic prefix (CP) are combined to constitute one symbol group.

In this case, NPRACH preamble format 0 may be constituted by a CP of 66.66 us and five contiguous symbols of 266.66 us and NPRACH preamble format 1 may be constituted by a CP of 266.66 us and five contiguous symbols of 266.66 us. In this case, the length of the symbol group of the NPRACH preamble format 0 may be 1.4 ms and the length of the symbol group of the NPRACH preamble format 1 may be 1.6 ms.

In addition, a basic unit for repetition (i.e., repetitive transmission) may be constituted by four symbol groups. That is, four symbol groups may be used to perform (or form) one repetition. Accordingly, the length of four contiguous symbol groups constituting one repetition may be 5.6 ms for the NPRACH preamble format 0 and 6.4 ms for the NPRACH preamble format 1.

Further, as illustrated in FIG. 9, the NPRACH preamble may be configured to perform first hopping with a spacing equal to the subcarrier spacing and second hopping with a spacing equal to six times the subcarrier spacing.

FIG. 9 is a diagram illustrating an example of repetition and a random hopping method of the NPRACH preamble.

However, in TDD (i.e., frame structure type 2 described above) considered in the next generation NB-IoT system (e.g., NB-IoT in 3GPP Rel.15), it may be difficult to directly use the NPRACH preamble format in existing NB-IoT (e.g., legacy NB-IoT in 3GPP Rel. 14) by considering the UL/DL configuration of the existing LTE system. However, although a TDD standalone mode may be configured to use the NPRACH preamble format of the existing NB-IoT by introducing a new UL/DL configuration, an in-band mode and/or a guard band mode may not be easy to use the NPRACH preamble format of the existing NB-IoT as it is.

Hereinafter, this specification proposes an NPRACH configuration method and a preamble repetition rule when frame structure type 2 (i.e., TDD or unpaired spectrum) is applied to an NB-IoT system and new NRACH preamble formats are introduced.

Hereinafter, embodiments and/or methods (i.e., the spirit of the present invention) proposed by this specification may be extensively applied even to other channels except for a random access channel (PRACH) and extended to a multi-tone transmission scheme even in a single-tone transmission scheme.

Further, as mentioned above, the embodiments and/or methods proposed by this specification may be extensively applied to a next-generation communication system (e.g., NR system) as well as an LTE system.

Further, the embodiments and/or methods proposed by this specification are described based on an in-band mode or a guard band mode in TDD, but the method proposed by this specification may be applied even in a standalone mode.

Further, the embodiments and/or methods proposed by this specification are just distinguished for convenience of description and some configurations or features of any embodiment and/or method may be included in another embodiment and/or method or replaced with configurations or features corresponding to another embodiment and/or method.

NPRACH Configuration and Preamble Repetition Rule

First, an NPRACH configuration and a preamble repetition rule proposed by this specification will be described.

A 'consecutive transmission time (TC)' used in this specification may mean a total time duration including a specific number of symbol groups which are consecutively transmitted and a guard time and may be defined differently according to two following cases (case 1 and case 2).

First, one NPRACH preamble includes at least one symbol group as illustrated in FIG. 7 and one symbol group includes a cyclic prefix having a length of $T_{CP}$ and a sequence of N same symbols having a total length of $T_{SEQ}$.

In addition, the number of all symbols groups is expressed as P in one NPRACH preamble (repetition unit) and the number of symbol groups which are consecutive in a time is expressed as G.

Characteristically, as shown in Table 1 above, TC may have one of 1 ms, 2 ms, or 3 ms.

Additionally, if the TC uses up to a UpPTS symbol, xms (a real number of 0<x<1, e.g., x is approximately 142.695 us in a preamble format using UpPTS 2 symbols) may be added to the TC above.

(Case 1)

When P=G, TC may be defined as a time duration including P symbol groups (i.e., P CPs and P SEQs) and GT.

(Case 2)

When P>G, TC may be defined as a time duration including G symbol groups (i.e., G CPs and G SEQs) and GT.

Here, P represents the total number of symbol groups constituting the preamble and P symbol groups are collected to represent one preamble transmission.

That is, in respect to one preamble transmission, a time when all of P symbol groups are transmitted is defined as one time.

Further, G represents the total number of symbol groups transmitted back-to-back within consecutive UL SFs (i.e., a maximum of three UL SFs).

Characteristically, Case 2 above, P becomes a multiple of G (e.g., P=2G).

Further, SEQ as the number of symbols belonging to one symbol group is expressed as N.

Next, the NPRACH configuration and the repetition rule will be described in more detail through Methods 1 and 2.

(Method 1)

Method 1 relates to a method similar to a PRACH configuration method in Legacy LTE/e-MTC.

First, a combination of UL SFs which may be transmitted for TC and UL/DL configuration, respectively, is previously set as several sets having different values.

In addition, the eNB is configured to carry the combination to the UE with an NPRACH configuration index through system information (e.g., SIB2-NB).

In this case, it may be described as below that the combination may be transmitted to the UE.

For example, when the TC is 1 ms and the UL/DL configuration is '1', all of 4 UL SFs which exist within 10 ms may be designated as a starting UL SF.

However, when the TC is 3 ms, only a first UL SF among 3 consecutive UL SFs of the UL/DL configuration (i.e., UL/DL configuration #0, #3, #6) in which 3 consecutive UL SFs exist may be designated as the starting UL SF.

Meanwhile, a UL SF in which an actual preamble may be transmitted for each NPRACH configuration index mentioned above may be predetermined and predefined as a table in a standard document (see Table 7).

In this specification, the preamble may refer to the NPRACH preamble unless otherwise mentioned.

Additionally, for preamble repetition (in this case, the repetition number may be configured through system information (e.g., SIB2-NB), the eNB may configure to carry the starting UL SF information for preamble transmission among UL SFs capable of transmitting the actual preamble defined above through the system information (e.g., SIB2-NB).

Additionally, the eNB may also be configured to carry a period between the starting UL SFs to the UE through the system information (e.g., SIB2-NB).

A specific method for carrying the starting UL SF information is described below as an example.

When the UE lists subframe(s) allowed to transmit the preamble during a radio frame interval of 10 ms through the NPRACH configuration index value and the UL/DL configuration information, the eNB may grant numbers of 0 up to 5 to each subframe in an order (i.e., in ascending order) in which the absolute subframe number increases from a subframe (i.e., a subframe which exists temporally earlier) having a smaller absolute subframe number.

Here, the granting of the number may mean performing indexing.

In addition, the eNB may select one among the numbers of 0 to up to 5 and designate the selected number as the starting UL SF to the UE. That is, the eNB may inform the UE one of UL SFs indexed as 0 up to 5.

configuration by the UE) capable of transmitting the actual preamble by starting the preamble transmission from the starting UL SF mentioned above.

In this case, it is characterized in that whether to consecutively transmit the preambles within UL SFs capable of consecutively transmitting the preambles is not a problem.

Accordingly, an eNB that desires for the UEs to consecutively transmit the preambles in the UL SFs capable of consecutively transmitting needs to configure an NPRACH configuration index in which the UL SF capable of transmitting the actual preamble is consecutively configured in the UE through the NPRACH configuration.

In order to take an example for a table for the NPRACH configuration, it may be assumed in this specification that 4 preamble formats are defined as a TDD NPRACH preamble format as shown in Table 6.

In this case, N represents the number of symbols in the symbol group, G represents the number of symbol groups transmitted back-to-back in the UL SF(s), P represents the number of symbol groups in the preamble, and TS represents 1/30.72 (us).

Table 6 is a table showing examples of TDD NPRACH preamble formats.

TABLE 6

| Preamble parameter | CP length | SEQ length (N*8192 TS) | G | P | Guard period | TC | Cell coverage (km) |
|---|---|---|---|---|---|---|---|
| Format 0 | 1572 TS | 1 * 8192 TS | 3 | 3 | 1428 TS | 1 * 30720 TS | 6.97 |
| Format 1 | 4827 TS | 1 * 8192 TS | 2 | 4 | 4682 TS | 1 * 30720 TS | 22.86 |
| Format 2 | 8192 TS | 2 * 8192 TS | 2 | 4 | 12288 TS | 2 * 30720 TS | 39.30 |
| Format 3 | 8192 TS | 4 * 8192 TS | 2 | 4 | 10240 TS | 3 * 30720 TS | 39.30 |

In this case, it may be preferable in terms of preamble decoding that the eNB is configured for multiple UEs included in the same CE level to transmit the NPRACH preamble to the same subframe.

When two or more starting subframes are configured in the same radio frame for multiple UEs included in the same CE level, it may be difficult for the eNB to decode preambles transmitted at different starting points.

However, exceptionally, when even though the repetition number included in the NPRACH configuration is so small that multiple UEs transmit the preambles at different starting points, which does not affect mutual preambles, two or more starting subframes may be configured.

In this case, in respect to the absolute subframe number, in '(radio) frame $n_f$, subframe i has absolute subframe number $n_{sf}^{abs}=10n_f+i$. Here, it may be determined that (radio) frame $n_f$ is a system frame number.

The above method is characterized in that the preamble may always be transmitted to the same UL SF for each specific period as described above and the preamble may not always be transmitted to the same UL SF.

Further, the UE may be configured to transmit the preamble as much as the configured repetition number by using a UL SF (i.e., this may be known through the NPRACH Preamble formats 0, 1, 2, and 3 of Table 6 above may be expressed as FIGS. 10(a), 10(b), 10(c), and 10(d), respectively.

Figure 10:
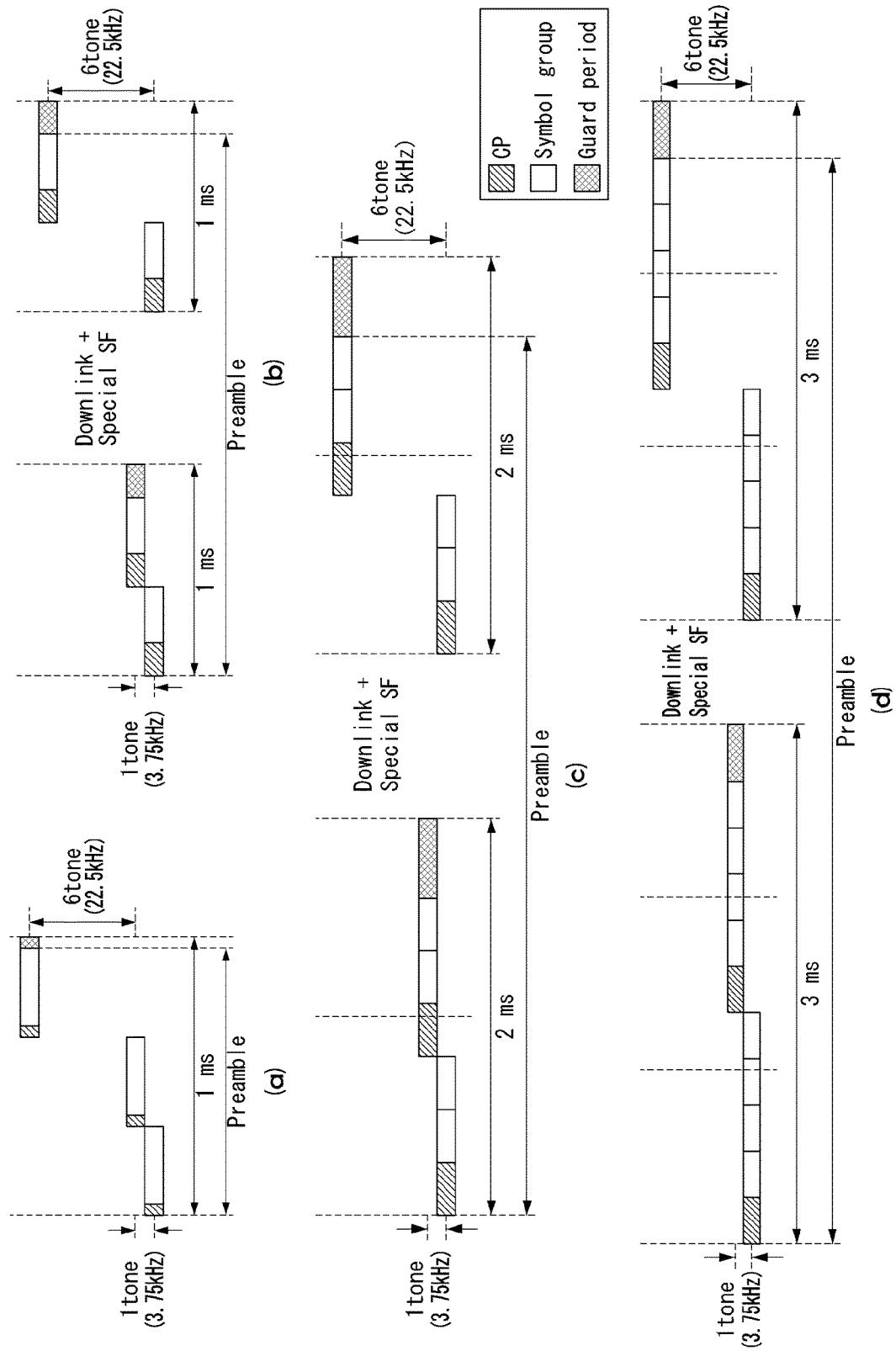
FIG. 10 is a diagram illustrating an example of a TDD NPRACH preamble format proposed by this specification.

FIG. 10 is a diagram illustrating an example of a TDD NPRACH preamble format proposed by this specification.

When it is assumed that the preamble format is defined as illustrated in FIG. 10, Table 7 shows an example of the NPRACH configuration table according to each preamble format and UL/DL configuration.

In this case, it is apparent that all states of Table 7 are for illustrative purposes and may have different values.

Each triple $(t_{RA}^{(0)}, t_{RA}^{(1)}, t_{RA}^{(2)})$ of the format indicates a location of a specific random access resource. Here, $t_{RA}^{(0)}=0, 1, 2$ indicate whether the resource is regenerated in all radio frames, in even radio frames, and odd radio frames, respectively. $t_{RA}^{(1)}=0, 1$ indicates whether the random access resource is positioned in a first half frame or a second half frame, respectively. Here, $t_{RA}^{(2)}$ represents an uplink subframe number in which the preamble starts and is counted from 0 in a first uplink subframe between two consecutive downlink-to-uplink switch points.

Table 7 is a table showing an example of the NPRACH configuration.

TABLE 7

| NPRACH configuration Index | Preamble Format | UL/DL configuration 0 | 1 | 2 | 3 | 4 | 5 | 6 |
|---|---|---|---|---|---|---|---|---|
| 0 | 0 | (1, 0, 2) | (1, 0, 1) | (1, 0, 0) | (1, 0, 2) | (1, 0, 1) | (1, 0, 0) | (1, 0, 2) |
| 1 | 1 | | | | | | | |
| 2 | 0 | (2, 0, 2) | (2, 0, 1) | (2, 0, 0) | (2, 0, 2) | (2, 0, 1) | (2, 0, 0) | (2, 0, 2) |
| 3 | 1 | | | | | | | |
| 4 | 0 | (1, 1, 2) | (1, 1, 1) | (1, 1, 0) | (1, 0, 1) | (1, 0, 0) | N/A | (1, 1, 1) |
| 5 | 1 | | | | | | | |
| 6 | 0 | (0, 0, 2) | (0, 0, 1) | (0, 0, 0) | (0, 0, 2) | (0, 0, 1) | (0, 0, 0) | (0, 0, 2) |
| 7 | 1 | | | | | | | |
| 8 | 0 | (0, 1, 2) | (0, 1, 1) | (0, 1, 0) | (0, 0, 1) | (0, 0, 0) | N/A | (0, 1, 1) |
| 9 | 1 | | | | | | | |
| 10 | 0 | (0, 0, 1) | (0, 0, 0) | N/A | (0, 0, 0) | N/A | N/A | (0, 0, 1) |
| 11 | 1 | | | | | | | |
| 12 | 0 | (0, 0, 2) | (0, 0, 1) | (0, 0, 0) | (0, 0, 1) | (0, 0, 0) | N/A | (0, 0, 2) |
| 13 | 1 | (0, 1, 2) | (0, 1, 1) | (0, 1, 0) | (0, 0, 2) | (0, 0, 1) | | (0, 1, 1) |
| 14 | 0 | (0, 0, 1) | (0, 0, 0) | N/A | (0, 0, 0) | N/A | N/A | (0, 0, 1) |
| 15 | 1 | (0, 1, 1) | (0, 1, 0) | | (0, 0, 2) | | | (0, 1, 0) |
| 16 | 0 | (0, 0, 0) | N/A | N/A | (0, 0, 0) | N/A | N/A | (0, 0, 0) |
| 17 | 1 | (0, 1, 0) | | | (0, 0, 1) | | | (0, 1, 1) |
| 18 | 0 | (0, 0, 1) | (0, 0, 0) | N/A | (0, 0, 0) | N/A | N/A | (0, 0, 1) |
| 19 | 1 | (0, 0, 2)<br>(0, 1, 2) | (0, 0, 1)<br>(0, 1, 1) | | (0, 0, 1)<br>(0, 0, 2) | | | (0, 0, 2)<br>(0, 1, 1) |
| 20 | 0 | (0, 0, 0) | (0, 0, 1) | N/A | N/A | N/A | N/A | (0, 0, 0) |
| 21 | 1 | (0, 1, 0)<br>(0, 1, 1) | (0, 1, 0)<br>(0, 1, 1) | | | | | (0, 0, 2)<br>(0, 1, 0) |
| 22 | 0 | (0, 0, 1) | (0, 0, 0) | N/A | N/A | N/A | N/A | (0, 0, 1) |
| 23 | 1 | (0, 0, 2)<br>(0, 1, 1)<br>(0, 1, 2) | (0, 0, 1)<br>(0, 1, 0) | | | | | (0, 1, 0)<br>(0, 1, 1) |
| 24 | 0 | (0, 0, 0) | (0, 0, 0) | N/A | N/A | N/A | N/A | (0, 0, 1) |
| 25 | 1 | (0, 0, 2)<br>(0, 1, 0)<br>(0, 1, 2) | (0, 0, 1)<br>(0, 1, 0)<br>(0, 1, 1) | | | | | (0, 0, 2)<br>(0, 1, 0)<br>(0, 1, 1) |
| 26 | 0 | (0, 0, 0) | N/A | N/A | N/A | N/A | N/A | (0, 0, 0) |
| 27 | 1 | (0, 0, 1)<br>(0, 1, 0)<br>(0, 1, 1) | | | | | | (0, 0, 1)<br>(0, 0, 2)<br>(0, 1, 1) |
| 28 | 0 | (0, 0, 0) | N/A | N/A | N/A | N/A | N/A | (0, 0, 0) |
| 29 | 1 | (0, 0, 1)<br>(0, 0, 2)<br>(0, 1, 1)<br>(0, 1, 2) | | | | | | (0, 0, 1)<br>(0, 1, 0)<br>(0, 1, 1) |
| 30 | 0 | (0, 0, 1) | N/A | N/A | N/A | N/A | N/A | (0, 0, 0) |
| 31 | 1 | (0, 0, 2)<br>(0, 1, 0)<br>(0, 1, 1)<br>(0, 1, 2) | | | | | | (0, 0, 1)<br>(0, 0, 2)<br>(0, 1, 0)<br>(0, 1, 1) |
| 32 | 0 | (0, 0, 0) | N/A | N/A | N/A | N/A | N/A | N/A |
| 33 | 1 | (0, 0, 1)<br>(0, 0, 2)<br>(0, 1, 0)<br>(0, 1, 2) | | | | | | |
| 34 | 0 | (0, 0, 0) | N/A | N/A | N/A | N/A | N/A | N/A |
| 35 | 1 | (0, 0, 1)<br>(0, 0, 2)<br>(0, 1, 0)<br>(0, 1, 1)<br>(0, 1, 2) | | | | | | |
| 36 | 2 | (1, 0, 1) | (1, 0, 0) | N/A | (1, 0, 1) | (1, 0, 0) | N/A | (1, 0, 1) |
| 37 | 2 | (2, 0, 1) | (2, 0, 0) | N/A | (2, 0, 1) | (2, 0, 0) | N/A | (2, 0, 1) |
| 38 | 2 | (1, 1, 1) | (1, 1, 0) | N/A | N/A | N/A | N/A | (1, 1, 0) |
| 39 | 2 | (0, 0, 1) | (0, 0, 0) | N/A | (0, 0, 1) | (0, 0, 0) | N/A | (0, 0, 1) |
| 40 | 2 | (0, 1, 1) | (0, 1, 0) | N/A | (0, 0, 0) | N/A | N/A | (0, 1, 0) |
| 41 | 2 | (0, 0, 0) | (0, 0, 0)<br>(0, 1, 0) | N/A | N/A | N/A | N/A | (0, 0, 0) |
| 42 | 2 | (0, 0, 0)<br>(0, 1, 0) | N/A | N/A | N/A | N/A | N/A | (0, 0, 0)<br>(0, 1, 0) |
| 43 | 2 | (0, 0, 1)<br>(0, 1, 1) | N/A | N/A | N/A | N/A | N/A | (0, 0, 1)<br>(0, 1, 0) |
| 44 | 3 | (1, 0, 0) | N/A | N/A | (1, 0, 0) | N/A | N/A | (1, 0, 0) |
| 45 | 3 | (2, 0, 0) | N/A | N/A | (2, 0, 0) | N/A | N/A | (2, 0, 0) |
| 46 | 3 | (1, 1, 0) | N/A | N/A | N/A | N/A | N/A | N/A |
| 47 | 3 | (0, 0, 0) | N/A | N/A | (0, 0, 0) | N/A | N/A | (0, 0, 0) |
| 48 | 3 | (0, 1, 0) | N/A | N/A | N/A | N/A | N/A | N/A |
| 49 | 3 | (0, 0, 0)<br>(0, 1, 0) | N/A | N/A | N/A | N/A | N/A | N/A |

TABLE 7-continued

| NPRACH configuration Index | Preamble Format | UL/DL configuration | | | | | | |
|---|---|---|---|---|---|---|---|---|
| | | 0 | 1 | 2 | 3 | 4 | 5 | 6 |
| 50 | N/A | N/A | N/A | N/A | N/A | N/A | N/A | N/A |
| 51 | N/A | N/A | N/A | N/A | N/A | N/A | N/A | N/A |
| 52 | N/A | N/A | N/A | N/A | N/A | N/A | N/A | N/A |
| 53 | N/A | N/A | N/A | N/A | N/A | N/A | N/A | N/A |
| 54 | N/A | N/A | N/A | N/A | N/A | N/A | N/A | N/A |
| 55 | N/A | N/A | N/A | N/A | N/A | N/A | N/A | N/A |
| 56 | N/A | N/A | N/A | N/A | N/A | N/A | N/A | N/A |
| 57 | N/A | N/A | N/A | N/A | N/A | N/A | N/A | N/A |
| 58 | N/A | N/A | N/A | N/A | N/A | N/A | N/A | N/A |
| 59 | N/A | N/A | N/A | N/A | N/A | N/A | N/A | N/A |
| 60 | N/A | N/A | N/A | N/A | N/A | N/A | N/A | N/A |
| 61 | N/A | N/A | N/A | N/A | N/A | N/A | N/A | N/A |
| 62 | N/A | N/A | N/A | N/A | N/A | N/A | N/A | N/A |
| 63 | N/A | N/A | N/A | N/A | N/A | N/A | N/A | N/A |

A method for transmitting the preamble when the UE receives NPRACH configuration index, available UL SF, preamble repetition number, NPRACH periodicity, UL/DL configuration, and the like from the eNB through SIB will be described as an example.

Figure 11:
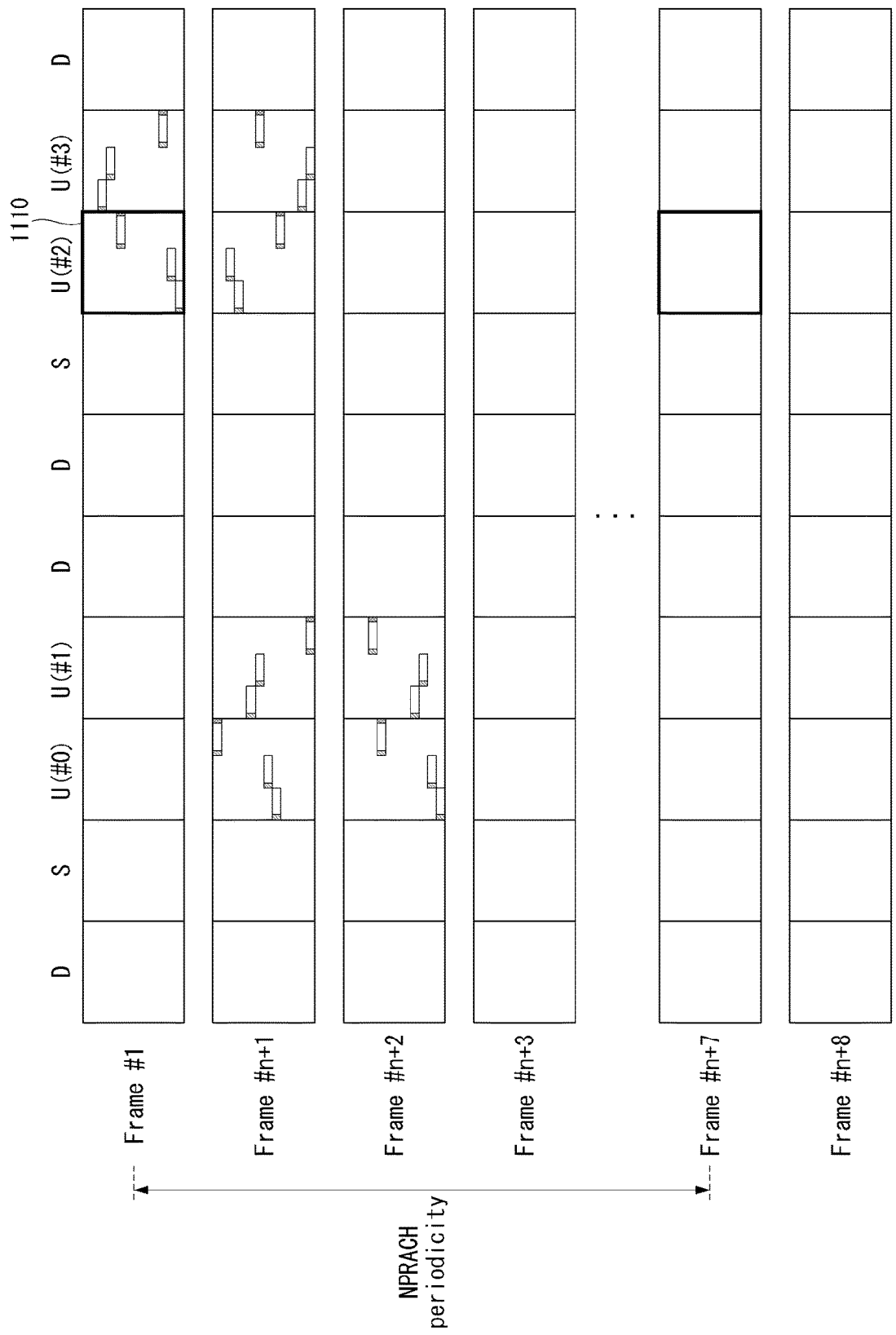
FIG. 11 is a diagram illustrating an example of a method for transmitting a preamble proposed by this specification.

When the UE is configured with the NPRACH configuration index as '24' (see Table 7), configured with the starting UL SF (using a method for selecting and transmitting one of 0 to 5 mentioned above) as '2', configured with the preamble repetition number as '8', configured with the NPRACH periodicity as '80 ms', and configured with the UL/DL configuration as '#1', the UE may transmit the preamble as illustrated in FIG. 11. FIG. 11 is a diagram illustrating an example of a method for transmitting a preamble proposed by this specification.

Here, since the NPRACH configuration index is 24, the preamble format is 0 and a UL subframe capable of transmitting the preamble becomes all UL subframes which exist in UL/DL configuration #1.

Further, the preamble starting point may be 1110 when the configured starting UL SF is 2 and the start frame rule and the NPRACH periodicity are considered.

In addition, since the repetition number is 8, it can be seen that a single preamble (i.e., 3 consecutive symbol groups) is repeatedly transmitted through 8 UL SFs.

Additionally, a case where other UEs may not transmit the UL data due to transmission of a preamble occupying the UL SF for a long time may occur.

Accordingly, a UL SF gap for UL data transmission of other UEs may be defined in the middle of transmission of the NPRACH preamble.

The UL SF gap may be configured to be configurably transmitted to the UE by the eNB through the system information (e.g., SIB2-NB).

A method that may inform the UL SF gap will be described below in detail.

(Alternative 1)

The UL SF gap is defined as the number of UL SFs which the UE needs to skip and the eNB transmits the corresponding information to the UE through the system information (e.g., SIB2-NB) together with the NPRACH configuration.

For example, the UL SF gap may be previously designated or defined in a standard document as a specific set such as {1SF, 2SF, 3SF, 4SF, 5SF, 6SF, 8SF, 16SF, 325F}, etc.

Characteristically, only when the configured preamble repetition value is equal to or more than a specific value NConsecutive_TX (e.g., NConsecutive_TX=16) (or first specific value), the eNB may be configured to configure the UL SF gap.

Additionally, after a preamble repetition as large as a specific value MConsecutive_TX (e.g., 32) (or second specific value) is completed, the UL SF gap may be configurably configured so as to be defined.

Characteristically, when the eNB does not transmit MConsecutive_TX, the MConsecutive_TX may become NConsecutive_TX defined above.

In this case, NConsecutive_TX MConsecutive_TX may be preferable.

(Alternative 2)

The UL SF gap is defined as the NPRACH preamble transmission period and the eNB may transmit the corresponding information to the UE through the system information (e.g., SIB2-NB) together with the NPRACH configuration.

For example, the UL SF gap may be previously designated or defined in the standard document like {5 ms, 10 ms}.

Characteristically, Alternative 2 may be applied when the eNB configures a preamble format that needs to use the UpPTS symbol.

Here, when the preamble repetition is larger than 1, the preamble transmission period is set to 5 ms or 10 ms so that the preamble may be configured to be continuously transmitted in the UpPTS symbol+the UL SF.

(Alternative 3)

Alternative 3 is a method that may prevent long occupation for NPRACH preamble transmission on a specific carrier by transmitting a hopping flag.

The aforementioned alternatives may be simultaneously applied and used. That is, a combination of alternatives 1 and 3 or a combination of alternatives 2 and 3 may be possible.

When the eNB does not transmit UL SF gap related parameters (e.g., UL SF gap or NPRACH preamble transmission period) or the eNB transmits the UL SF gap related parameters, but the UE does not receive the UL SF gap related parameters, the UL SF gap related parameters may be configured to be transmitted as large as the repetition number configured through the UL SF (i.e., the UE may know the corresponding UL SF through the NPRACH configuration) capable of transmitting the actual preamble by starting preamble transmission from the preconfigured starting UL SF.

In addition, when a situation is considered in which a preamble format (e.g., a preamble format whose TC is slightly larger than 1 ms, where the TC is desired to be smaller than 2 ms) needs to use the UpPTS symbol (where the number of UpPTS symbols is configurable) and the repetition number which is not yet transmitted remains, if the eNB does not transmit the UL SF gap related parameters to the UE (i.e., when the preamble repetition transmission may be performed by using the UL SFs capable of transmitting the actual preamble by starting from the configured starting UL SF), the UE may operate in one of the following methods.

That is, the UE may be configured to repeat one of the following methods until the remaining repetition number is lost.

Further, when the eNB uses the preamble format that needs to use the UpPTS symbol, an NPRACH configuration index table is preferably configured so as to include a UL SF (i.e., a first UL SF among the consecutive UL SFs) positioned immediately after a special SF.

(Alternative A)

(the number of UpPTS symbols configured)×(the number of consecutive UL SFs among the UL SFs capable of transmitting the actual preamble) is regarded as the number of UpPTS symbols that may be used for preamble transmission.

In addition, a point advanced by the calculated number of UpPTS symbols is regarded as a starting point of the preamble transmission and the preamble (or mini-preamble) corresponding to the TC is repeatedly transmitted as large as the number of consecutive UL SFs.

In this case, the mini-preamble is a subset of the preamble and a structure in which the mini-preambles are collected to form one preamble may be considered.

(Alternative B)

A point advanced by the number of configured UpPTS symbols is regarded as the starting point and the preamble (or mini-preamble) corresponding to the TC may be repeatedly transmitted as large as the number of consecutive UL SFs among the UL SFs capable of transmitting the actual preamble.

In this case, since ends of the repeatedly transmitted symbol groups invade a region of the UL SF or DL SF which is not capable of transmitting the actual preamble, it may be configured such that a symbol(s) which invade the region of the UL SF or DL SF which is not capable of transmitting the actual preamble among symbols of a last symbol group is dropped and the corresponding time duration is included in the GT.

However, when the number of symbols constituting the symbol group is N and the number of symbols to be dropped is N, it may be preferable that alternative B above is not used.

The reason is that dropping the N symbols may mean dropping all except for only the CP of the symbol group.

The reason is that the eNB may not use a frequency gap (e.g., 3.75 kHz, 22.5 kHz, etc.) from the immediately preceding symbol group.

Since alternative B uses UpPTS symbols less than those of alternative A, alternative B may less influence legacy LTE. However, since the UE needs to drop a specific symbol(s) constituting the symbol group, damage may occur in terms of MCL.

(Alternative C)

The point advanced by the number of configured UpPTS symbols is regarded as the starting point and the preamble (or mini-preamble) corresponding to the TC may be repeatedly transmitted as large as the number of consecutive UL SFs among the UL SFs capable of transmitting the actual preamble.

In this case, since the ends of the repeatedly transmitted symbol groups invade a UL SF or DL SF which may not transmit the actual preamble, a preamble (or mini-preamble) corresponding to the last TC may be configured to be postponed differently from alternative B described above and the corresponding time duration may be configured to be included in the GT.

In this case, in the case of postpone, when a UL SF which is not consecutive with the last transmitted preamble and is positioned immediately next to the special SF is the UL SF capable of transmitting the actual preamble, the UE may regard the transmission point advanced by the number of configured UpPTS symbols from the corresponding UL SF as a transmission point and transmit the preamble (or mini-preamble) corresponding to the TC which is not transmitted above.

Additionally, format 0 of Table 6 is changed from Case 1 to Case 2 and additionally, when the TC is 2 ms, 5 formats may be finally defined as shown in Table 8 below by considering format 2A of G=3 and P=6.

In format 0 considered in the example described above, G=3 and P=3, but in the case of Table 8, G=3 and P=6 are considered.

Accordingly, it may be considered that a case of repetition 2 of G=3 and P=3 may be the same as a case of repetition 1 of G=3 and P=6.

Table 8 is a table showing examples of TDD NPRACH preamble formats.

TABLE 8

| Preamble parameter | CP length | SEQ length (N × 8192 TS) | G | P | Guard period | TC | Cell coverage (km) |
|---|---|---|---|---|---|---|---|
| Format 0 | 1572 TS | 1 × 8192 TS | 3 | 6 | 1428 TS | 1 × 30720 TS | 6.97 |
| Format 1 | 4827 TS | 1 × 8192 TS | 2 | 4 | 4682 TS | 1 × 30720 TS | 22.86 |
| Format 2A | 3072 TS | 2 × 8192 TS | 3 | 6 | 3072 TS | 2 × 30720 TS | 15 |
| Format 2 | 8192 TS | 2 × 8192 TS | 2 | 4 | 12288 TS | 2 × 30720 TS | 39.30 |
| Format 3 | 8192 TS | 4 × 8192 TS | 2 | 4 | 10240 TS | 3 × 30720 TS | 39.30 |

Figure 12:
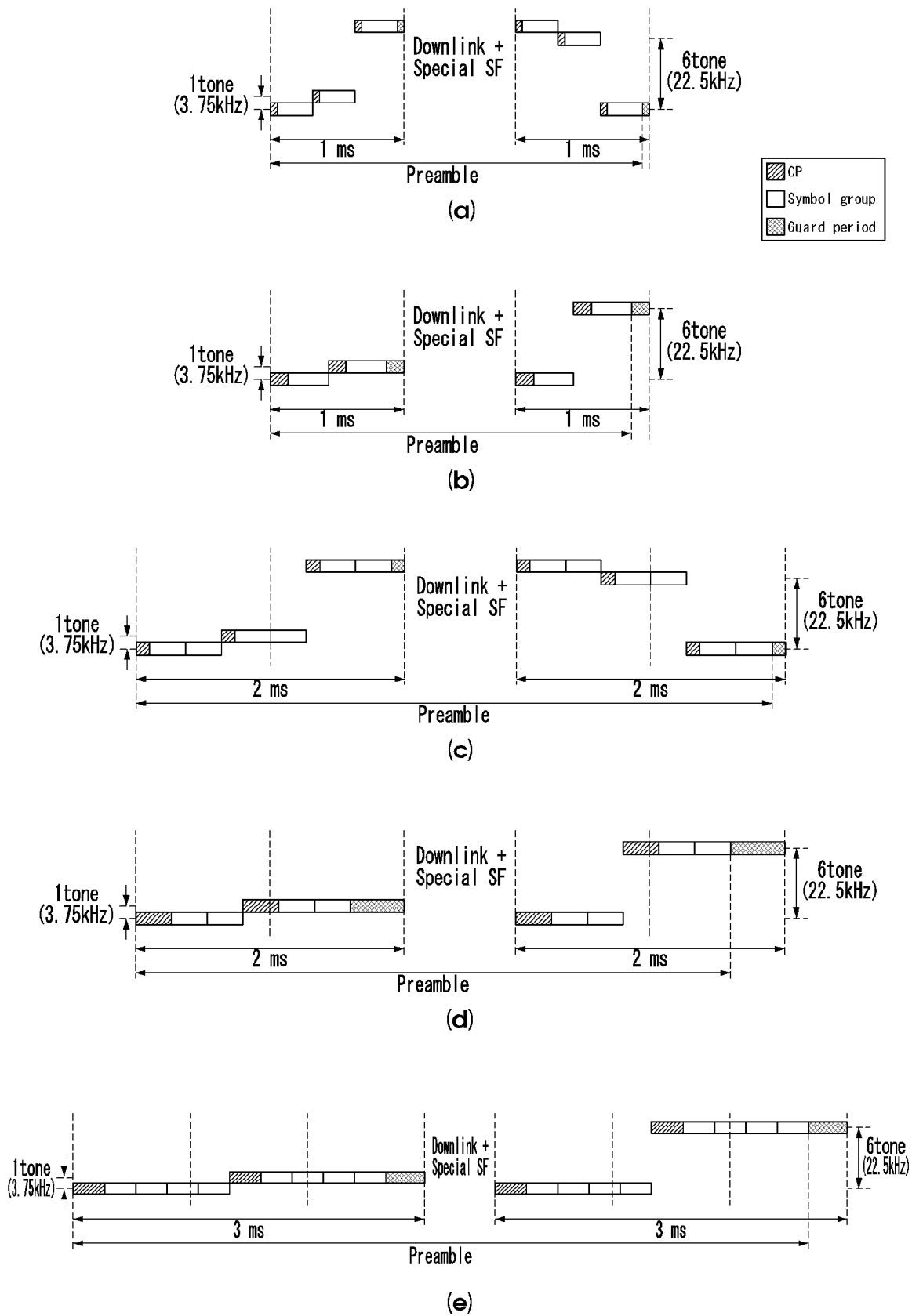
FIG. 12 is a diagram illustrating an example of a TDD NPRACH preamble format proposed by this specification.

Preamble formats 0, 1, 2A, 2, and 3 of Table 8 may be expressed as FIGS. 12(*a*), 12(*b*), 12(*c*), 12(*d*), and 10(*e*), respectively.

That is, FIG. 12 is a diagram illustrating an example of a TDD NPRACH preamble format proposed by this specification.

When such a case is considered, Table 7 above may be applied as shown in Table 9 below. It is apparent that Table 9 is an example and all states of the table are also examples and may have different values.

Characteristically, Table 9 includes all cases other than a case in which the resource is allocated to several carriers among values of a table used in the existing LTE TDD. It is apparent that Table 9 may be applied in the example described above.

Table 9 is a table showing an example of the NPRACH configuration.

TABLE 9

| NPRACH configuration Index | Preamble Format | UL/DL configuration | | | | | | |
|---|---|---|---|---|---|---|---|---|
| | | 0 | 1 | 2 | 3 | 4 | 5 | 6 |
| 0 | 0 | (1, 0, 2) | (1, 0, 1) | (1, 0, 0) | (1, 0, 2) | (1, 0, 1) | (1, 0, 0) | (1, 0, 2) |
| 1 | 1 | | | | | | | |
| 2 | 0 | (2, 0, 2) | (2, 0, 1) | (2, 0, 0) | (2, 0, 2) | (2, 0, 1) | (2, 0, 0) | (2, 0, 2) |
| 3 | 1 | | | | | | | |
| 4 | 0 | (1, 1, 2) | (1, 1, 1) | (1, 1, 0) | (1, 0, 1) | (1, 0, 0) | N/A | (1, 1, 1) |
| 5 | 1 | | | | | | | |
| 6 | 0 | (0, 0, 2) | (0, 0, 1) | (0, 0, 0) | (0, 0, 2) | (0, 0, 1) | (0, 0, 0) | (0, 0, 2) |
| 7 | 1 | | | | | | | |
| 8 | 0 | (0, 1, 2) | (0, 1, 1) | (0, 1, 0) | (0, 0, 1) | (0, 0, 0) | N/A | (0, 1, 1) |
| 9 | 1 | | | | | | | |
| 10 | 0 | (0, 0, 1) | (0, 0, 0) | N/A | (0, 0, 0) | N/A | N/A | (0, 0, 1) |
| 11 | 1 | | | | | | | |
| 12 | 0 | (0, 0, 2) | (0, 0, 1) | (0, 0, 0) | (0, 0, 1) | (0, 0, 0) | N/A | (0, 0, 2) |
| 13 | 1 | (0, 1, 2) | (0, 1, 1) | (0, 1, 0) | (0, 0, 2) | (0, 0, 1) | | (0, 1, 1) |
| 14 | 0 | (0, 0, 1) | (0, 0, 0) | N/A | (0, 0, 0) | N/A | N/A | (0, 0, 1) |
| 15 | 1 | (0, 1, 1) | (0, 1, 0) | | (0, 0, 2) | | | (0, 1, 0) |
| 16 | 0 | (0, 0, 0) | N/A | N/A | (0, 0, 0) | N/A | N/A | (0, 0, 0) |
| 17 | 1 | (0, 1, 0) | | | (0, 0, 1) | | | (0, 1, 1) |
| 18 | 0 | (0, 0, 1) | (0, 0, 0) | N/A | (0, 0, 0) | N/A | N/A | (0, 0, 1) |
| 19 | 1 | (0, 0, 2) (0, 1, 2) | (0, 0, 1) (0, 1, 1) | | (0, 0, 1) (0, 0, 2) | | | (0, 0, 2) (0, 1, 1) |
| 20 | 0 | (0, 0, 0) | (0, 0, 1) | N/A | N/A | N/A | N/A | (0, 0, 0) |
| 21 | 1 | (0, 1, 0) (0, 1, 1) | (0, 1, 0) (0, 1, 1) | | | | | (0, 0, 2) (0, 1, 0) |
| 22 | 0 | N/A | (0, 0, 0) | N/A | N/A | N/A | N/A | (0, 0, 1) |
| 23 | 1 | | (0, 0, 1) (0, 1, 0) | | | | | (0, 1, 0) (0, 1, 1) |
| 24 | 0 | (0, 0, 1) | (0, 0, 0) | N/A | N/A | N/A | N/A | (0, 0, 1) |
| 25 | 1 | (0, 0, 2) (0, 1, 1) (0, 1, 2) | (0, 0, 1) (0, 1, 0) (0, 1, 1) | | | | | (0, 0, 2) (0, 1, 0) (0, 1, 1) |
| 26 | 0 | (0, 0, 0) | N/A | N/A | N/A | N/A | N/A | (0, 0, 0) |
| 27 | 1 | (0, 0, 2) (0, 1, 0) (0, 1, 2) | | | | | | (0, 0, 1) (0, 0, 2) (0, 1, 1) |
| 28 | 0 | (0, 0, 0) | N/A | N/A | N/A | N/A | N/A | (0, 0, 0) |
| 29 | 1 | (0, 0, 1) (0, 1, 0) (0, 1, 1) | | | | | | (0, 0, 2) (0, 1, 0) (0, 1, 1) |
| 30 | 0 | (0, 0, 0) | N/A | N/A | N/A | N/A | N/A | (0, 0, 0) |
| 31 | 1 | (0, 0, 1) (0, 0, 2) (0, 1, 1) (0, 1, 2) | | | | | | (0, 0, 1) (0, 0, 2) (0, 1, 0) (0, 1, 1) |
| 32 | 0 | (0, 0, 1) | N/A | N/A | N/A | N/A | N/A | N/A |
| 33 | 1 | (0, 0, 2) (0, 1, 0) (0, 1, 1) (0, 1, 2) | | | | | | |
| 34 | 0 | (0, 0, 0) | N/A | N/A | N/A | N/A | N/A | N/A |
| 35 | 1 | (0, 0, 1) (0, 0, 2) (0, 1, 0) (0, 1, 2) | | | | | | |
| 36 | 0 | (0, 0, 0) | N/A | N/A | N/A | N/A | N/A | N/A |
| 37 | 1 | (0, 0, 1) (0, 0, 2) (0, 1, 0) (0, 1, 1) (0, 1, 2) | | | | | | |

TABLE 9-continued

| NPRACH configuration Index | Preamble Format | UL/DL configuration | | | | | | |
|---|---|---|---|---|---|---|---|---|
| | | 0 | 1 | 2 | 3 | 4 | 5 | 6 |
| 38 | 2A | (1, 0, 1) | (1, 0, 0) | N/A | (1, 0, 1) | (1, 0, 0) | N/A | (1, 0, 1) |
| 39 | 2 | | | | | | | |
| 40 | 2A | (2, 0, 1) | (2, 0, 0) | N/A | (2, 0, 1) | (2, 0, 0) | N/A | (2, 0, 1) |
| 41 | 2 | | | | | | | |
| 42 | 2A | (1, 1, 1) | (1, 1, 0) | N/A | N/A | N/A | N/A | (1, 1, 0) |
| 43 | 2 | | | | | | | |
| 44 | 2A | (0, 0, 1) | (0, 0, 0) | N/A | (0, 0, 1) | (0, 0, 0) | N/A | (0, 0, 1) |
| 45 | 2 | | | | | | | |
| 46 | 2A | (0, 1, 1) | (0, 1, 0) | N/A | N/A | N/A | N/A | (0, 1, 0) |
| 47 | 2 | | | | | | | |
| 48 | 2A | (0, 0, 1) | (0, 0, 0) | N/A | N/A | N/A | N/A | (0, 0, 1) |
| 49 | 2 | (0, 1, 1) | (0, 1, 0) | | | | | (0, 1, 0) |
| 50 | 3 | (1, 0, 0) | N/A | N/A | (1, 0, 0) | N/A | N/A | (1, 0, 0) |
| 51 | 3 | (2, 0, 0) | N/A | N/A | (2, 0, 0) | N/A | N/A | (2, 0, 0) |
| 52 | 3 | (1, 1, 0) | N/A | N/A | N/A | N/A | N/A | N/A |
| 53 | 3 | (0, 0, 0) | N/A | N/A | (0, 0, 0) | N/A | N/A | (0, 0, 0) |
| 54 | 3 | (0, 1, 0) | N/A | N/A | N/A | N/A | N/A | N/A |
| 55 | 3 | (0, 0, 0) (0, 1, 0) | N/A | N/A | N/A | N/A | N/A | N/A |
| 56-63 | N/A | N/A | N/A | N/A | N/A | N/A | N/A | N/A |

Additionally, the eNB may be configured to separate preamble format information and available UL SF information (i.e., the NPRACH configuration table) and configure the separated preamble format information and available UL SF information through the SIB (e.g., SIB2-NB and SIB22-NB) by separately making Table 9 above into three tables (i.e., 1 ms, 2 ms, and 3 ms) according to the TC value of each preamble format.

In this case, the preamble format may be similarly configured for each CE level and a basis therefor will be described below.

When an initial UE selects a carrier to transmit the preamble, the initial UE is configured to select one carrier through a probability that the preamble format will be configured among a plurality of carriers at the same CE level.

However, the reason is that in a case where the UEs at the same CE level may transmit different preamble formats even though the initial UE selects a different carrier, the case becomes an undesirable operation. The table indicating the preamble format may be configured by using information of 3 bits as shown in Table 10 below.

Table 10 is a table showing an example of a TDD NPRACH preamble format.

TABLE 10

| Index | Preamble parameter | CP length | SEQ length (N × 8192 TS) | G | P | TC | Cell coverage (km) |
|---|---|---|---|---|---|---|---|
| 0 | Format 0 | 1572 TS | 1 × 8192 TS | 3 | 6 | 1 × 30720 TS | 6.97 |
| 1 | Format 1 | 4827 TS | 1 × 8192 TS | 2 | 4 | 1 × 30720 TS | 22.86 |
| 2 | Format 2A | 3072 TS | 2 × 8192 TS | 3 | 6 | 2 × 30720 TS | 15 |
| 3 | Format 2 | 8192 TS | 2 × 8192 TS | 2 | 4 | 2 × 30720 TS | 39.30 |
| 4 | Format 3 | 8192 TS | 4 × 8192 TS | 2 | 4 | 3 × 30720 TS | 39.30 |
| 5-8 | | | Reserved | | | | |

Additionally, since the UL/DL configuration information is transmitted to SIB1-NB, the UE may know the UL/DL configuration by reporting the SIB1-NB and know how many consecutive UL SFs exist.

In addition, when the preamble format which may be used is predesignated according to the number of consecutive UL SFs, the UE may be configured to be configured with the preamble format through the SIB (e.g., SIB2-NB) by referring to table predefined according to the UL/DL configuration.

Characteristically, in the case of UL/DL configurations #2 and #5, since the number of consecutive UL SFs is 1, only preamble formats (i.e., preamble format 0 and preamble format 1) in which the TC is 1×30720 TS may be configured to be configured.

Therefore, in the case of UL/DL configurations #2 and #5, the UE may be configured with the NPRACH preamble format by using only 1 bit by referring to Table 11 instead of referring to Table 10.

Additionally, in the case of UL/DL configurations #1 and #4 (including up to #6 when #6 is also used), since the (minimum) number of consecutive UL SFs is 2, only preamble formats (i.e., preamble format 0, preamble format 1, preamble format 2A, and preamble format 2) in which the TC is 1×30720 TS and 2×30720 TS may be configured to be configured.

Therefore, in the case of UL/DL configurations #1 and #4 (including even #6 when #6 is also used), the UE may be configured with the NPRACH preamble format by using only 2 bits by referring to Table 12 instead of referring to Table 10.

Additionally, in the case of UL/DL configuration #3 (including even #6 when #6 is also used), since the (maximum) number of consecutive UL SFs is 3, even preamble formats (i.e., preamble format 0, preamble format 1, preamble format 2A, preamble format 2, and preamble format 3) in which the TC is 1×30720 TS, 2×30720 TS, and 3×30720 TS may be configured to be configured.

Therefore, in the case of UL/DL configuration #3 (including even #6 when #6 is also used), the UE may be configured with the NPRACH preamble format by using 3 bits by referring to Table 10.

Table 11 is a table showing an example of a TDD NPRACH preamble format.

TABLE 11

| Preamble Index | Preamble parameter | CP length | SEQ length (N × 8192 TS) | G | P | TC | Cell coverage (km) |
|---|---|---|---|---|---|---|---|
| 0 | Format 0 | 1572 TS | 1 × 8192 TS | 3 | 6 | 1 × 30720 TS | 6.97 |
| 1 | Format 1 | 4827 TS | 1 × 8192 TS | 2 | 4 | 1 × 30720 TS | 22.86 |

Table 12 is a table showing an example of the TDD NPRACH preamble format.

TABLE 12

| Preamble Index | Preamble parameter | CP length | SEQ length (N × 8192 TS) | G | P | TC | Cell coverage (km) |
|---|---|---|---|---|---|---|---|
| 0 | Format 0 | 1572 TS | 1 × 8192 TS | 3 | 6 | 1 × 30720 TS | 6.97 |
| 1 | Format 1 | 4827 TS | 1 × 8192 TS | 2 | 4 | 1 × 30720 TS | 22.86 |
| 2 | Format 2A | 3072 TS | 2 × 8192 TS | 3 | 6 | 2 × 30720 TS | 15 |
| 3 | Format 2 | 8192 TS | 2 × 8192 TS | 2 | 4 | 2 × 30720 TS | 39.30 |

Meanwhile, the table for the available UL SF which may be applied may be configured to be predetermined according to the TC value of the preamble format.

That is, a table for available UL SF to be referred to according to the preamble format or a length of the preamble format configured by the UE may be configured to be determined.

For example, considering Table 8 above, UEs configured to use formats 0 and 1 may find out available UL SF information by referring to Table 13, UEs configured to use formats 2A and 2 may find out available UL SF information by referring to Table 14, and UE configured to use format 3 may find out the available UL SF information by referring to Table 15.

In respect to an advantage when separating and transmitting the information, an amount of information to be transmitted through the SIB may be reduced as compared with a case where a value of 6 bits (i.e., 64 states) is continuously independently transmitted for all NPRACH configurations (for each CE level and for each carrier).

Specifically, for example, since the number of NPRACH configurations which one eNB may maximally set is 3 (max CE level)×16 (1+max non-carrier number)=48 and 6 bits are required per resource, a total of maximum 48×6=288 bits are required.

However, since the preamble format (i.e., 0, 1, 2A, 2, and 3) is determined by using 3 bits for each CE level and a maximum of 5 bits (i.e., since Table 8 shows 32 states) are required per resource, 3 (max CE level)×3 (max preamble format)+3 (max CE level)×16 (1+max non-anchor carrier number)×5=249 bits are required.

When preamble format 3 is used in all CE levels, since 3 bits are required per resource, 3 (max CE level)×3 (max preamble format)+3 (max CE level)×16 (1+max non-anchor carrier number)×3=153 bits are required.

Therefore, a maximum of 135 bits (approximately 46%) may be reduced.

Additionally, when it is assumed that the number of preamble formats which may be configured may be changed depending on the UL/DL configuration proposed above, a maximum of 141 bits (approximately 49%) may be reduced.

Table 13 is a table showing an example of the NPRACH configuration table for TC=1 ms (formats 0 and 1 in Table 6).

TABLE 13

| NPRACH configuration Index | UL/DL configuration | | | | | | |
|---|---|---|---|---|---|---|---|
| | 0 | 1 | 2 | 3 | 4 | 5 | 6 |
| 0 | (1, 0, 2) | (1, 0, 1) | (1, 0, 0) | (1, 0, 2) | (1, 0, 1) | (1, 0, 0) | (1, 0, 2) |
| 1 | (2, 0, 2) | (2, 0, 1) | (2, 0, 0) | (2, 0, 2) | (2, 0, 1) | (2, 0, 0) | (2, 0, 2) |
| 2 | (1, 1, 2) | (1, 1, 1) | (1, 1, 0) | (1, 0, 1) | (1, 0, 0) | N/A | (1, 1, 1) |
| 3 | (0, 0, 2) | (0, 0, 1) | (0, 0, 0) | (0, 0, 2) | (0, 0, 1) | (0, 0, 0) | (0, 0, 2) |
| 4 | (0, 1, 2) | (0, 1, 1) | (0, 1, 0) | (0, 0, 1) | (0, 0, 0) | N/A | (0, 1, 1) |
| 5 | (0, 0, 1) | (0, 0, 0) | N/A | (0, 0, 0) | N/A | N/A | (0, 0, 1) |
| 6 | (0, 0, 2) | (0, 0, 1) | (0, 0, 0) | (0, 0, 1) | (0, 0, 0) | N/A | (0, 0, 2) |
| | (0, 1, 2) | (0, 1, 1) | (0, 1, 0) | (0, 0, 2) | (0, 0, 1) | | (0, 1, 1) |
| 7 | (0, 0, 1) | (0, 0, 0) | N/A | (0, 0, 0) | N/A | N/A | (0, 0, 1) |
| | (0, 1, 1) | (0, 1, 0) | | (0, 0, 2) | | | (0, 1, 0) |
| 8 | (0, 0, 0) | N/A | N/A | (0, 0, 0) | N/A | N/A | (0, 0, 0) |
| | (0, 1, 0) | | | (0, 0, 1) | | | (0, 1, 1) |

TABLE 13-continued

| NPRACH configuration Index | UL/DL configuration | | | | | | |
|---|---|---|---|---|---|---|---|
| | 0 | 1 | 2 | 3 | 4 | 5 | 6 |
| 9 | (0, 0, 1) (0, 0, 2) (0, 1, 2) | (0, 0, 0) (0, 0, 1) (0, 1, 1) | N/A | (0, 0, 0) (0, 0, 1) (0, 0, 2) | N/A | N/A | (0, 0, 1) (0, 0, 2) (0, 1, 1) |
| 10 | (0, 0, 0) (0, 1, 0) (0, 1, 1) | (0, 0, 1) (0, 1, 0) (0, 1, 1) | N/A | N/A | N/A | N/A | (0, 0, 0) (0, 0, 2) (0, 1, 0) |
| 11 | N/A | (0, 0, 0) (0, 0, 1) (0, 1, 0) | N/A | N/A | N/A | N/A | (0, 0, 1) (0, 1, 0) (0, 1, 1) |
| 12 | (0, 0, 1) (0, 0, 2) (0, 1, 1) (0, 1, 2) | (0, 0, 0) (0, 0, 1) (0, 1, 0) (0, 1, 1) | N/A | N/A | N/A | N/A | (0, 0, 1) (0, 0, 2) (0, 1, 0) (0, 1, 1) |
| 13 | (0, 0, 0) (0, 0, 2) (0, 1, 0) (0, 1, 2) | N/A | N/A | N/A | N/A | N/A | (0, 0, 0) (0, 0, 1) (0, 0, 2) (0, 1, 1) |
| 14 | (0, 0, 0) (0, 0, 1) (0, 1, 0) (0, 1, 1) | N/A | N/A | N/A | N/A | N/A | (0, 0, 0) (0, 0, 2) (0, 1, 0) (0, 1, 1) |
| 15 | (0, 0, 0) (0, 0, 1) (0, 0, 2) (0, 1, 1) (0, 1, 2) | N/A | N/A | N/A | N/A | N/A | (0, 0, 0) (0, 0, 1) (0, 0, 2) (0, 1, 0) (0, 1, 1) |
| 16 | (0, 0, 1) (0, 0, 2) (0, 1, 0) (0, 1, 1) (0, 1, 2) | N/A | N/A | N/A | N/A | N/A | N/A |
| 17 | (0, 0, 0) (0, 0, 1) (0, 0, 2) (0, 1, 0) (0, 1, 2) | N/A | N/A | N/A | N/A | N/A | N/A |
| 18 | (0, 0, 0) (0, 0, 1) (0, 0, 2) (0, 1, 0) (0, 1, 1) (0, 1, 2) | N/A | N/A | N/A | N/A | N/A | N/A |
| 19-31 | N/A | N/A | N/A | N/A | N/A | N/A | N/A |

Table 14 is a table showing an example of the NPRACH configuration table for TC=2 ms (formats 2A and 2 in Table 6).

TABLE 14

| NPRACH configuration Index | UL/DL configuration | | | | | | |
|---|---|---|---|---|---|---|---|
| | 0 | 1 | 2 | 3 | 4 | 5 | 6 |
| 0 | (1, 0, 1) | (1, 0, 0) | N/A | (1, 0, 1) | (1, 0, 0) | N/A | (1, 0, 1) |
| 1 | (2, 0, 1) | (2, 0, 0) | N/A | (2, 0, 1) | (2, 0, 0) | N/A | (2, 0, 1) |
| 2 | (1, 1, 1) | (1, 1, 0) | N/A | N/A | N/A | N/A | (1, 1, 0) |
| 3 | (0, 0, 1) | (0, 0, 0) | N/A | (0, 0, 1) | (0, 0, 0) | N/A | (0, 0, 1) |
| 4 | (0, 1, 1) | (0, 1, 0) | N/A | N/A | N/A | N/A | (0, 1, 0) |
| 5 | (0, 0, 1) (0, 1, 1) | (0, 0, 0) (0, 1, 0) | N/A | N/A | N/A | N/A | (0, 0, 1) (0, 1, 0) |
| 6-7 | N/A | N/A | N/A | N/A | N/A | N/A | N/A |

Table 15 is a table showing an example of the NPRACH configuration table for TC=3 ms (format 3 in Table 6).

TABLE 15

| NPRACH configuration | UL/DL configuration | | | | | | |
|---|---|---|---|---|---|---|---|
| Index | 0 | 1 | 2 | 3 | 4 | 5 | 6 |
| 0 | (1, 0, 0) | N/A | N/A | (1, 0, 0) | N/A | N/A | (1, 0, 0) |
| 1 | (2, 0, 0) | N/A | N/A | (2, 0, 0) | N/A | N/A | (2, 0, 0) |
| 2 | (1, 1, 0) | N/A | N/A | N/A | N/A | N/A | N/A |
| 3 | (0, 0, 0) | N/A | N/A | (0, 0, 0) | N/A | N/A | (0, 0, 0) |
| 4 | (0, 1, 0) | N/A | N/A | N/A | N/A | N/A | N/A |
| 5 | (0, 0, 0) (0, 1, 0) | N/A | N/A | N/A | N/A | N/A | N/A |
| 6-7 | N/A | N/A | N/A | N/A | N/A | N/A | N/A |

Additionally, since it is predicted that the existing UL/DL configurations #0 and #6 are not used in TDD NB-IoT, when this is reflected, Tables 9, 13, 14, and 15 may be changed and used as in Tables 16, 17, 18, and 19 below.

In this case, the advantage mentioned above becomes more prominent. That is, when a total of 48×6=288 bits are required in the related art, the preamble format (i.e., 0, 1, 2A, 2, and 3) is determined by using 3 bits for each CE level and a maximum of 4 bits (i.e., since Table 17 shows 16 states) are required per resource, and as a result, 3 (max CE level)×3 (max preamble format)+3 (max CE level)×16(1+max non-anchor carrier number)×4=201 bits are required.

When preamble format 3 is used in all CE levels, since 2 bits are required per resource, 3 (max CE level)×3 (max preamble format)+3 (max CE level)×16 (1+max non-anchor carrier number)×2=105 bits are required.

That is, a maximum of 183 bits (approximately 64%) may be reduced.

Additionally, when it is assumed that the number of preamble formats which may be configured may be changed depending on the UL/DL configuration proposed above, a maximum of 189 bits (approximately 66%) may be reduced.

Table 16 is a table showing an example of the NPRACH configuration without UL/DL configurations #0 and #6.

TABLE 16

| NPRACH configuration | Preamble | UL/DL configuration | | | | |
|---|---|---|---|---|---|---|
| Index | Format | 1 | 2 | 3 | 4 | 5 |
| 0 | 0 | (1, 0, 1) | (1, 0, 0) | (1, 0, 2) | (1, 0, 1) | (1, 0, 0) |
| 1 | 1 | | | | | |
| 2 | 0 | (2, 0, 1) | (2, 0, 0) | (2, 0, 2) | (2, 0, 1) | (2, 0, 0) |
| 3 | 1 | | | | | |
| 4 | 0 | (1, 1, 1) | (1, 1, 0) | (1, 0, 1) | (1, 0, 0) | N/A |
| 5 | 1 | | | | | |
| 6 | 0 | (0, 0, 1) | (0, 0, 0) | (0, 0, 2) | (0, 0, 1) | (0, 0, 0) |
| 7 | 1 | | | | | |
| 8 | 0 | (0, 1, 1) | (0, 1, 0) | (0, 0, 1) | (0, 0, 0) | N/A |
| 9 | 1 | | | | | |
| 10 | 0 | (0, 0, 0) | N/A | (0, 0, 0) | N/A | N/A |
| 11 | 1 | | | | | |
| 12 | 0 | (0, 0, 1) | (0, 0, 0) | (0, 0, 1) | (0, 0, 0) | N/A |
| 13 | 1 | (0, 1, 1) | (0, 1, 0) | (0, 0, 2) | (0, 0, 1) | |
| 14 | 0 | (0, 0, 0) | N/A | (0, 0, 0) | N/A | N/A |
| 15 | 1 | (0, 1, 0) | | (0, 0, 2) | | |
| 16 | 0 | N/A | N/A | (0, 0, 0) | N/A | N/A |
| 17 | 1 | | | (0, 0, 1) | | |
| 18 | 0 | (0, 0, 0) | | (0, 0, 0) | | |
| 19 | 1 | (0, 0, 1) (0, 1, 1) | N/A | (0, 0, 1) (0, 0, 2) | N/A | N/A |

TABLE 16-continued

| NPRACH configuration | Preamble | UL/DL configuration | | | | |
|---|---|---|---|---|---|---|
| Index | Format | 1 | 2 | 3 | 4 | 5 |
| 20 | 0 | (0, 0, 1) (0, 1, 0) (0, 1, 1) | N/A | N/A | N/A | N/A |
| 21 | 1 | | | | | |
| 22 | 0 | (0, 0, 0) (0, 0, 1) (0, 1, 0) | N/A | N/A | N/A | N/A |
| 23 | 1 | | | | | |
| 24 | 0 | (0, 0, 0) (0, 0, 1) (0, 1, 0) (0, 1, 1) | N/A | N/A | N/A | N/A |
| 25 | 1 | | | | | |
| 26 | 2A | (1, 0, 0) | N/A | (1, 0, 1) | (1, 0, 0) | N/A |
| 27 | 2 | | | | | |
| 28 | 2A | (2, 0, 0) | N/A | (2, 0, 1) | (2, 0, 0) | N/A |
| 29 | 2 | | | | | |
| 30 | 2A | (1, 1, 0) | N/A | N/A | N/A | N/A |
| 31 | 2 | | | | | |
| 32 | 2A | (0, 0, 0) | N/A | (0, 0, 1) | (0, 0, 0) | N/A |
| 33 | 2 | | | | | |
| 34 | 2A | (0, 1, 0) | N/A | N/A | N/A | N/A |
| 35 | 2 | | | | | |
| 36 | 2A | (0, 0, 0) (0, 1, 0) | N/A | N/A | N/A | N/A |
| 37 | 2 | | | | | |
| 38 | 3 | N/A | N/A | (1, 0, 0) | N/A | N/A |
| 39 | 3 | N/A | N/A | (2, 0, 0) | N/A | N/A |
| 40 | 3 | N/A | N/A | (0, 0, 0) | N/A | N/A |
| 41-63 | N/A | N/A | N/A | N/A | N/A | N/A |

Table 17 is a table showing an example of the NPRACH configuration for TC=1 ms (formats 0 and 1 in Table 6) without UL/DL configurations #0 and #6.

TABLE 17

| NPRACH configuration | UL/DL configuration | | | | |
|---|---|---|---|---|---|
| Index | 1 | 2 | 3 | 4 | 5 |
| 0 | (1, 0, 1) | (1, 0, 0) | (1, 0, 2) | (1, 0, 1) | (1, 0, 0) |
| 1 | (2, 0, 1) | (2, 0, 0) | (2, 0, 2) | (2, 0, 1) | (2, 0, 0) |
| 2 | (1, 1, 1) | (1, 1, 0) | (1, 0, 1) | (1, 0, 0) | N/A |
| 3 | (0, 0, 1) | (0, 0, 0) | (0, 0, 2) | (0, 0, 1) | (0, 0, 0) |
| 4 | (0, 1, 1) | (0, 1, 0) | (0, 0, 1) | (0, 0, 0) | N/A |
| 5 | (0, 0, 0) | N/A | (0, 0, 0) | N/A | N/A |
| 6 | (0, 0, 1) (0, 1, 1) | (0, 0, 0) (0, 1, 0) | (0, 0, 1) (0, 0, 2) | (0, 0, 0) (0, 0, 1) | N/A |
| 7 | (0, 0, 0) (0, 1, 0) | N/A | (0, 0, 0) (0, 0, 2) | N/A | N/A |
| 8 | N/A | N/A | (0, 0, 0) (0, 0, 1) | N/A | N/A |
| 9 | (0, 0, 0) (0, 0, 1) (0, 1, 1) | N/A | (0, 0, 0) (0, 0, 1) (0, 0, 2) | N/A | N/A |
| 10 | (0, 0, 1) (0, 1, 0) (0, 1, 1) | N/A | N/A | N/A | N/A |
| 11 | (0, 0, 0) (0, 0, 1) (0, 1, 0) | N/A | N/A | N/A | N/A |
| 12 | (0, 0, 0) (0, 0, 1) (0, 1, 0) (0, 1, 1) | N/A | N/A | N/A | N/A |
| 13-15 | N/A | N/A | N/A | N/A | N/A |

Table 18 is a table showing an example of the NPRACH configuration for TC=2 ms (formats 2A and 2 in Table 6) without UL/DL configurations #0 and #6.

TABLE 18

| NPRACH configuration | UL/DL configuration | | | | |
|---|---|---|---|---|---|
| Index | 1 | 2 | 3 | 4 | 5 |
| 0 | (1, 0, 0) | N/A | (1, 0, 1) | (1, 0, 0) | N/A |
| 1 | (2, 0, 0) | N/A | (2, 0, 1) | (2, 0, 0) | N/A |
| 2 | (1, 1, 0) | N/A | N/A | N/A | N/A |
| 3 | (0, 0, 0) | N/A | (0, 0, 1) | (0, 0, 0) | N/A |
| 4 | (0, 1, 0) | N/A | N/A | N/A | N/A |
| 5 | (0, 0, 0) (0, 1, 0) | N/A | N/A | N/A | N/A |
| 6-7 | N/A | N/A | N/A | N/A | N/A |

Table 19 is a table showing an example of the NPRACH configuration for TC=1 ms (format 3 in Table 6) without UL/DL configurations #0 and #6.

TABLE 19

| NPRACH configuration | UL/DL configuration | | | | |
|---|---|---|---|---|---|
| Index | 1 | 2 | 3 | 4 | 5 |
| 0 | N/A | N/A | (1, 0, 0) | N/A | N/A |
| 1 | N/A | N/A | (2, 0, 0) | N/A | N/A |
| 2 | N/A | N/A | (0, 0, 0) | N/A | N/A |
| 3 | N/A | N/A | N/A | N/A | N/A |

Additionally, common information such as the preamble format configured to be used at the same CE level may be configured to be configured via SIB (e.g., SIB2-NB).

Characteristically, the corresponding common information may be configured to be continuously applied in all carriers (anchor+non-anchor(s)) constituting the NPRACH configuration regardless of an operation mode.

Additionally, since the information is configured independently (configured in the SIB22-NB because of a non-anchor configuration) by using an additional field according to each carrier (non-carriers other than the anchor), the information may be configured to be changeable.

That is, when there is no corresponding additional field, the common information carried through the SIB (e.g., SIB2-NB) may be configured to be applied.

Characteristically, such an additional operation may be introduced in a standalone mode.

Furthermore, even in the available UL SF to be defined at the same CE level, the transmitted common information may be configured to be used through the SIB (e.g., SIB2-NB).

Characteristically, the corresponding common information may be configured to be continuously applied in all carriers (anchor+non-anchor(s)) constituting the NPRACH configuration regardless of an operation mode.

Additionally, since the information is configured independently (configured in the SIB22-NB because of a non-anchor configuration) by using an additional field according to each carrier (non-carriers other than the anchor), the information may be configured to be changeable.

That is, when there is no corresponding additional field, the common information carried to the SIB (e.g., SIB2-NB) may be configured to be applied.

Characteristically, such an additional operation may be introduced in a standalone mode.

When such a scheme is introduced, there is an advantage that more bits may be reduced, but since the position of the available UL SF is the same regardless of the carrier, a quantity of UL resources of the anchor carrier probably becomes a bottleneck so that the resource of the non-anchor carrier may not be efficiently used.

However, such a method may be considered due to an advantage that the amount of information to be transmitted through the SIB is small.

Additionally, even in the preamble format and/or available UL SF to be used regardless of the CE level and the carrier type, the transmitted common information may be configured to be used through the SIB (e.g., SIB2-NB).

This configuration has an advantage that the amount of configured information is remarkably reduced, but a disadvantage that factors for supporting different MCL for each CE level are restricted to only the repetition number and/or a disadvantage in terms of resource utilization.

Additionally, the eNB may configure whether to use repetition number 1 according to a specific NPRACH preamble format to the UE through the SIB (e.g., SIB2-NB).

Characteristically, the corresponding information may be common information having the same value regardless of the CE level and/or carrier type.

Specifically, when a specific eNB configures format 1, format 2, and format 3 in which G=2 and P=4 among five formats defined in Table 6 above to the UEs, whether to use repetition number 1 may be configured to be selected and notified.

In this case, it is apparent that a repetition number to be actually used also needs to be configured.

In a method for notifying the contents, first, (1) a repetition number set may be defined as the same value (i.e., {n1, n2, n4, n8, n16, n32, n64, n128}) as FDD in the standard document in advance, and whether to use repetition #1 may be indicated as on or off by using a 1-bit flag through the SIB.

Such a method has an advantage that the corresponding information may be notified by only additional 1 bit. Second, (2) in the other method, one of two different repetition number sets including or not including repetition #1 may be configured to the UE through the SIB (e.g., SIB2-NB).

For example, two different repetition number sets may be constituted by {n1, n2, n4, n8, n16, n32, n64, n128} and {n2, n4, n8, n16, n24, n32, n64, n128}.

Such a method has an advantage that the eNB may more efficiently use the UL resource by further including one intermediate value such as n24 instead of not using repetition #1.

As described above, a reason for selectively selecting the repetition number by the eNB is that performance may be guaranteed even though the eNB uses repetition #1 according to implementation (e.g., ML type receiver) or the performance may not be guaranteed in the case of using repetition #1 (e.g., Differential type receiver).

It is apparent that the proposals, method, and alternatives described above may be applied even in method 2 to be described below and methods therethan.

(Method 2)

Method 2 relates to a method in which a starting UL SF that may be transmitted is first configured according to the TC and the UL/DL configuration and the eNB then transmits the starting UL SF to the UE with the NPRACH configuration index through the system information (e.g., SIB2-NB).

In this case, characteristically, it is preferable that there is one starting UL SF (although a plurality of starting UL SF is possible) for each NPRACH configuration index.

The reason is that it is advantageous that a starting SF of a preamble to be transmitted to NPRACH resources configured by the same CE level is unified into one in terms of eNB reception and decoding.

Additionally, for preamble repetition (in this case, the repetition number is configured via the system information (e.g., SIB2-NB)), the period between the starting UL SFs may be configured to be transmitted through the system information (e.g., SIB2-NB).

In this method, when the starting SF is defined differently from method 2 and the UE decides to start transmission of the preamble to the corresponding starting SF, the UE may be configured to transmit the preamble as large as the configured repetition number by using UL SFs which exist after starting from the starting UL SF.

In other words, although method 2 may be considered as a special case of method 1 described above, it is advantageous that the NPRACH configuration index may be configured to be smaller than method 1.

That is, in method 2, overload of the SIB is reduced.

For example, a table for the above configuration may be the same as shown in Table 20, and when Table 20 is compared with Table 7, it can be seen that Table 20 is configured only by less states than Table 7.

Figure 13:
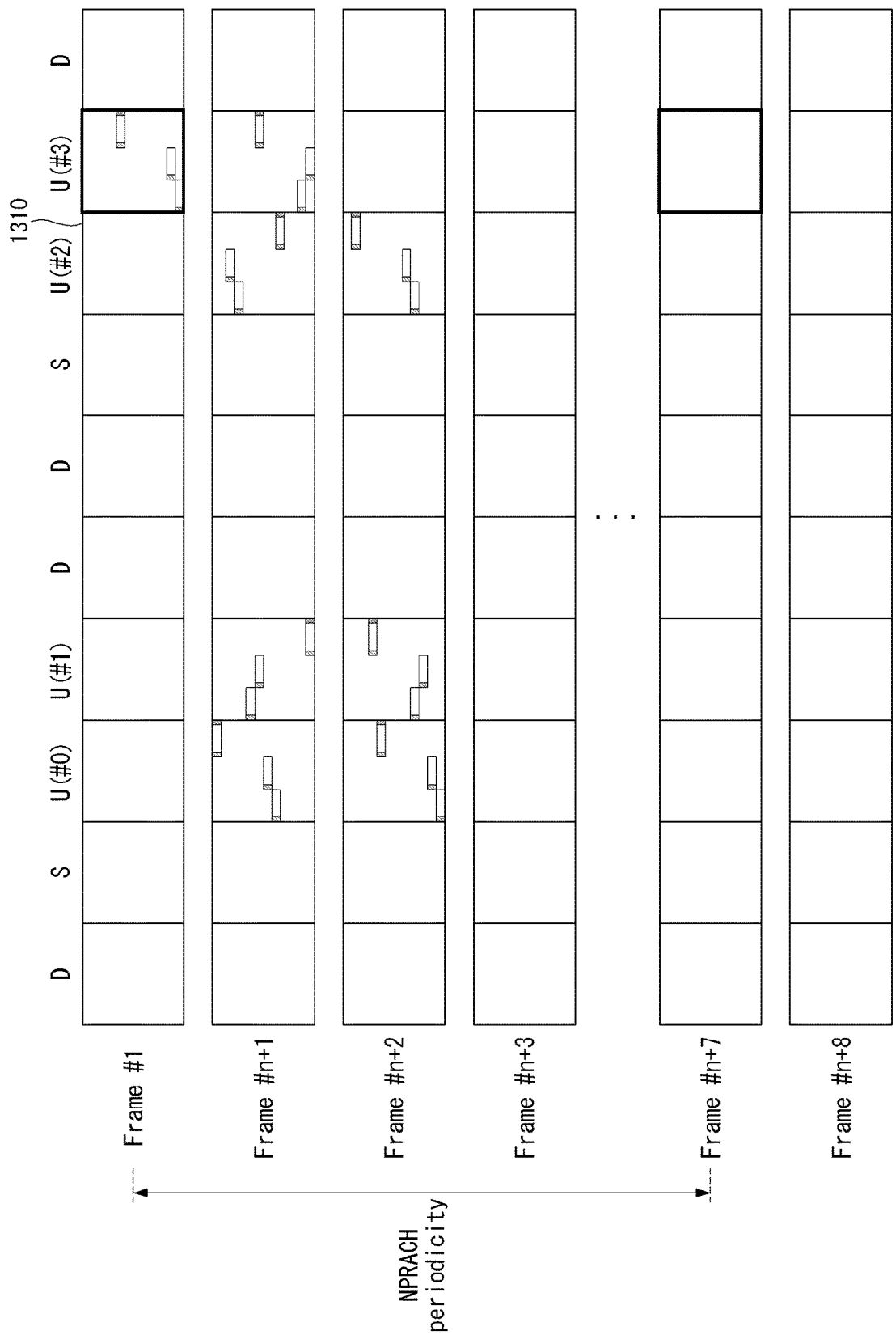
FIG. 13 is a diagram illustrating an example of transmission of a preamble proposed by this specification.

Table 20 is a table showing an example of the NPRACH configuration.

preamble repetition number as '8', is configured with the NPRACH periodicity as '80 ms', and is configured with the UL/DL configuration as '#1', the UE may transmit the preamble as illustrated in FIG. 13.

Here, since the NPRACH configuration index is 8, the preamble format is 0 and a starting UL subframe becomes a second UL subframe of a second half frame.

For reference, in method 2, it is configured that the preamble may be transmitted in all UL subframes unless there is a special restriction.

Further, the preamble starting point may be 1310 when a start radio frame rule and the NPRACH periodicity are considered.

In addition, since the repetition number is 8, it can be seen that a single preamble (i.e., 3 consecutive symbol groups) is repeatedly transmitted through 8 UL SFs.

Characteristically, when positive hopping and negative hopping are configured to coexist during preamble repetition transmission, the following rules may be configured to be used.

(Rule I)

An initial preamble may be configured to be transmitted by the positive hopping or the negative hopping according to an arbitrarily selected subcarrier index (similarly in FDD).

TABLE 20

| NPRACH configuration Index | Preamble Format | UL/DL configuration | | | | | | |
|---|---|---|---|---|---|---|---|---|
| | | 0 | 1 | 2 | 3 | 4 | 5 | 6 |
| 0 | 0 | (1, 0, 2) | (1, 0, 1) | (1, 0, 0) | (1, 0, 2) | (1, 0, 1) | (1, 0, 0) | (1, 0, 2) |
| 1 | 1 | | | | | | | |
| 2 | 0 | (2, 0, 2) | (2, 0, 1) | (2, 0, 0) | (2, 0, 2) | (2, 0, 1) | (2, 0, 0) | (2, 0, 2) |
| 3 | 1 | | | | | | | |
| 4 | 0 | (1, 1, 2) | (1, 1, 1) | (1, 1, 0) | (1, 0, 1) | (1, 0, 0) | N/A | (1, 1, 1) |
| 5 | 1 | | | | | | | |
| 6 | 0 | (0, 0, 2) | (0, 0, 1) | (0, 0, 0) | (0, 0, 2) | (0, 0, 1) | (0, 0, 0) | (0, 0, 2) |
| 7 | 1 | | | | | | | |
| 8 | 0 | (0, 1, 2) | (0, 1, 1) | (0, 1, 0) | (0, 0, 1) | (0, 0, 0) | N/A | (0, 1, 1) |
| 9 | 1 | | | | | | | |
| 10 | 0 | (0, 0, 1) | (0, 0, 0) | N/A | (0, 0, 0) | N/A | N/A | (0, 0, 1) |
| 11 | 1 | | | | | | | |
| 12 | 0 | (0, 1, 1) | (0, 1, 0) | N/A | N/A | N/A | N/A | (0, 1, 0) |
| 13 | 1 | | | | | | | |
| 14 | 0 | (0, 0, 0) | N/A | N/A | N/A | N/A | N/A | (0, 0, 0) |
| 15 | 1 | | | | | | | |
| 16 | 0 | (0, 1, 0) | N/A | N/A | N/A | N/A | N/A | N/A |
| 17 | 1 | | | | | | | |
| 18 | 2 | (1, 0, 1) | (1, 0, 0) | N/A | (1, 0, 1) | (1, 0, 0) | N/A | (1, 0, 1) |
| 19 | 2 | (2, 0, 1) | (2, 0, 0) | N/A | (2, 0, 1) | (2, 0, 0) | N/A | (2, 0, 1) |
| 20 | 2 | (1, 1, 1) | (1, 1, 0) | N/A | N/A | N/A | N/A | (1, 1, 0) |
| 21 | 2 | (0, 0, 1) | (0, 0, 0) | N/A | (0, 0, 1) | (0, 0, 0) | N/A | (0, 0, 1) |
| 22 | 2 | (0, 1, 1) | (0, 1, 0) | N/A | (0, 0, 0) | N/A | N/A | (0, 1, 0) |
| 23 | 2 | (0, 0, 0) | N/A | N/A | N/A | N/A | N/A | (0, 0, 0) |
| 24 | 2 | (0, 1, 0) | N/A | N/A | N/A | N/A | N/A | N/A |
| 25 | 3 | (1, 0, 0) | N/A | N/A | (1, 0, 0) | N/A | N/A | (1, 0, 0) |
| 26 | 3 | (2, 0, 0) | N/A | N/A | (2, 0, 0) | N/A | N/A | (2, 0, 0) |
| 27 | 3 | (1, 1, 0) | N/A | N/A | N/A | N/A | N/A | N/A |
| 28 | 3 | (0, 0, 0) | N/A | N/A | (0, 0, 0) | N/A | N/A | (0, 0, 0) |
| 29 | 3 | (0, 1, 0) | N/A | N/A | N/A | N/A | N/A | N/A |
| 30 | N/A | N/A | N/A | N/A | N/A | N/A | N/A | N/A |
| 31 | N/A | N/A | N/A | N/A | N/A | N/A | N/A | N/A |

A case where the UE receives the NPRACH configuration index, the available UL SF, the preamble repetition number, the NPRACH periodicity, the UL/DL configuration, and the like from the eNB through the SIB will be described as an example.

When the UE is configured with the NPRACH configuration index as '8' (see Table 20), is configured with the (Rule II-1)

When the UE transmits the preamble to the previous UL SF and there is a UL SF capable of transmitting the preamble immediately after the transmission of the preamble, the preamble may be configured to be transmitted by randomly selecting one of subcarriers which may be transmitted hopping in an opposite direction (in the case of the previous positive hopping, negative hopping at this time and in the case of the previous negative hopping, positive hopping at this time) to the previously transmitted hopping.

(Rule II-2)

When the UE transmits the preamble to the previous UL SF and there is no UL SF capable of transmitting the preamble immediately after the transmission of the preamble (i.e., when a next SF is a downlink subframe), the preamble may be configured to be transmitted by using the positive hopping or negative hopping according to the arbitrarily selected subcarrier index in a first UL SF capable of transmitting the preamble which exists thereafter.

Such a rule may be applied to a preamble format defined so that the single preamble is within 1 ms and applied even when the single preamble is configured by the sum of G symbol groups which may be separated and transmitted.

FIG. 13 is a diagram illustrating an example of transmission of a preamble proposed by this specification.

Additionally, a case where other UEs may not transmit the UL data due to transmission of a preamble occupying the UL SF for a long time may occur.

Accordingly, a UL SF gap for UL data transmission of other UEs may be defined in the middle of transmission of the NPRACH preamble.

The eNB may be configured to configurably transmit the UL SF gap through the system information (e.g., SIB2-NB).

Hereinafter, a method that may inform the UL SF gap will be described in more detail.

(Alternative 1)

Alternative 1 relates to a method in which the UL SF gap is defined as the number of UL SFs which the UE needs to skip and the eNB transmits the corresponding information to the UE through the system information (e.g., SIB2-NB) together with the NPRACH configuration.

For example, the UL SF gap may be previously designated or defined in a standard document as a specific set such as {1SF, 2SF, 3SF, 4SF, 5SF, 6SF, 8SF, 16SF, 32SF}, etc.

Characteristically, only when the configured preamble repetition value is equal to or more than a specific value NConsecutive_TX (e.g., NConsecutive_TX=16) (or first specific value), the eNB may be configured to configure the UL SF gap.

Additionally, after a preamble repetition as large as a specific value MConsecutive_TX (e.g., 32) (or second specific value) is completed, the UL SF gap may be configurably configured so as to be defined.

Characteristically, when the eNB does not transmit the MConsecutive_TX value, the MConsecutive_TX value may become the NConsecutive_TX value defined above.

In this case, defining NConsecutive_TX MConsecutive_TX may be preferable.

(Alternative 2)

The UL SF gap is defined as the NPRACH preamble transmission period and the eNB may transmit the corresponding information to the UE through the system information (e.g., SIB2-NB) together with the NPRACH configuration.

For example, the UL SF gap may be previously designated or defined in the standard document like {5 ms, 10 ms}.

Characteristically, Alternative 2 may be applied when the eNB configures a preamble format that needs to use the UpPTS symbol.

Here, when the preamble repetition is larger than 1, the preamble transmission period is set to 5 ms or 10 ms so that the preamble may be configured to be continuously transmitted in the UpPTS symbol+the UL SF.

(Alternative 3)

Alternative 3 is a method that may prevent long occupation for NPRACH preamble transmission on a specific carrier by transmitting a hopping flag.

The aforementioned alternatives may be simultaneously applied and used. That is, a combination of alternatives 1 and 3 or a combination of alternatives 2 and 3 may be possible.

When the eNB does not transmit UL SF gap related parameters (e.g., UL SF gap or NPRACH preamble transmission period) or the eNB transmits the UL SF gap related parameters, but the UE does not receive the UL SF gap related parameters, the UL SF gap related parameters may be configured to be transmitted as large as the repetition number configured through the UL SF (i.e., the UE may know the corresponding UL SF through the NPRACH configuration) capable of transmitting the actual preamble by starting preamble transmission from the preconfigured starting UL SF.

In addition, when a situation is considered in which a preamble format (e.g., a preamble format whose TC is slightly larger than 1 ms, where the TC is desired to be smaller than 2 ms) needs to use the UpPTS symbol (where the number of UpPTS symbols is configurable) and the repetition number which is not yet transmitted remains, if the eNB does not transmit the UL SF gap related parameters to the UE (i.e., when the preamble repetition transmission may be performed by using the UL SFs capable of transmitting the actual preamble by starting from the configured starting UL SF), the UE may operate in one of the following methods.

That is, the UE may be configured to repeat one of the following methods until the remaining repetition number is lost.

(Alternative A)

(the number of UpPTS symbols configured)×(the number of consecutive UL SFs among the UL SFs capable of transmitting the actual preamble) is regarded as the number of UpPTS symbols that may be used for preamble transmission.

In addition, a point advanced by the calculated number of UpPTS symbols is regarded as a starting point of the preamble transmission and the preamble (or mini-preamble) corresponding to the TC is repeatedly transmitted as large as the number of consecutive UL SFs.

In this case, the mini-preamble is a subset of the preamble and a structure in which the mini-preambles are collected to form one preamble may be considered.

(Alternative B)

The point advanced by the number of configured UpPTS symbols is regarded as the starting point and the preamble (or mini-preamble) corresponding to the TC may be repeatedly transmitted as large as the number of consecutive UL SFs among the UL SFs capable of transmitting the actual preamble.

In this case, since ends of the repeatedly transmitted symbol groups invade a region of the UL SF or DL SF which is not capable of transmitting the actual preamble, it may be configured such that a symbol(s) which invade the region of the UL SF or DL SF which is not capable of transmitting the actual preamble among symbols of a last symbol group is dropped and the corresponding time duration is included in the GT.

However, when the number of symbols constituting the symbol group is N and the number of symbols to be dropped is N, it may be preferable that alternative B above is not used.

The reason is that dropping the N symbols may mean dropping all except for only the CP of the symbol group.

The reason is that the eNB may not use a frequency gap (e.g., 3.75 kHz, 22.5 kHz, etc.) from the immediately preceding symbol group.

Since alternative B uses UpPTS symbols less than those of alternative A, alternative B may less influence legacy LTE. However, since the UE needs to drop a specific symbol(s) constituting the symbol group, damage may occur in terms of MCL.

(Alternative C)

The point advanced by the number of configured UpPTS symbols is regarded as the starting point and the preamble (or mini-preamble) corresponding to the TC may be repeatedly transmitted as large as the number of consecutive UL SFs among the UL SFs capable of transmitting the actual preamble.

In this case, since the ends of the repeatedly transmitted symbol groups invade a UL SF or DL SF which may not transmit the actual preamble, a preamble (or mini-preamble) corresponding to the last TC may be configured to be postponed differently from alternative B described above and the corresponding time duration may be configured to be included in the GT.

In this case, in the case of postpone, when a UL SF which is not consecutive with the last transmitted preamble and is positioned immediately next to the special SF is the UL SF capable of transmitting the actual preamble, the UE may regard the transmission point advanced by the number of configured UpPTS symbols from the corresponding UL SF as a transmission point and transmit the preamble (or mini-preamble) corresponding to the TC which is not transmitted above.

As in method 1, even in method 2, when a case where 5 preamble formats of Table 6 are defined is reflected, Table 20 may be replaced with Table 21 and applied.

In this case, in Table 21, it is assumed that UL/DL configurations #0 and #6 are not used.

Table 21 is a table showing an example of the NPRACH configuration without UL/DL configurations #0 and #6.

TABLE 21

| NPRACH configuration Index | Preamble Format | UL/DL configuration | | | | |
|---|---|---|---|---|---|---|
| | | 1 | 2 | 3 | 4 | 5 |
| 0 | 0 | (1, 0, 1) | (1, 0, 0) | (1, 0, 2) | (1, 0, 1) | (1, 0, 0) |
| 1 | 1 | | | | | |
| 2 | 0 | (2, 0, 1) | (2, 0, 0) | (2, 0, 2) | (2, 0, 1) | (2, 0, 0) |
| 3 | 1 | | | | | |
| 4 | 0 | (1, 1, 1) | (1, 1, 0) | (1, 0, 1) | (1, 0, 0) | N/A |
| 5 | 1 | | | | | |
| 6 | 0 | (0, 0, 1) | (0, 0, 0) | (0, 0, 2) | (0, 0, 1) | (0, 0, 0) |
| 7 | 1 | | | | | |
| 8 | 0 | (0, 1, 1) | (0, 1, 0) | (0, 0, 1) | (0, 0, 0) | N/A |
| 9 | 1 | | | | | |
| 10 | 0 | (0, 0, 0) | N/A | (0, 0, 0) | N/A | N/A |
| 11 | 1 | | | | | |
| 12 | 0 | (0, 1, 0) | N/A | N/A | N/A | N/A |
| 13 | 1 | | | | | |
| 14 | 2A | (1, 0, 0) | N/A | (1, 0, 1) | (1, 0, 0) | N/A |
| 15 | 2 | | | | | |
| 16 | 2A | (2, 0, 0) | N/A | (2, 0, 1) | (2, 0, 0) | N/A |
| 17 | 2 | | | | | |
| 18 | 2A | (1, 1, 0) | N/A | N/A | N/A | N/A |
| 19 | 2 | | | | | |
| 20 | 2A | (0, 0, 0) | N/A | (0, 0, 1) | (0, 0, 0) | N/A |
| 21 | 2 | | | | | |
| 22 | 2A | (0, 1, 0) | N/A | N/A | N/A | N/A |
| 23 | 2 | | | | | |
| 24 | 3 | N/A | N/A | (1, 0, 0) | N/A | N/A |
| 25 | 3 | N/A | N/A | (2, 0, 0) | N/A | N/A |
| 26 | 3 | N/A | N/A | (0, 0, 0) | N/A | N/A |
| 27-31 | 3 | N/A | N/A | N/A | N/A | N/A |

Configurable Details in Enhancement for NB-IoT

Next, configurable details in enhancement for NB-IoT will be described.

In the case of NB-IoT of Rel. 15, reliability/range enhancement for a legacy NPRACH format used in FDD is underway.

In the meantime, symbol level scrambling and symbol group level scrambling are presented as the resolutions for the reliability enhancement.

Hereinafter, a method in which when the symbol level scrambling is additionally applied to the existing preamble format for NPRACH enhancement, the eNB configures the number of symbols to be scrambled by the UE will be described.

That is, when the eNB transmits the NPRACH preamble to the UE through the SIB (e.g., SIB2, SIB22, etc.), the number of symbols to scramble the same value may be configured to be configured at the time of supporting the symbol level scrambling.

Characteristically, the number (e.g., X) of configurable symbols needs to be equal to or smaller than the maximum number (i.e., 6) of symbols which a single symbol group may have.

For example, X may become 1, 2, 3, 6, etc. Here, 4 and 5 may be considered, but preferably, it is preferable to consider divisors for the maximum number of symbols which the single symbol group may have.

The reason is that the divisors are values which may be obtained by dividing the maximum number of symbols equally.

For example, when 6 symbols are scrambled as the same value, it may be considered that this may be equivalent to the symbol group level scrambling.

When such a method is applied, the NPRACH reliability between adjacent cells may be enhanced.

Characteristically, it may be preferable that several cells installed at adjacent places use the same value for each same provider in terms of reducing inter-cell interference.

Additionally, when there are many cases that may be X, it is possible to set a value to be used mainly in advance and make a table for the set value and for the eNB to indicate the value.

Additionally, the eNB may be configured to configure the number of symbols to scramble the same value, but may be configured to select and indicate one of the symbol level and the symbol group level.

This method may have the same result as selecting X between 1 and 6 among the methods mentioned above.

This method also has an advantage of enhancing the NPRACH reliability between the adjacent cells.

Characteristically, it may be preferable that several cells installed at adjacent places use the same value for each same provider in terms of reducing inter-cell interference.

Additionally, the eNB may explicitly (e.g., 1 bit additional field) indicate to the UE whether the enhanced preamble may be used with the legacy NPRACH resource configuration via the SIB (e.g., SIB2 and/or SIB22).

Further, the eNB may indicate a region for the enhanced preamble through resource partitioning of the corresponding legacy NPRACH resource.

The corresponding information may be transmitted to be cell specific and/or CE level specific, but it may be preferable that the corresponding information is transmitted to be NPRACH resource specific (i.e., independently).

The reason is that there is no guarantee that a size of the NPRACH resource is continuously the same because each NPRACH resource may be independently configured.

Further, when the eNB configures the NPRACH resource for the enhanced preamble, an enhanced UE may transmit only the enhanced preamble according to a specific condition, transmit only a legacy preamble, or transmit any one of the enhanced preamble and a legacy preamble.

For example, only a specific preamble (e.g., enhanced preamble and/or legacy preamble) may be transmitted according to a reference signal received power (RSRP) value measured by the UE or according to a CE level value determined through the RSRP value measured by the UE and a threshold value configured from the eNB.

Since the reliability enhancement is to reduce the inter-cell interference, performance of a UE (i.e., a UE having a good RSRP value or a UE at a low CE level) positioned at a cell center may be guaranteed even only by the legacy preamble, and as a result, there is no problem even though either the legacy preamble or the enhanced preamble is used.

On the contrary, it may be preferable that a UE (i.e., a UE having a bad RSRP value or a UE at a high CE level) positioned at a cell edge uses the enhanced preamble for the reliability enhancement.

Additionally, for the enhanced preamble that shares the legacy NPRACH resource, the eNB may be configured to independently configure a resource region for the enhanced preamble for each CE level and/or each carrier.

The corresponding method may be preferable because the eNB efficiently manages the resource and a related legacy configuration is independently configured for each CE level and each carrier.

In this case, a UE that desires to transmit the enhanced preamble may be configured to select one of carriers to which the resource for the enhanced preamble is allocated and transmit MSG1 by reporting NPRACH resources configured in multiple carriers in the same CE level.

Here, MSG1 means the preamble.

More specifically, a carrier for transmitting MSG1 at the same CE level is determined through a probability at present and in this case, a probability for selecting the anchor carrier is configured through the SIB and a probability for selecting one of one or more multiple non-anchor carriers is determined like (1−nprach-ProbabilityAnchor)/(the number of non-anchor NPRACH resources).

Expression of nprach-ProbabilityAnchor/the number of non-anchor NPRACH resources means dividing an nprach-ProbabilityAnchor value by the number of non-anchor NPRACH resources.

When the carrier is selected in the related art, since the UE that desires to transmit the enhanced preamble selects the carrier through a predetermined probability and then, a resource for the corresponding NPRACH resource to transmit the enhanced preamble may not be allocated as a verification result, this is not a preferable operation.

Accordingly, the UE that desires to transmit the enhanced preamble may change values of parameters which enter an equation of a probability for selecting one of the non-anchor carriers as follows.

When the NPRACH resources configured in multiple carriers are verified in the same CE level and the resource for the enhanced preamble is not allocated to the anchor carrier, the UE regards the nprach-ProbabilityAnchor as 0 and determines the probability for selecting the non-anchor carrier.

In addition/alternatively, a value for the number of non-anchor NPRACH resources of the above equation may be configured to determine the probability for selecting the non-anchor carrier by using the number of non-anchor carriers to which the resource for the enhanced preamble is allocated.

When the UE operates as described above, the UE that desires to transmit the enhanced preamble may continuously select the carrier to which the resource for transmitting the enhanced preamble is allocated.

Additionally, in the proposed method, the UEs that desires to transmit the enhanced preamble verify the NPRACH resources configured in multiple carriers in the same CE level, and select one of the carriers to which the resource for the enhanced preamble is allocated and transmit MSG1, but the UE may be configured to operate in one of methods (1) and (2) presented below when there is no carrier to which the resource for the enhanced preamble is allocated.

(1) Since there is no carrier to which the resource for the enhanced preamble is allocated, one of carriers to which a resource for the legacy preamble is allocated may be configured to be selected through a probability configured similarly to a legacy operation to transmit the legacy preamble.

This method is preferable in that a UE that intends to transmit the enhanced preamble selects one carrier and transmits the preamble even though there is no carrier in which the resource for the enhanced preamble is configured in following a legacy RACH procedure.

That is, since there is no carrier that constitutes the NPRACH resource for transmitting the enhanced preamble, the legacy preamble is transmitted to the carrier constituting the legacy NPRARCH resource, but when a random access response (RAR) is not received at a predetermined number of attempts, the UE may be configured to shift to a next CE level and then, select one of the carriers constituting the NPRACH resource for the enhanced preamble in the corresponding CE level to transmit the enhanced preamble like the proposed method.

Similarly even in this case, when there is no carrier constituting the NPRACH resource for the enhanced preamble in the corresponding CE level, one of the carriers constituting the legacy NPRACH resource may be selected to transmit the legacy preamble.

Figure 14:
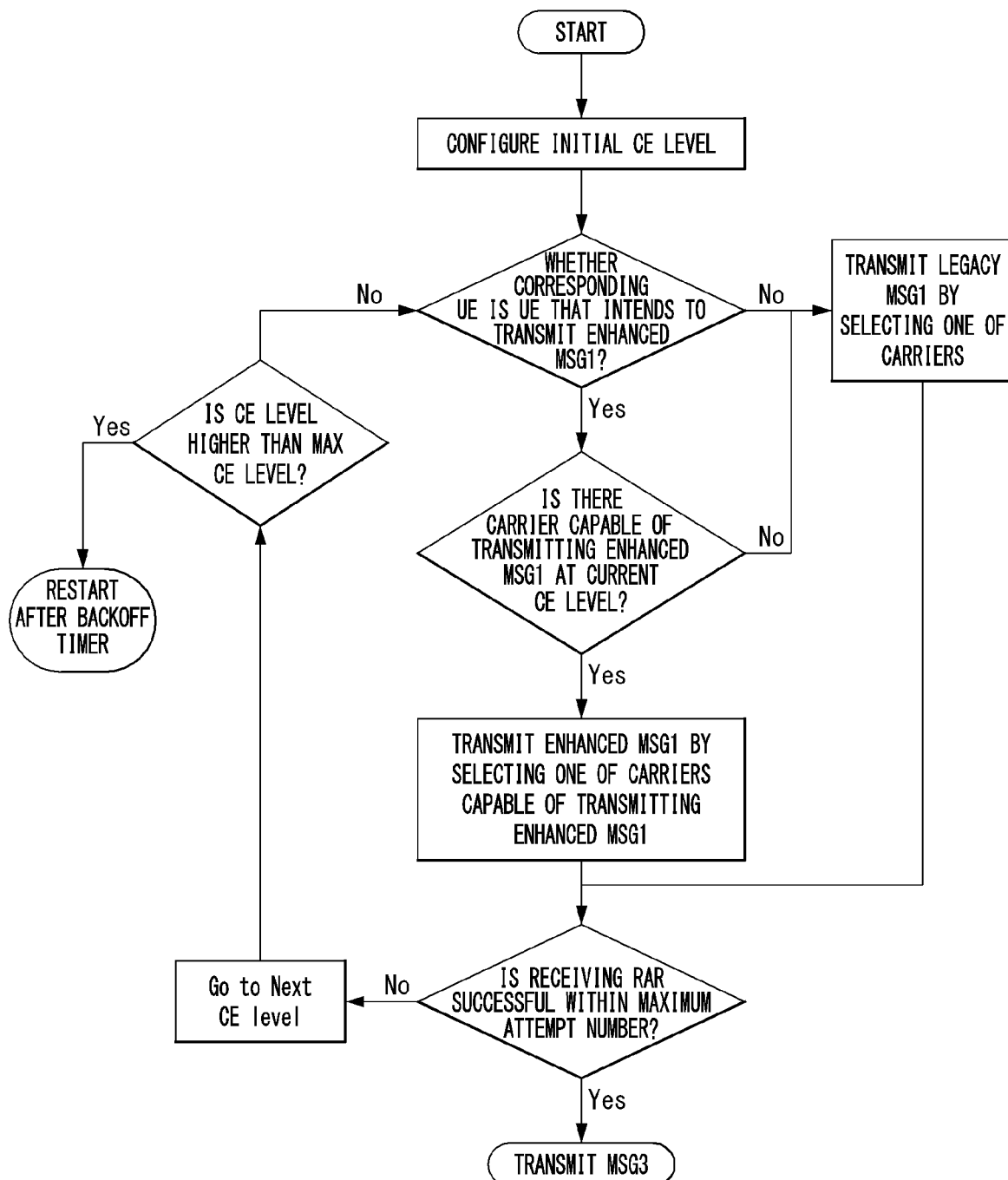
FIG. 14 is a flowchart illustrating an example of a method for transmitting an enhanced preamble proposed by this specification.

A flow for the aforementioned method may be expressed by a flowchart as illustrated in FIG. 14.

FIG. 14 is a flowchart illustrating an example of a method for transmitting an enhanced preamble proposed by this specification.

(2) Since there is no carrier to which the resource for the enhanced preamble is allocated, the UE may be configured to shift to the next CE level, verify the NPRACH resources configured in the multiple carriers in the corresponding CE level, and select one of the carriers to which the resource for the enhanced preamble is allocated to transmit the enhanced preamble.

The corresponding method has an advantage in that the UE that intends to transmit the enhanced preamble may continuously prioritize the transmission of the enhanced preamble.

When there is no carrier in which the NPRACH resource capable of transmitting the enhanced preamble in the corresponding CE level even though the UE shifts to a final CE level, the UE may be configured to start an RACH procedure for transmitting the legacy preamble by returning to an initial CE level.

The following method may operate similarly to the legacy RACH procedure. A flow when method (2) is applied is expressed by the flowchart as illustrated in FIG. 15.

Figure 15:
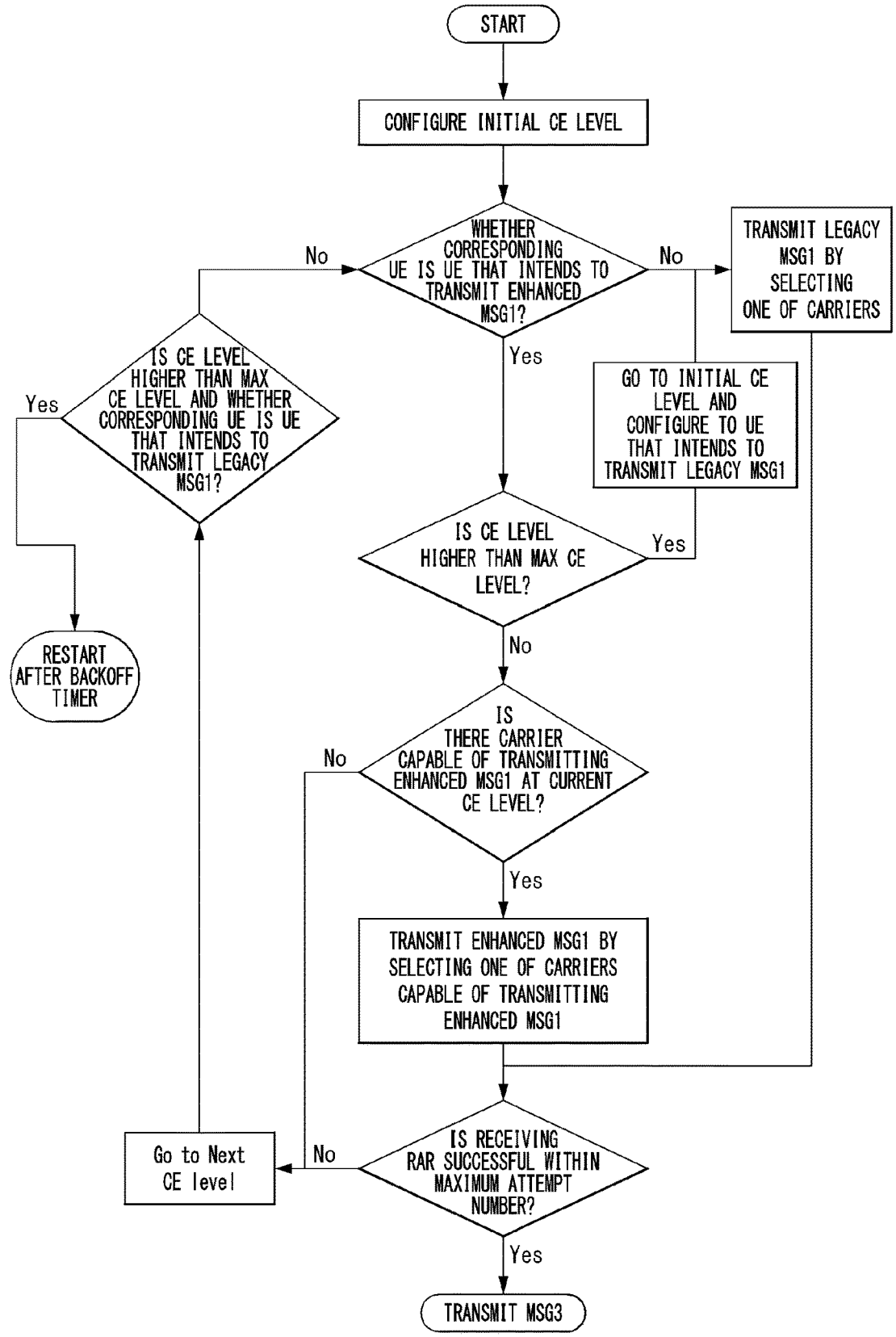
FIG. 15 is a flowchart illustrating another example of the method for transmitting an enhanced preamble proposed by this specification.

FIG. 15 is a flowchart illustrating another example of the method for transmitting an enhanced preamble proposed by this specification.

As illustrated in FIGS. 14 and 15, a UE that intends to transmit enhanced MSG1 may represent a UE that is configured to transmit the enhanced MSG1 from a higher layer (e.g., NPDCCH order) or mean a UE that is capable of transmitting the enhanced MSG1.

The enhanced preamble may mean an FDD enhancement preamble and mean a preamble for an EDT request.

Additionally, a region for transmitting the enhanced preamble may be configured in a specific NPRACH resource and the corresponding region may be configured to be used as a region for notifying an MSG3 multi-tone capability.

However, since it is considered that the region for transmitting the enhanced preamble is already configured in a contention free region, it may be preferable that a region for notifying an MSG multi-tone capability is not separately configured because the corresponding resource region is narrow.

Therefore, a UE that transmits MSG1 to the region for transmitting the enhanced preamble may be configured to expect that MSG3 continuously transmits the single tone.

Here, the MSG3 may mean UL transmission in which the UE performs transmission to the eNB in response to RAR (or MSG2).

In this case, the UE that transmits the enhanced preamble may be configured to interpret the RAR differently from the legacy UE.

A concrete method for this may be configured to use a 1-bit uplink subcarrier spacing field in an RAR UL grant to additionally represent a pre-allocated RAPID for the enhanced preamble.

The corresponding RAR may be used for an enhanced preamble flag for confirmation that the eNB that receives the enhanced preamble transmits the RAR.

In this case, characteristically, it may be configured that a subcarrier spacing is included in a 6-bit subcarrier indication field to be applied as shown in Table 22.

The UE may know an allocated subcarrier and an uplink subcarrier spacing by receiving 6-bit information.

Table 22 shows example of subcarrier indication and UL subcarrier spacing fields (6 bits).

TABLE 22

| Subcarrier indication field ($I_{sc}$) | Uplink Subcarrier spacing ($\Delta f$) | Allocated subcarriers ($n_{sc}$) |
| --- | --- | --- |
| 0-47 | 3.75 kHz | $I_{sc}$ |
| 48-59 | 15 kHz | $I_{sc} - 48$ |
| 60-63 | Reserved | Reserved |

Furthermore, when the MSG3 is configured to continuously expect transmission of the single tone, in a case where a region capable of notifying the Msg3 multi-tone capability while transmitting the legacy preamble to a specific NPRACH resource and the region for transmitting the enhanced preamble coexist, the UE that transmits the MSG1 to the region for transmitting the enhanced preamble may be configured to transmit the legacy preamble to the region capable of notifying the Msg3 multi-tone capability.

In this case, a case where the region capable of notifying the Msg3 multi-tone capability is configured in the corresponding NPRACH resource itself indicates that the RSRP of the UE selecting the corresponding NPRACH resource is good and this may mean there is a high probability that the corresponding UE will be positioned at a cell center.

Therefore, since the UE need not transmit the enhanced preamble required for inter cell interference or cell range enhancement, transmitting the legacy preamble to the region capable of notifying the Msg3 multi-tone capability may be a desirable operation.

Invalid Subframe Handling for TDD NB-IoT

Next, an invalid subframe handling method for TDD NB-IoT will be described.

In the TDD NB-IoT, when the UE transmits the NPRACH preamble to the NPRACH resource configured by the eNB, there may be various methods that the UE may take for the corresponding invalid subframe by receiving invalid UL subframe bitmap information for a specific interval, which are summarized as follows.

(Method 1)

Method 1 relates to a method for repetitively transmitting the NPRACH format configured in a preconfigured NPRACH resource by the repetition number configured, regardless of the invalid UL subframe bitmap information.

Method 1 may have an advantage in that method 1 is simple, but may have a disadvantage that when the corresponding subframe is a DL valid SF, the NPRACH preamble transmitted to the corresponding subframe may strongly interfere with downlink reception of UEs around the corresponding UE.

(Method 1-1)

Method 1-1 is similar to method 1 described above, but may be slightly different from method 1.

More specifically, method 1-1 relates to a method for repeatedly transmitting the NPRACH format configured in the pre-configured NPRACH resource by the configured repetition number regardless of the invalid UL subframe bitmap information, but transmitting a preamble (i.e., symbol or symbol group(s) or single repetition unit) transmitted to an invalid UL subframe by setting transmission power to a specific value or less and has an advantage that method 1-1 may reduce strong interference to adjacent UEs.

(Method 2)

Method 2 may be configured to select and apply one of the following methods by comparing the pre-configured NPRACH resource by verifying the invalid UL subframe bitmap information.

(Method 2-1)

In method 2-1, the pre-configured NPRACH format is repeatedly transmitted to a region other than the invalid UL subframe by the pre-configured repetition number.

(Method 2-2)

In method 2-2, when all or some symbol groups need to be transmitted to a region including the invalid UL subframe, the configured NPRACH format is repeatedly transmitted by the pre-configured repetition number except for a part corresponding to the symbol group(s).

(Method 2-3)

In method 2-3, when all or some symbol groups need to be transmitted to the region including the invalid UL subframe, the pre-configured NPRACH format is repeatedly transmitted to a region other than a plurality of back-to-back transmitted symbol groups including the corresponding symbol group(s) by the pre-configured repetition number.

(Method 2-4)

In method 2-4, when all or some symbol groups need to be transmitted to the region including the invalid UL subframe, the pre-configured NPRACH format is repeatedly transmitted to a region other than the single preamble (i.e., single repetition unit) including the corresponding symbol group(s) by the pre-configured repetition number.

(Method 2-5)

In method 2-5, when all or some symbol groups need to be transmitted to the region including the invalid UL subframe, the pre-configured NPRACH format is repeatedly transmitted to a region other than a radio frame including the corresponding symbol group(s) by the pre-configured repetition number.

A meaning of a phrase "specific region is excluded" mentioned in the method may be applied in different schemes as follows.

(a) A preamble transmission number which corresponds to the specific region may also be configured to be included in a total repetition number. The corresponding method has a characteristic that a starting point and an ending point of the pre-configured NPRACH resource are continuously constant irrespective of the presence or absence of the invalid UL subframe.

When the corresponding method is used, it is advantageous in that the NPRACH resource temporally occupied by the NPRACH preamble is constant irrespective of the number of invalid UL subframes which exist in the NPRACH resource.

This is, in other words, advantageous that transmission of the preamble is not delayed irrespective of the number of invalid UL subframes.

(b) The preamble transmission number which corresponds to the specific region may be configured not to be included in the total repetition number.

In the corresponding method, the starting point and the ending point of the pre-configured NPRACH resource may be configured differently according to the presence or absence of the invalid UL subframe.

When the corresponding method is used, it is advantageous in that since the preamble is continuously repeatedly transmitted by the pre-configured repetition number regardless of the number of invalid UL subframes which exist in the NPRACH resource, initially anticipated performance is maintained in terms of the NPRACH reliability.

Characteristically, when such a method is applied to (method 2-1) to (method 2-3) above, the UE may be configured to transmit the preamble, but transmit symbol groups transmitted back-to-back, which includes a hopping pattern of a preamble which is not transmitted or is only partially transmitted to a valid UL subframe which exists immediately next.

In such a configuration, when a differential algorithm is considered, it is advantageous in that hopping distances which are paired are not omitted, but transmitted as close as possible.

Characteristically, one or more of the consecutive UL subframes become the invalid UL subframes, and when it is impossible to transmit back-to-back the symbol groups which need to be transmitted back-to-back by using the preamble format configured through the SIB, even though some of the consecutive UL subframes are the valid UL subframes, the UE may be configured not to immediately transmit the symbol groups to the corresponding region, but transmit the symbol groups to consecutive valid UL subframes which exist thereafter.

In this case, for the number of consecutive valid UL subframes, a time domain which is as much as back-to-back transmission is possible by using the configured preamble format needs to be secured, of course.

Characteristically, the proposed methods may be configured differently according to a type of preamble format.

For example, in the case of preamble format 0 or preamble format 1 considered to be transmitted within 1 ms, one of (method 2-3), (method 2-4), and (method 2-5) may be configured to be applied.

In addition, the other preamble formats (i.e., format 2, 2A, and 3) may be configured to apply one of (method 2-1), (method 2-2), (method 2-3), (method 2-4), and (method 2-5).

In addition, an independent method may be configured to be applied for each preamble format.

The proposed methods will be described with reference to related drawings.

Figure 16:
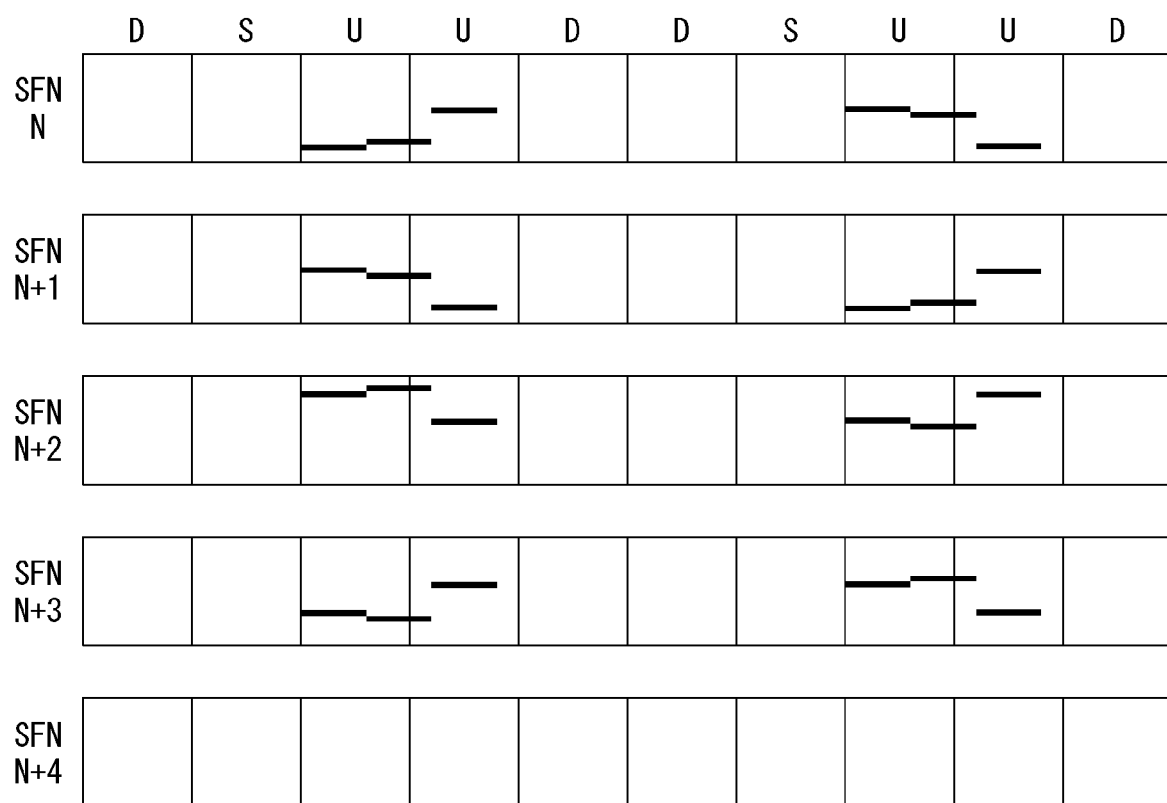
FIG. 16 is a diagram illustrating an example of a method for transmitting an NPRACH preamble without an invalid UL SF proposed by this specification.

As a first example, a situation in which preamble format 2A (i.e., preamble format 1-a to be described below) of Table 8 is configured in UL/DL configuration #1 and the repetition number is configured as 4 is considered as illustrated in FIG. 16.

FIG. 16 is a diagram illustrating an example of a method for transmitting an NPRACH preamble without an invalid UL SF proposed by this specification.

In a situation in which transmission illustrated in FIG. 16 is anticipated, when the invalid SF exists in the corresponding NPRACH resource, if method (a) of (method 2-5) among the proposed methods is applied and methods of (method 2-1) to (method 2-5) are applied in detail as illustrated in FIGS. 17 to 20.

Figure 17:
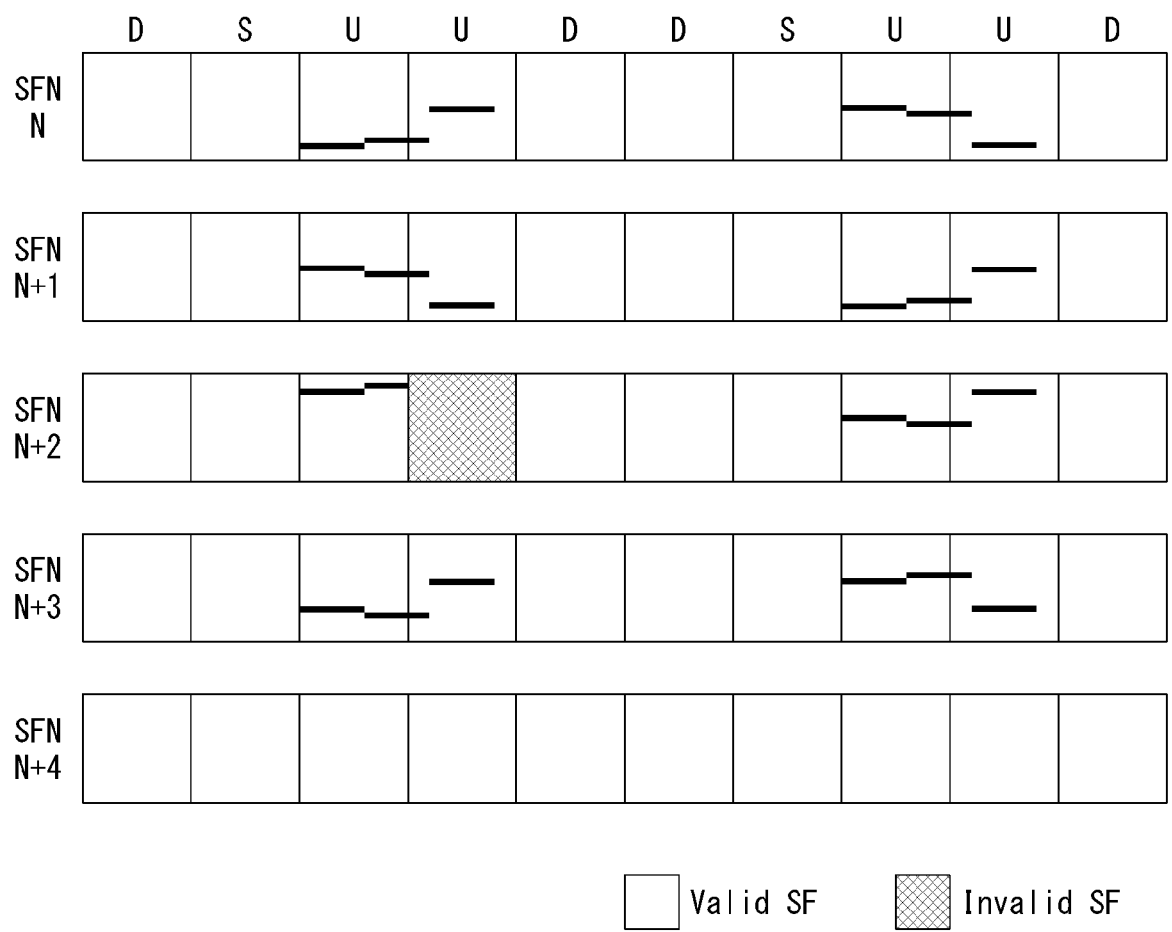
FIG. 17 is a diagram illustrating an example of a method for transmitting an NPRACH preamble with an invalid UL SF proposed by this specification.

FIG. 17 is a diagram illustrating an example of a method for transmitting an NPRACH preamble with the invalid UL SF proposed by this specification.

FIG. 17 illustrates an example of NPRACH preamble transmission for (a) of (method 2-5) and (method 2-1).

Figure 18:
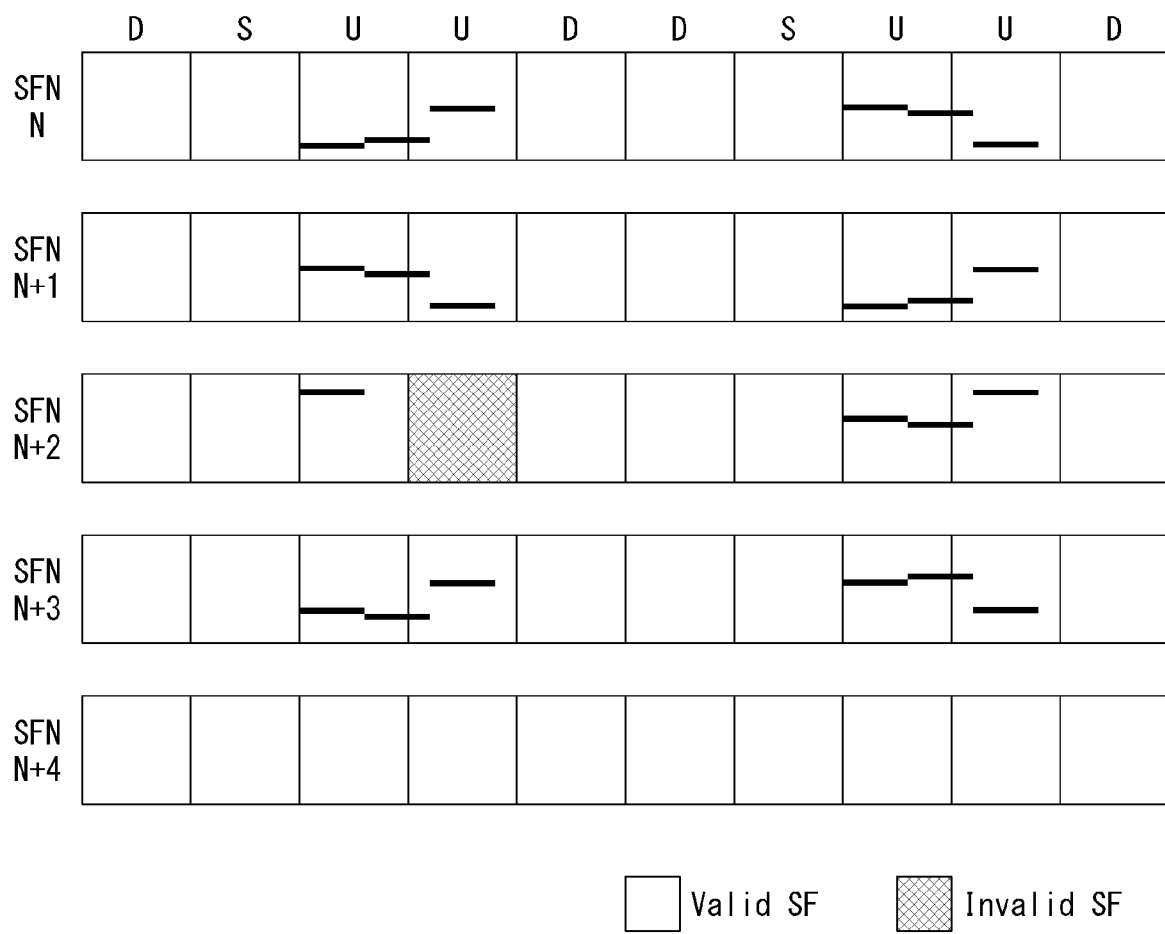
FIG. 18 is a diagram illustrating another example of the method for transmitting the NPRACH preamble with the invalid UL SF proposed by this specification.

FIG. 18 is a diagram illustrating still yet another example of the method for transmitting the NPRACH preamble with the invalid UL SF proposed by this specification.

FIG. 18 illustrates an example of NPRACH preamble transmission for (a) of (method 2-5) and (method 2-2).

Figure 19:
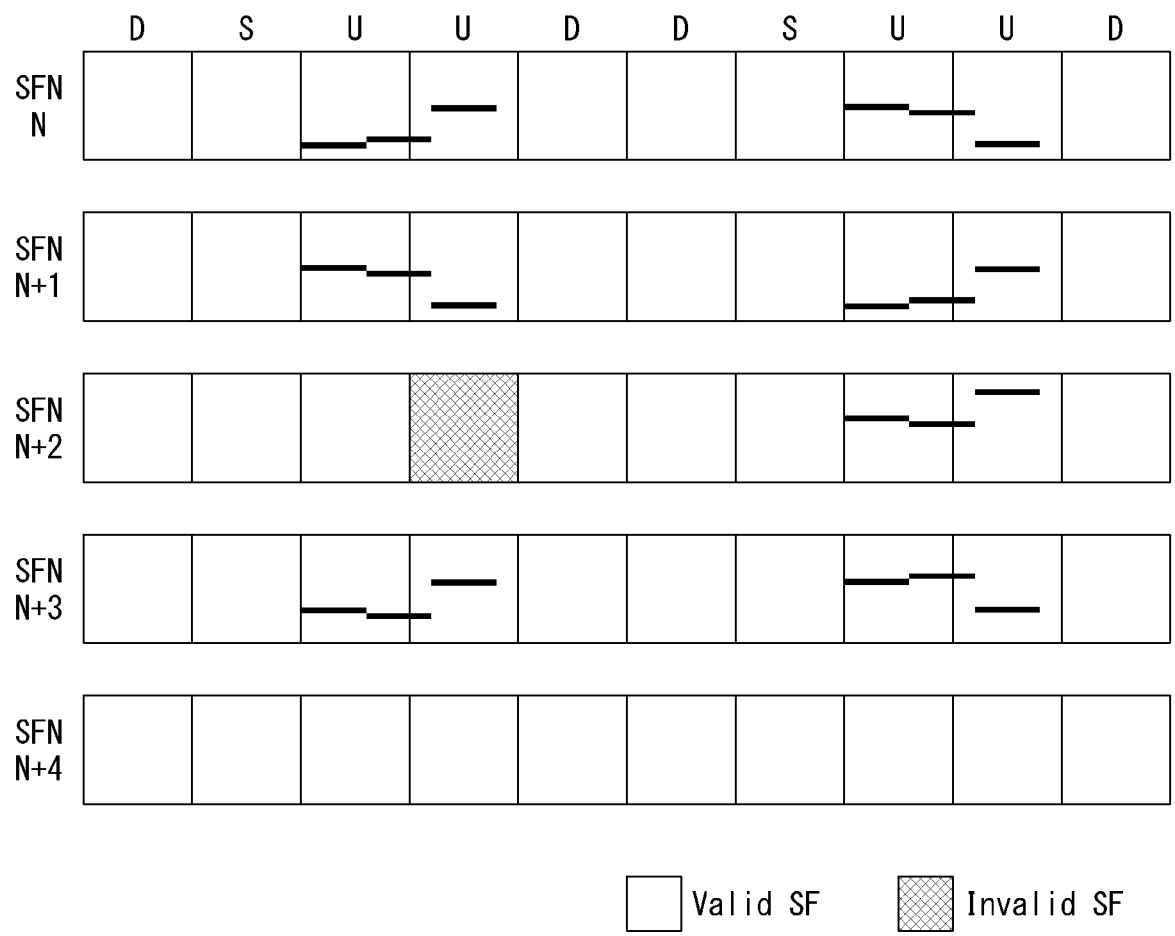
FIG. 19 is a diagram illustrating yet another example of the method for transmitting the NPRACH preamble with the invalid UL SF proposed by this specification.

FIG. 19 is a diagram illustrating still yet another example of the method for transmitting the NPRACH preamble with the invalid UL SF proposed by this specification.

FIG. 19 illustrates an example of NPRACH preamble transmission for (a) of (method 2-5) and (method 2-3).

Figure 20:
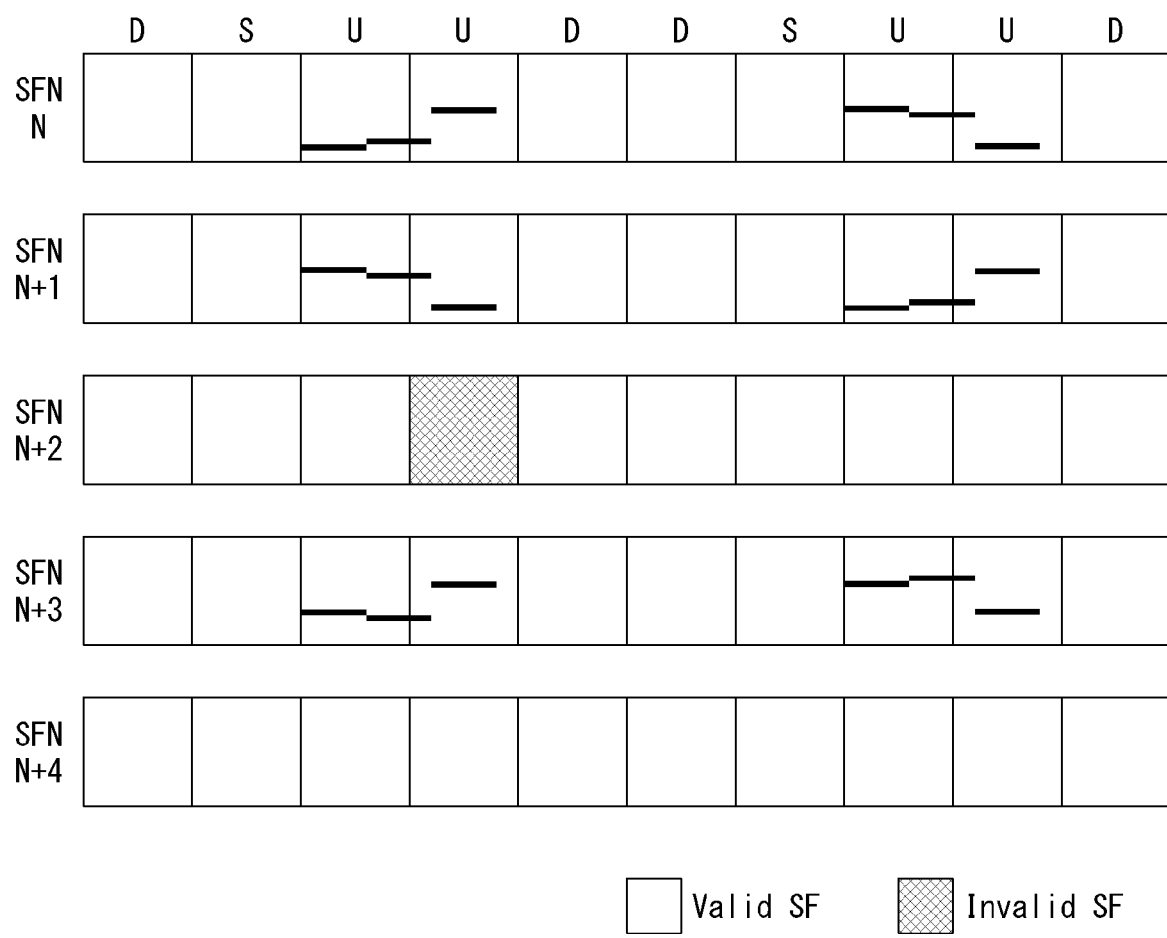
FIG. 20 is a diagram illustrating still another example of the method for transmitting the NPRACH preamble with the invalid UL SF proposed by this specification.

FIG. 20 is a diagram illustrating still yet another example of the method for transmitting the NPRACH preamble with the invalid UL SF proposed by this specification.

FIG. 20 illustrates an example of NPRACH preamble transmission for (a) of (method 2-5) and (method 2-4) or (method 2-5).

Figure 21:
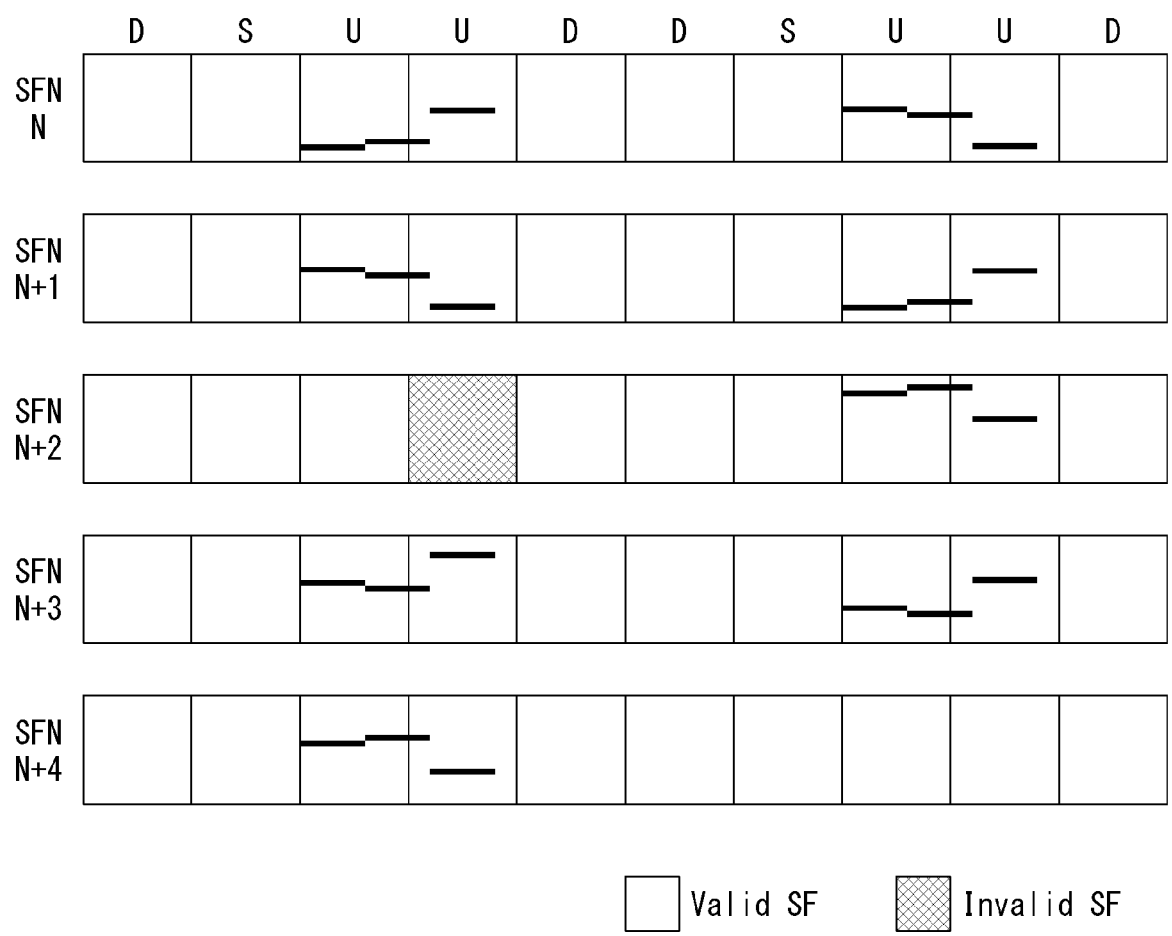
FIG. 21 is a diagram illustrating still yet another example of the method for transmitting the NPRACH preamble with the invalid UL SF proposed by this specification.
Figure 22:
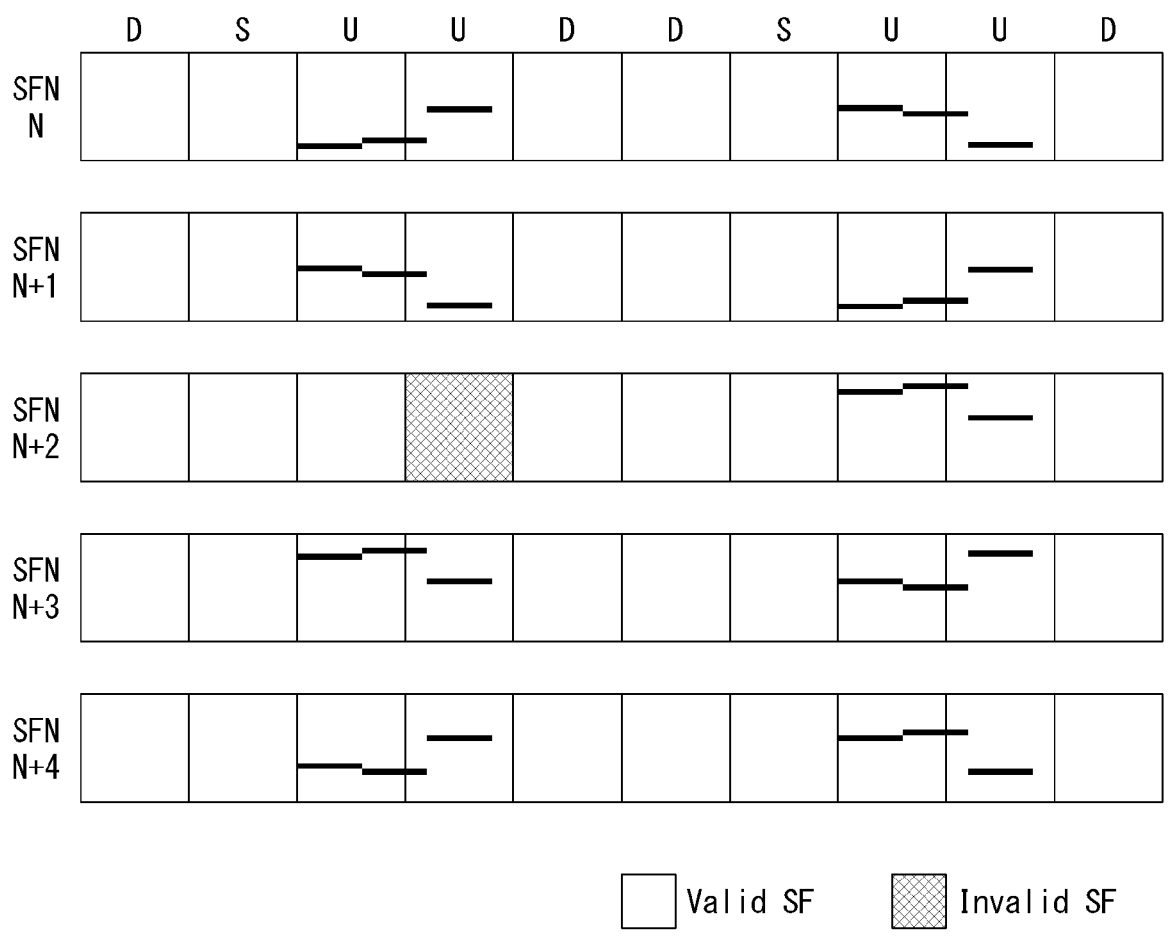
FIG. 22 is a diagram illustrating still yet another example of the method for transmitting the NPRACH preamble with the invalid UL SF proposed by this specification.

Additionally, in the situation in which the transmission illustrated in FIG. 16 is anticipated, when the invalid SF exists in the corresponding NPRACH resource, if method (a) of (method 2-5) among the proposed methods is applied and the methods of (method 2-1) to (method 2-5) are applied in detail as illustrated in FIGS. 21 and 22.

FIG. 21 is a diagram illustrating still yet another example of the method for transmitting the NPRACH preamble with the invalid UL SF proposed by this specification.

FIG. 21 illustrates an example of NPRACH preamble transmission for (b) of (method 2-5) and (method 2-1) or (method 2-2) or (method 2-3).

FIG. 22 is a diagram illustrating still yet another example of the method for transmitting the NPRACH preamble with the invalid UL SF proposed by this specification.

FIG. 22 illustrates an example of NPRACH preamble transmission for (b) of (method 2-5) and (method 2-4) or (method 2-5).

Figure 23:
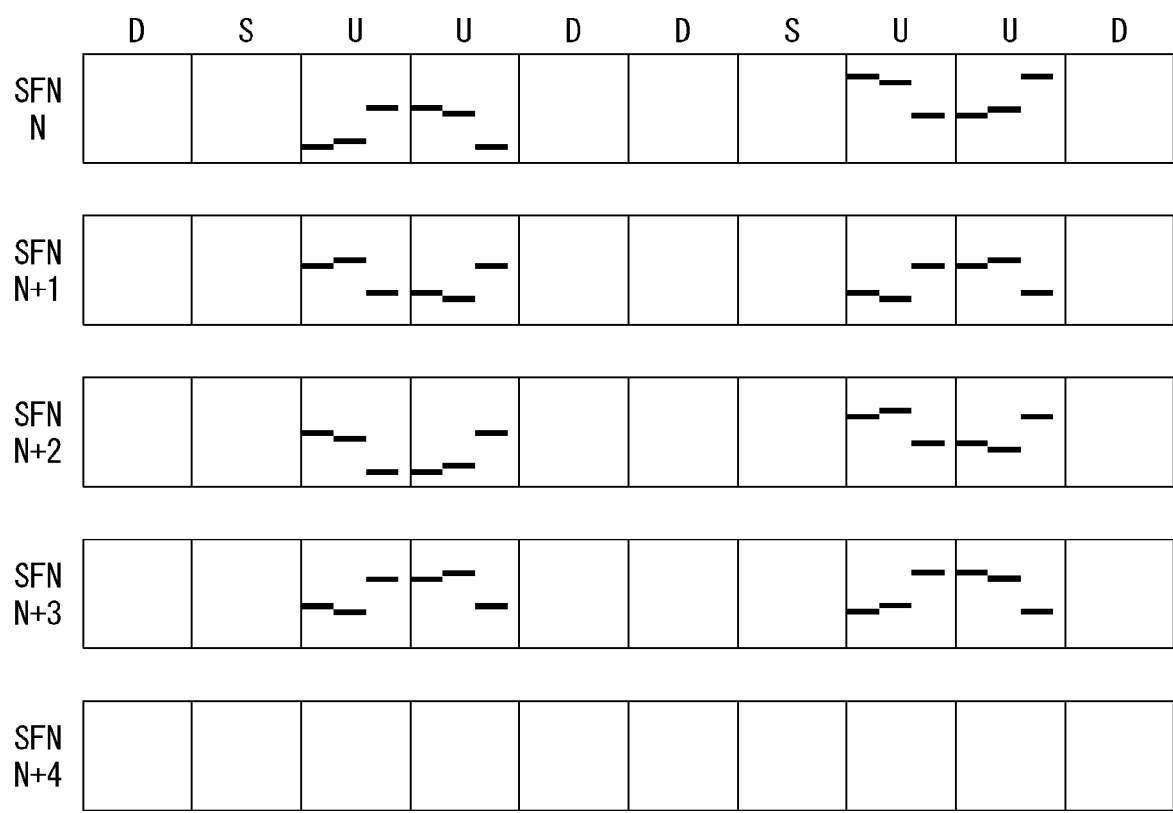
FIG. 23 is a diagram illustrating another example of the method for transmitting the NPRACH preamble without the invalid UL SF proposed by this specification.

As a second example, a situation in which preamble format 0 (i.e., preamble format 0-a on an agreement to be described below) of Table 8 is configured in UL/DL configuration #1 and the repetition number is configured as 8 is considered as illustrated in FIG. 23.

FIG. 23 is a diagram illustrating another example of the method for transmitting the NPRACH preamble without the invalid UL SF proposed by this specification.

Figure 24:
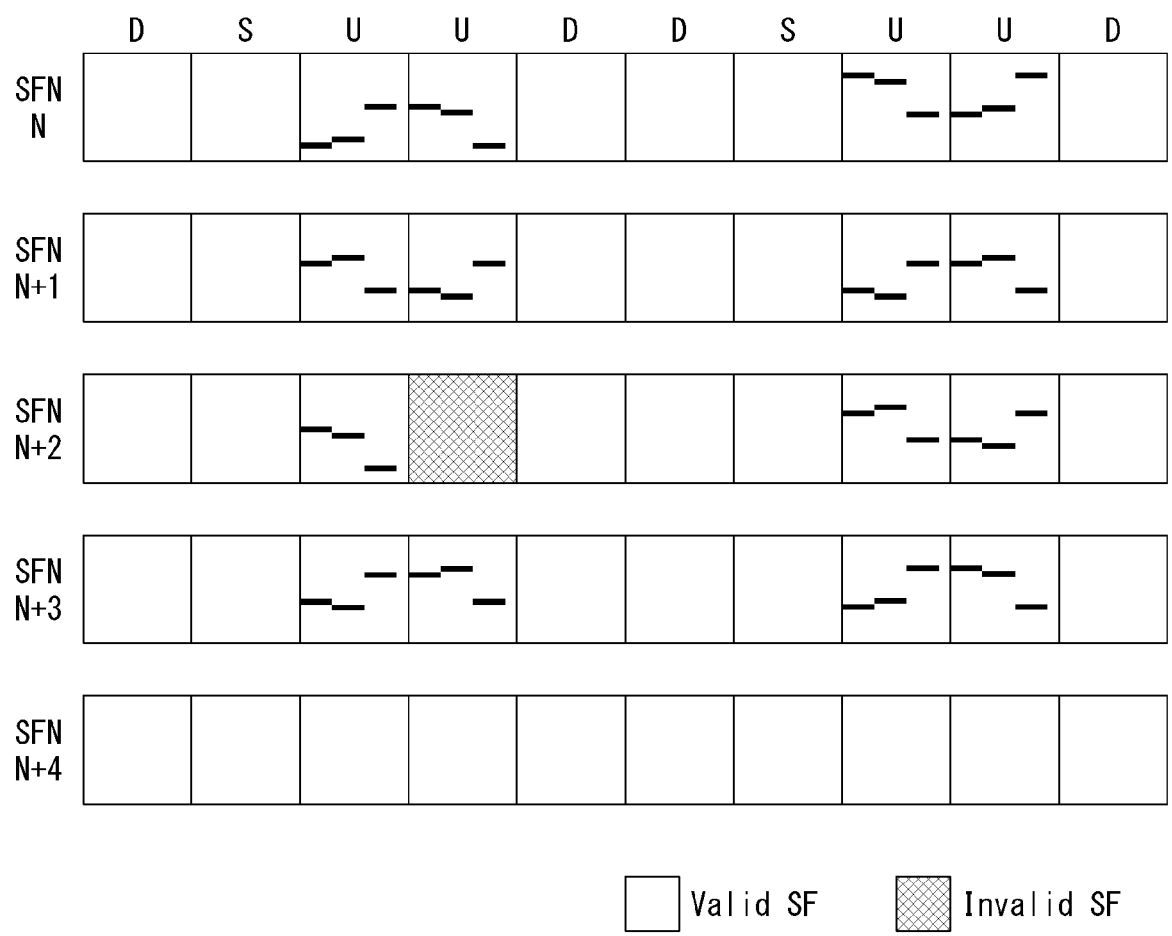
FIG. 24 is a diagram illustrating still yet another example of the method for transmitting the NPRACH preamble with the invalid UL SF proposed by this specification.
Figure 25:
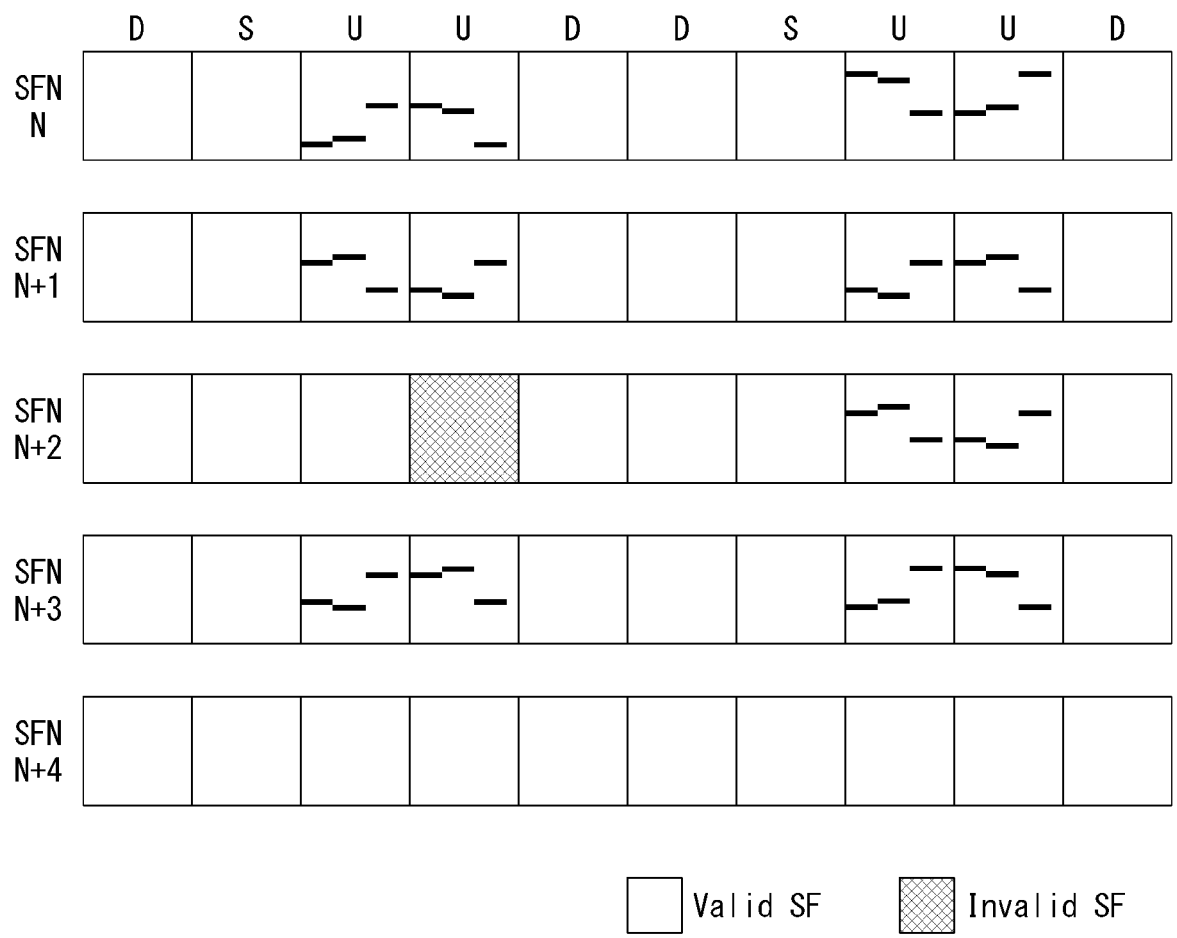
FIG. 25 is a diagram illustrating still yet another example of the method for transmitting the NPRACH preamble with the invalid UL SF proposed by this specification.
Figure 26:
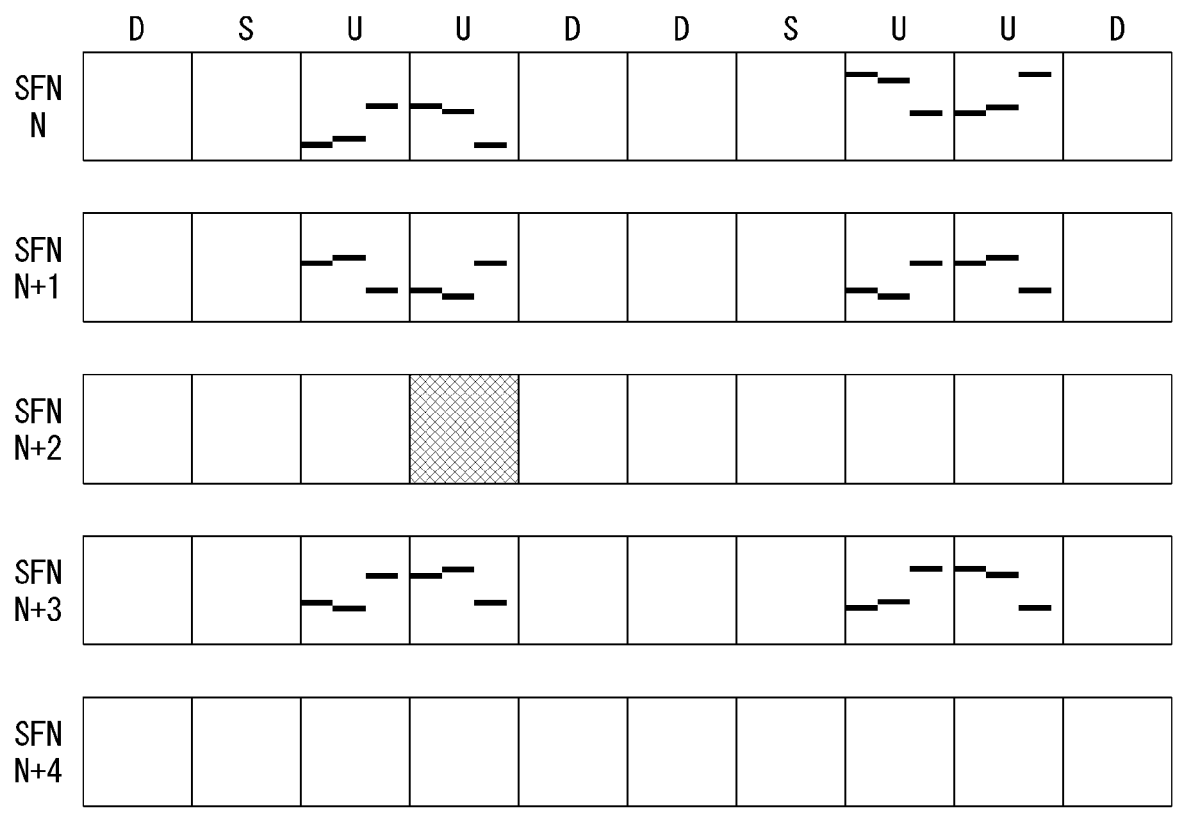
FIG. 26 is a diagram illustrating still yet another example of the method for transmitting the NPRACH preamble with the invalid UL SF proposed by this specification.

In a situation in which transmission illustrated in FIG. 23 is anticipated, when the invalid SF exists in the corresponding NPRACH resource, if method (a) of (method 2-5) among the proposed methods is applied and methods of (method 2-1) to (method 2-5) are applied in detail as illustrated in FIGS. 24 to 26.

FIG. 24 is a diagram illustrating still yet another example of the method for transmitting the NPRACH preamble with the invalid UL SF proposed by this specification.

FIG. 24 illustrates an example of NPRACH preamble transmission for (a) of (method 2-5) and (method 2-1) or (method 2-2) or (method 2-3).

FIG. 25 is a diagram illustrating still yet another example of the method for transmitting the NPRACH preamble with the invalid UL SF proposed by this specification.

FIG. 25 illustrates an example of NPRACH preamble transmission for (a) of (method 2-5) and (method 2-4).

FIG. 26 is a diagram illustrating still yet another example of the method for transmitting the NPRACH preamble with the invalid UL SF proposed by this specification.

FIG. 26 illustrates an example of NPRACH preamble transmission for (a) of (method 2-5) and (method 2-5).

Figure 27:
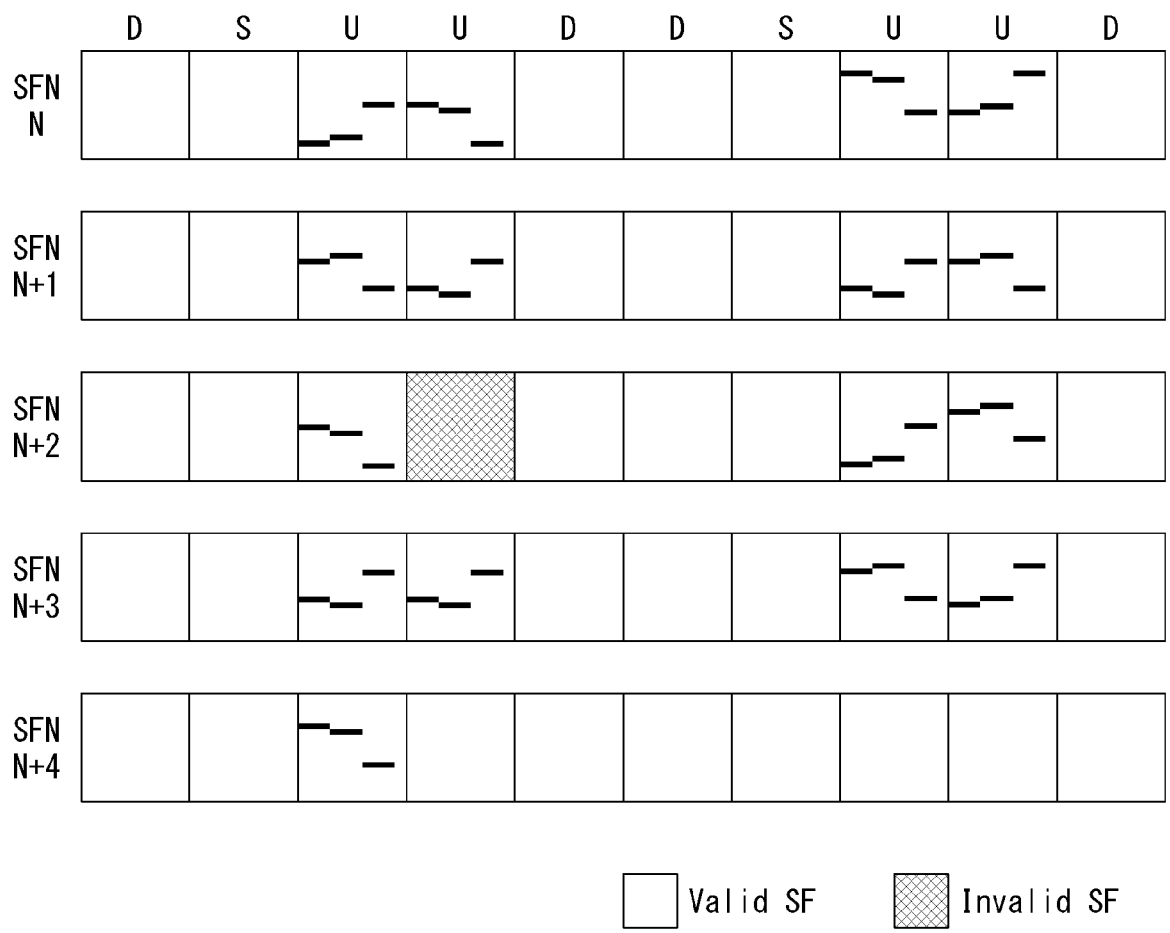
FIG. 27 is a diagram illustrating still yet another example of the method for transmitting the NPRACH preamble with the invalid UL SF proposed by this specification.
Figure 28:
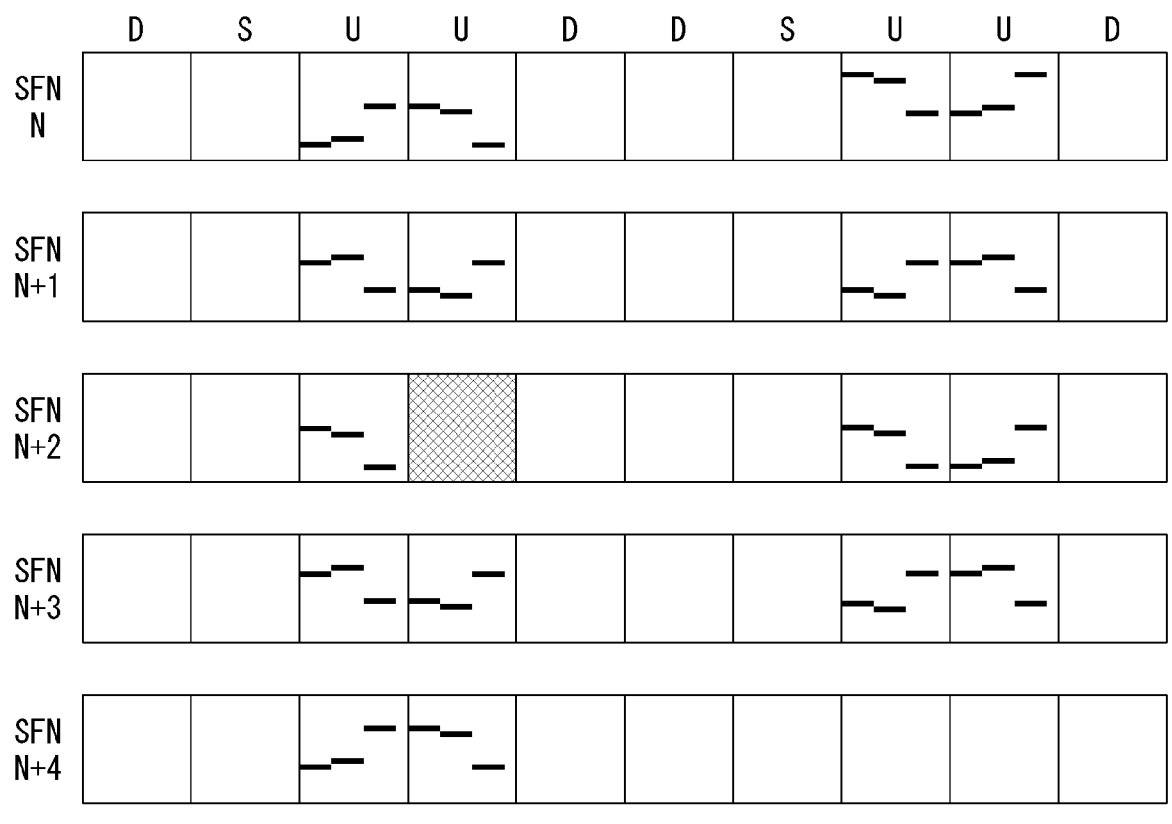
FIG. 28 is a diagram illustrating still yet another example of the method for transmitting the NPRACH preamble with the invalid UL SF proposed by this specification.
Figure 29:
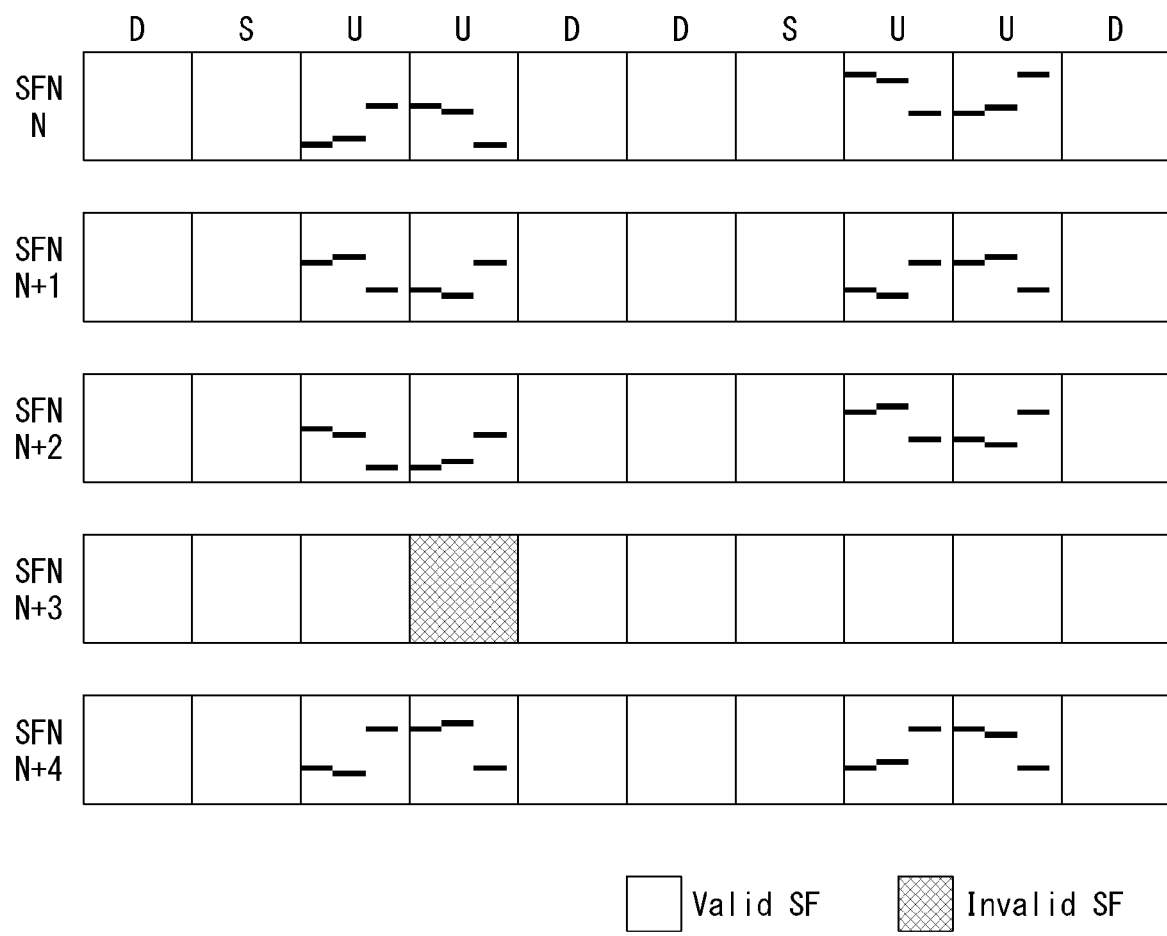
FIG. 29 is a diagram illustrating still yet another example of the method for transmitting the NPRACH preamble with the invalid UL SF proposed by this specification.

Additionally, in the situation in which the transmission illustrated in FIG. 23 is anticipated, when the invalid SF exists in the corresponding NPRACH resource, if method (a) of (method 2-5) among the proposed methods is applied and the methods of (method 2-1) to (method 2-5) are applied in detail as illustrated in FIGS. 27 to 29.

FIG. 27 is a diagram illustrating still yet another example of the method for transmitting the NPRACH preamble with the invalid UL SF proposed by this specification.

FIG. 27 illustrates an example of NPRACH preamble transmission for (b) of (method 2-5) and (method 2-1) or (method 2-2) or (method 2-3).

FIG. 28 is a diagram illustrating still yet another example of the method for transmitting the NPRACH preamble with the invalid UL SF proposed by this specification.

FIG. 28 illustrates an example of NPRACH preamble transmission for (b) of (method 2-5) and (method 2-4).

FIG. 29 is a diagram illustrating still yet another example of the method for transmitting the NPRACH preamble with the invalid UL SF proposed by this specification.

FIG. 29 illustrates an example of NPRACH preamble transmission for (b) of (method 2-5) and (method 2-5).

Additionally, it may also be considered that the proposed methods are combined conditionally according to a specific preamble repetition number, the number of retransmissions of specific MSG1, and the number of specific effective symbols.

For example, when the preamble repetition number configured from the SIB is less than Nrep (e.g., Nrep=64), it may be configured that method (b) of (method 2-5) among the proposed methods is used.

When the preamble repetition number is equal to or more than Nrep, it may be configured that method (a) of (method 2-5) among the proposed methods is used.

As a basis for the above configuration, when the repetition number is sufficiently large, the preamble is not transmitted throughout the invalid UL subframe or even though some preambles transmitted with low transmission power exist, similar performance may be guaranteed.

However, the reason is that when the repetition number is not sufficient, the preamble is not transmitted throughout the invalid UL subframe or the performance may not be guaranteed due to some preambles transmitted with low transmission power.

As yet another example, when the number of retransmissions of the MSG1 is less than Nmsg1 (e.g., Nmsg1=10), method (a) of (method 2-5) among the proposed methods may be configured to be used and when the number of retransmissions of the MSG1 is equal to or more than Nmsg1, method (b) of (method 2-5) among the proposed methods may be configured to be used.

As a basis for the above configuration, when the number of retransmissions of the MSG1 is small, the preamble is not transmitted throughout the invalid UL subframe or some preambles transmitted with low transmission power may be configured to exist.

However, the reason is that when the number of retransmissions of the MSG1 is large, only by transmitting more effective symbols than before, a decoding success probability for the preamble may increase.

Additionally, when the UE basically transmits the preamble format configured from the SIB and then, meets the invalid UL subframe, the UE may be configured to use and transmit another predetermined preamble format.

For example, when the UE is configured to transmit preamble format 2A (preamble format 1-a of the agreement to be described below) from the SIB by the eNB, but one of the two consecutive UL SFs becomes the invalid UL SF, the UE may be configured to transmit preamble format 0 (i.e., preamble format 0-a of the agreement to be described below) to the remaining one valid UL SF.

As described above, in some cases, which preamble format is to be transmitted may be predefined in the standard document and may be configured to be notified to the UE through the SIB configuration.

Characteristically, it is preferable that in the preamble formats chosen because of the invalid UL subframe, the number of effective symbols is small (i.e., N should be reduced) as compared to the preamble format transmitted by default.

Here, a value of G, a value of P, and the like may be configured to be equal to each other.

For such a basis, since a single hopping pattern may be used with respect to the same G and P, it is advantageous that the hopping pattern may be maintained even though actually transmitted preamble formats are different.

Characteristically, when the consecutive UL SFs are applied to the irregular UL/DL configuration in the stand-alone mode, the method may be applied.

Figure 30:
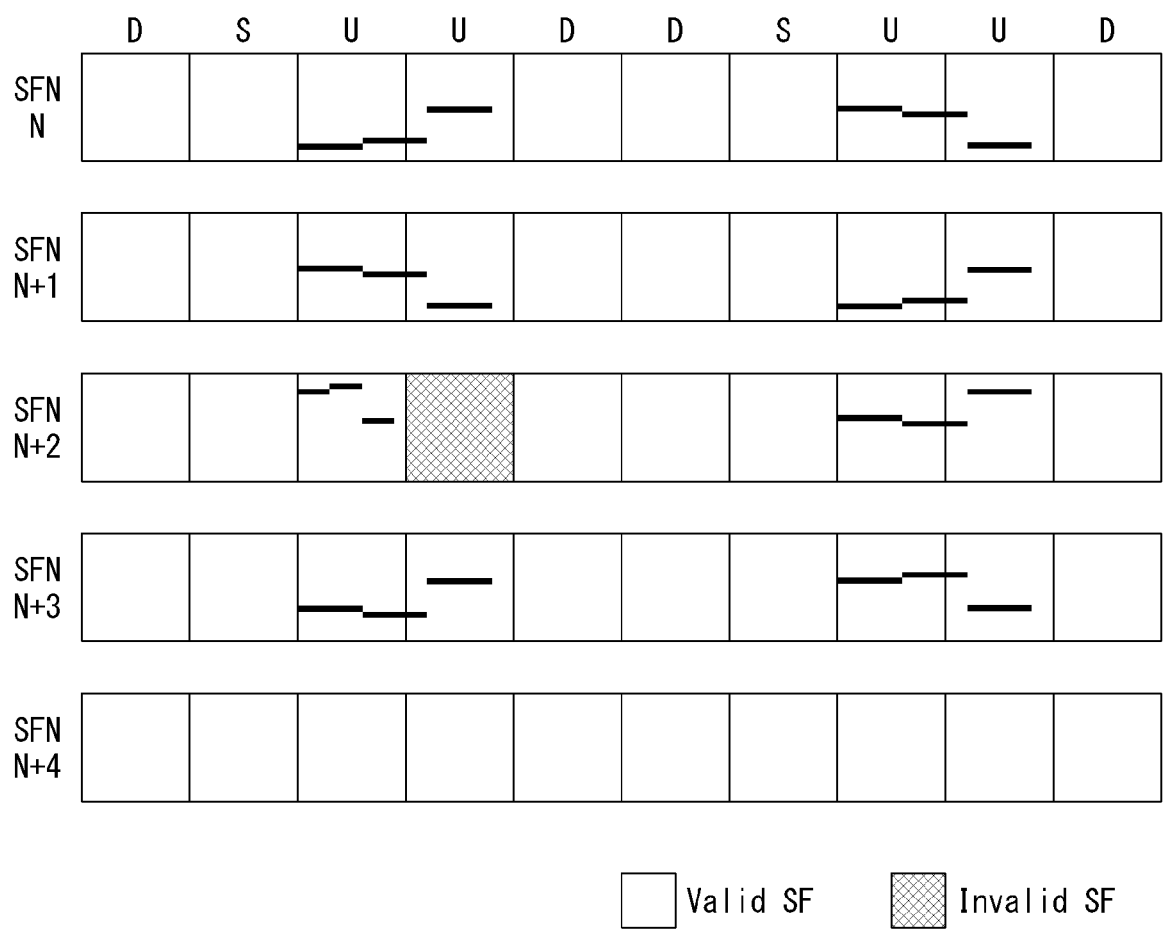
FIG. 30 is a diagram illustrating still yet another example of the method for transmitting the NPRACH preamble with the invalid UL SF proposed by this specification.

The corresponding method may be expressed by the drawing as illustrated in FIG. 30.

FIG. 30 is a diagram illustrating still yet another example of the method for transmitting the NPRACH preamble with the invalid UL SF proposed by this specification.

Additionally, when the number of invalid UL subframes in the NPRACH resource configured from the SIB is larger than a specific number, the UE may be configured to use and transmit another predetermined preamble format without using the configured preamble format.

Characteristically, the number of specific invalid UL subframes may be determined as a specific ratio of the UL subframe corresponding to the NPRACH resource and determined as a specific number.

Characteristically, since a CP length may be changed in the above scheme, whether to apply this method may also be notified to the UE through the SIB.

In addition, the eNB may be configured to operate even by using a preamble format having small cell coverage supported by using the corresponding method when the RSRP of the UE is good.

In addition, transmission of TDD NPRACH starts in a first valid UL subframe which is a $N_{start}^{NPRACH} \cdot 30720 \, T_s$ time unit after starting a radio frame achieving $n_f$ mod $(N_{period}^{NPRACH}/10)=0$.

When consecutive valid UL subframes to transmit G symbol groups back-to-back do not sufficiently exist, G symbol groups of the NPRACH preamble are dropped.

Here, 'drop' may mean that a signal is not transmitted by puncturing or rate matching the signal at a transmitter.

In other words, in a TDD system, when transmission of the invalid UL subframe and transmission of G symbol groups overlap with each other, the G symbol groups are dropped.

According to the above two sentences, the valid UL subframe that exists first after a radio frame meeting a predetermined equation becomes a transmission start point of the NPRACH preamble.

In addition, when valid UL subframes do not exist as many as G consecutive symbol groups to be transmitted, the G symbol groups are dropped.

When the NPRACH repetition number is large enough, the above method may operate without a problem, but when the repetition number is as small as 1 and 2, a half of transmission of all preambles may be dropped according to the presence of the invalid UL subframe or transmission of all preambles may be dropped.

Figure 31A:
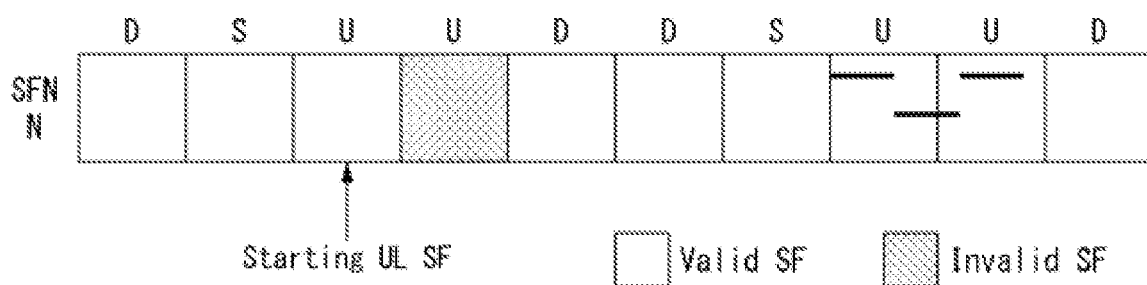
FIGS. 31A and 31B are diagrams illustrating an example of an NPRACH preamble format 1-a with the invalid UL SF.

For example, in a situation in which the eNB using UL/DL configuration #1 is configured to use NPRACH preamble format 1-a, when the repetition number is in a case where the NPRACH starting UL SF and the invalid UL SF exist as illustrated in FIG. 31A, only a half of all preambles are transmitted.

Figure 31B:
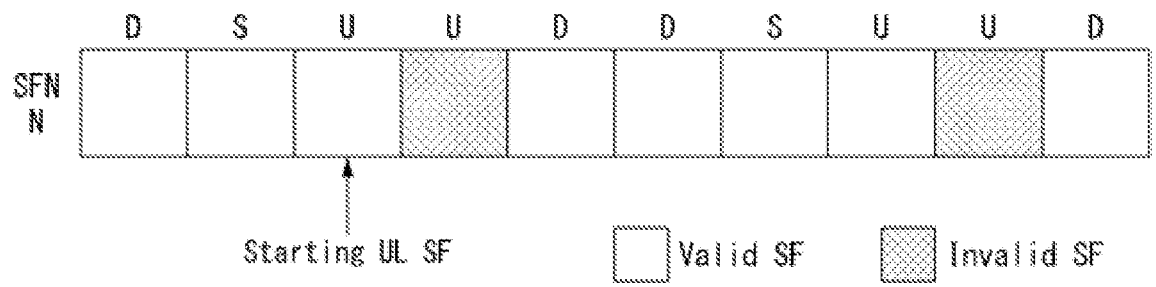

Furthermore, when the NPRACH starting UL SF and the invalid UL SF exist as illustrated in FIG. 31B in the same situation, all preambles are not transmitted.

Even in such a situation, the UE will monitor the corresponding search space in order to receive the RAR and this causes an unnecessary energy waste phenomenon.

FIGS. 31A and 31B are diagrams illustrating an example of NPRACH preamble format 1-a with the invalid UL SF.

Accordingly, in order to solve such a problem, the following methods may be considered.

(Solving Method 1)

Solving method 1 is configured so that only when a sufficient number of valid UL SFs to transmit a minimum of G symbol groups are consecutively present, a first valid UL SF among the valid UL SFs may become a TDD NPRACH starting SF.

That is, even if there is only one valid UL SF, transmission of the NPRACH preamble may be started, but in order to solve the above problem at least, first G symbol groups of the first preamble are continuously transmitted.

To this end, only when a sufficient number of valid UL SFs to transmit a minimum of G symbol groups are consecutively present, the first valid UL SF among the valid UL SFs may become the TDD NPRACH starting SF.

In the above configuration, it is advantageous that even when the repetition number is small, it may be guaranteed that a minimum of symbol groups are transmitted.

(Solving Method 2)

Solving method 2 is configured so that a search space (i.e., Type2-NPDCCH common search space) in which DCI for scheduling NPDSCH that carries related RAR according to a drop ratio by the invalid UL SF may be transmitted is not monitored during transmission of all preambles, but the preamble is retransmitted to a subsequent NPRACH resource.

In this method, energy is not unnecessarily wasted according to a drop ratio during the transmission of all preambles.

For example, in a case where the drop ratio during the transmission of all preambles is equal to or more than 50%, that is, in a case illustrated in FIG. 31A, it may be configured that the UE regards that the eNB does not naturally receive the corresponding preamble and does not monitor the search space in which the DCI for scheduling the NPDSCH containing the related RAR may be transmitted and retransmit the preamble to the subsequent NPRACH resource.

In this case, a retransmission procedure may be configured to follow the method defined in the standard document in the existing NB-IoT.

Characteristically, in the case of the above configuration, the eNB may also be configured not to transmit the RAR.

When this method is used, it is advantageous that the UE may not monitor an unnecessary search space, so it is effective in terms of battery saving.

Additionally, more specifically than solving method 2 proposed above, it may be configured that when the drop ratio by the invalid UL SF during the transmission of all preambles is extremely large (e.g., when the drop ratio is 100%), the search space (i.e., Type2-NPDCCH common search space) in which the DCI for scheduling the NPDSCH that carries the related RAR may be transmitted is not monitored, but the preamble is retransmitted to the subsequent NPRACH resource without power lamping.

Characteristically, when retransmitting the preamble without the power lamping, a method that does not increase a PREAMBLE TRANSMISSION COUNTER may be considered. This may be appreciated as a concept that since it may be determined that the preamble is not almost substantially transmitted, an opportunity is given once more without the power lamping.

Through the second sentence (when consecutive valid UL subframes to transmit G symbol groups back-to-back are not sufficient, G symbol groups of the NPRACH are dropped), when G symbols groups among the NPRACH preambles are dropped because the invalid UL subframe exists in the NPRACH resource, a specific valid UL subframe may not be used as anything such as NPRACH, NPUSCH, etc., and may be discarded.

Therefore, in order to solve such a waste phenomenon of the resource, it may be configured that the NPUSCH, etc., is used for the valid UL subframe generated by dropping the G symbol groups among the NPRACH resources.

Characteristically, NPRACH preamble formats to be used at this time may be NPRACH preamble formats that occupy 2 ms or more, such as NPRACH preamble formats 1, 2, and 1-a.

Figure 32:
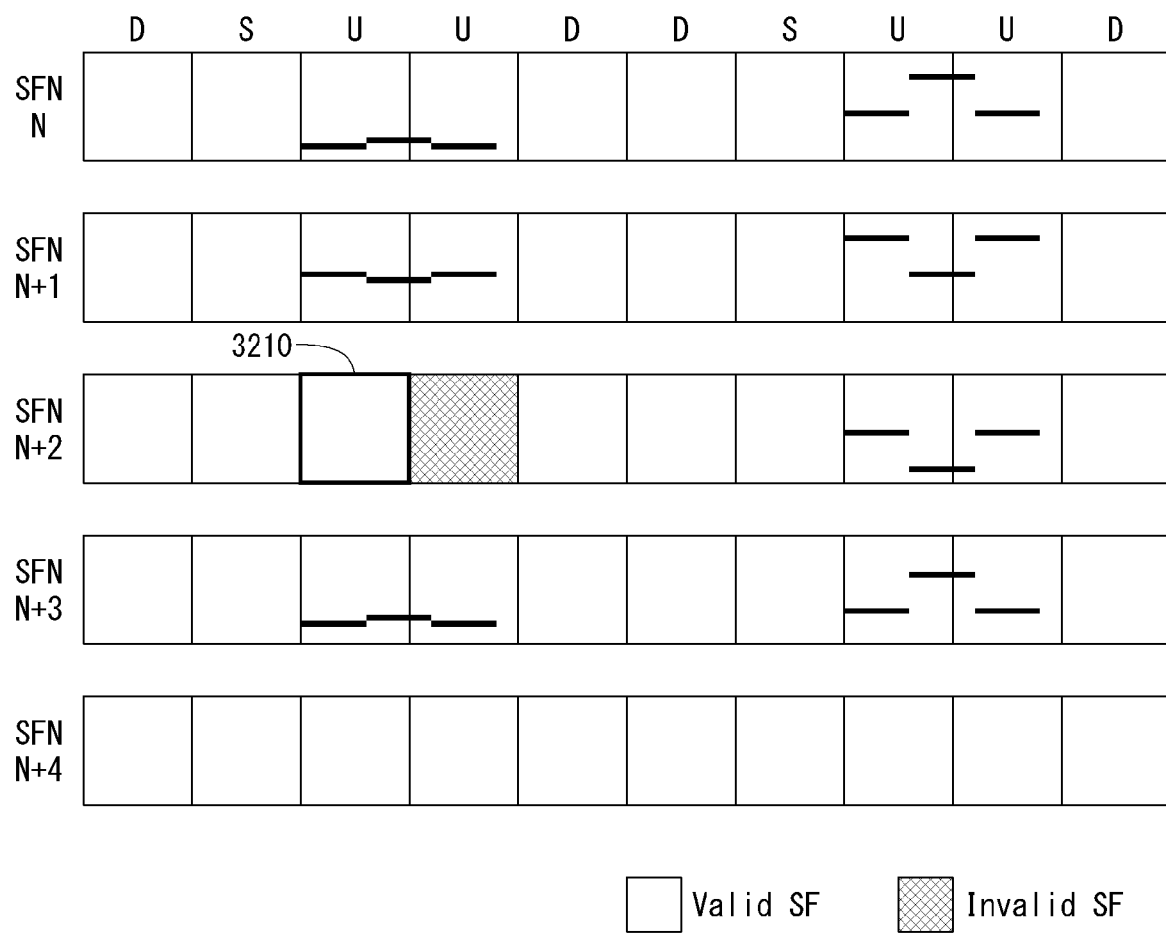
FIG. 32 is a diagram illustrating an example of an NPRACH preamble format with the invalid UL SF proposed by this specification.

That is, FIG. 32 illustrates an example of the above situation.

When FIG. 32 is more specifically described, it is configured that the eNB using UL/DL configuration #1 uses NPRACH preamble format 1-a and when it is assumed that the NPRACH repetition number is 4, if a preceding UL SF of two consecutive UL SFs in an interval configured as the NPRACH resource is then valid and the subsequent UL SF is invalid, two symbol groups are dropped and the NPRACH resource region (square-indicated SF 3210 of FIG. 32) in the preceding valid UL SF is not used as anything, but discarded.

Therefore, it may be configured that the NPUSCH is transmitted to the corresponding region.

That is, since other UEs that are scheduled with the NPUSCH may also know the invalid SF configuration and the NPRACH resource configuration, it may be known in advance which valid UL SF in the NPRACH resource is discarded and the discarded valid UL SF may be used when the NPUSCH is transmitted.

FIG. 32 is a diagram illustrating an example of an NPRACH preamble format with the invalid UL SF proposed by this specification.

Characteristically, the above method may not be applied to all NPUSCH scheduling and the UE may determine whether the NPUSCH may be transmitted to the corresponding valid UL SF by determining NPUSCH scheduling information, the NPRACH resource configuration, the number of discarded valid UL SFs, and the like.

In other words, the UE that desires to use the discarded valid UL SF may be configured to transmit the NPUSCH to the corresponding valid UL SF only when a frequency domain which is to be occupied by the NPRACH resource confirmed through the NPRACH resource configuration includes a frequency domain of the NPUSCH scheduled by the corresponding UE.

That is, when the frequency domain of the NPUSCH scheduled by the UE is larger than the frequency domain to be occupied by the NPRACH resource confirmed through the NPRACH resource configuration or deviates from the frequency domain to be occupied by the NPRACH resource, the UE does not transmit the NPUSCH to the corresponding valid UL SF.

The reason for the above configuration is that the eNB may already schedule the NPUSCH for another UE in a region other than the region for the NPRACH resource.

By the above configuration, the number of discarded valid UL SFs is reduced, and as a result, the resource may be efficiently used and latency of NPUSCH transmission may be slightly improved.

Characteristically, the aforementioned invalid UL SF may be interpreted as a UL SF which is not designated as the valid UL SF, but may be interpreted as the DL SF and may be interpreted as the special SF.

That is, a case where UL/DL configuration #6 is introduced into TDD NB-IoT later may be considered as below.

In UL/DL configuration #6, DSUUU and DSUUD are not equal to each other in that the number of UL SFs is 3 and 2 every 5 ms.

When G symbol groups in UL/DL configuration #6 determine to use a format similar to TDD NPRACH format 2 occupying 3 ms, even though two consecutive UL SFs corresponding to SF #7 and SF #8 are continuously valid UL SFs, the format similar to TDD NPRACH format 2 may not be used due to the subsequent DL SF and the corresponding UL SFs are discarded.

Even in this case, it may be configured that the NPUSCH is transmitted by applying the proposed method.

Characteristically, when G symbol groups use the TDD NPRACH format occupying 3 ms in UL/DL configuration #6, the NPRACH resource may be constituted only by three consecutive UL SFs.

That is, two consecutive UL SFs may be configured to be excluded from the NPRACH resource from the beginning.

The UL SFs excluded from the NPRACH resource may be used for NPUSCH transmission.

Additionally, when G symbol groups in UL/DL configuration #6 determine to use a format similar to TDD NPRACH format 1 or format 1-a that occupies 2 ms, whether transmission of the symbol group is to be started in UL SF #2 or UL SF #3 needs to be determined.

When it is configured that the transmission of the symbol group is started in UL SF #2, even though UL SF #4 is the valid UL SF, UL SF #4 may not be continuously used for the NPRACH, so that the corresponding UL SF may also be configured to be used for the NPUSCH.

As an advantage when it is configured that the transmission of the symbol group is started in UL SF #2, since there is, in general, a tendency that the UL SF just before the DL SF is first changed to the invalid UL SF, when first two UL SFs among three UL SFs are used, thereby decreasing a drop probability of the corresponding preamble.

When it is configured that the transmission of the symbol group is started in UL SF #3, even though UL SF #2 is the valid UL SF, UL SF #2 may not be continuously used for the NPRACH, so that the corresponding UL SF may also be configured to be used for the NPUSCH.

An advantage when it is configured that the transmission of the symbol group is started in UL SF #3 is that both the UpPTS and UL SF #2 may be used for NPUSCH transmission.

Characteristically, when G symbol groups use the TDD NPRACH format occupying 2 ms in UL/DL configuration #6, the NPRACH resource may be constituted only by two consecutive UL SFs immediately following the special SF and only by two consecutive UL SFs which exist immediately before the DL SF.

Here, the UL SFs excluded from the NPRACH resource may be used for the NPUSCH transmission.

Methods of Starting Subcarrier Selection for TDD NB-IoT Preamble Formats

Next, methods of starting subcarrier selection for TDD NB-IoT preamble formats will be described.

In Table 8 described above, the following hopping pattern may be described for preamble formats 1, 2, and 3 (i.e., preamble formats 0, 1, and 2 of agreement to be described below) with G=2 and P=4.

That is, when the repetition number configured by the SIB is '1', the hopping pattern configured in Table 23 may be followed.

In this case, the hopping pattern within a single preamble unit may be determined according to a starting subcarrier index selected by a predetermined random method.

Characteristically, the predetermined random method may be the same as that used in FDD NB-IoT.

Table 23 is a table showing examples of starting subcarrier indexes and hopping patterns for a NPRACH preamble format with G=2 and P=4.

TABLE 23

| Starting subcarrier index | Hopping patterns within a repetition unit |
|---|---|
| 0, 2, 4 | {+3.75 kHz, 0, +22.5 kHz} |
| 1, 3, 5 | {−3.75 kHz, 0, +22.5 kHz} |
| 6, 8, 10 | {+3.75 kHz, 0, −22.5 kHz} |
| 7, 9, 11 | {−3.75 kHz, 0, −22.5 kHz} |

Furthermore, when the repetition number configured by the SIB is 2 or more, it may be configured that different rules are applied to odd-numbered preamble units and even-numbered preamble units.

In the case of the odd-numbered preamble units, the hopping pattern within the single preamble unit may be determined according to the starting subcarrier index selected by the predetermined random method.

Characteristically, the predetermined random method may be the same as that used in FDD NB-IoT.

Next, in the case of the even-numbered preamble unit (e.g., in the case of the Nth preamble unit, N is an even number), it may be configured that a subcarrier index set which may be selected may be determined according to the starting subcarrier index selected by an immediately preceding transmitted odd-numbered preamble unit (e.g., N−1th preamble unit) and this may be configured as shown in Table 24.

By such a configuration, the hopping pattern of the even-numbered preamble unit and the hopping pattern of the odd-numbered preamble unit are symmetric to each other, and as a result, it is advantageous that better performance may be obtained when using a differential receiver.

Table 24 is a table showing examples of candidate starting subcarrier indices for even-numbered preamble repetition units for the NPRACH preamble format with G=2 and P=4.

TABLE 24

| Starting subcarrier index of odd-numbered preamble repetition unit | Candidate starting subcarrier indices for even-numbered preamble repetition unit |
|---|---|
| 0, 2, 4 | 7, 9, 11 |
| 1, 3, 5 | 6, 8, 10 |
| 6, 8, 10 | 1, 3, 5 |
| 7, 9, 11 | 0, 2, 4 |

In addition, a method for determining a starting subcarrier to be actually transmitted among the starting subcarrier candidates selected by the even-numbered (i.e., Nth) preamble unit may be summarized as follows.

When the subcarrier index is determined through the following proposed methods, it may be configured that the hopping pattern is finally determined through Table 24.

(Proposed Method 1)

It may be configured that the starting subcarrier candidates that may be selected by the Nth preamble unit are predetermined according to the starting subcarrier index value selected by the N−1th preamble unit and the Nth preamble unit is selected among the starting subcarrier candidates by the predetermined random method.

Characteristically, the predetermined random method may be applied to be the same as that used in FDD NB-IoT and may introduce an additional operation.

For example, when one value of 0 to 11 is selected through the method used in the NPRACH of the FDD NB-IoT, the UE may be configured to select one among three predetermined values by using a specific method such as modular 3 or the remainder of division 3 by default.

In a specific embodiment, a method for selecting one of the three predetermined values using the modular 3 by default may be expressed by Equation 3, which may be expressed as a table as shown in Table 25.

SCsel in Equation 3 below may be configured as a starting subcarrier index for an even-numbered preamble repetition unit, SCtmp may be configured as a value selected from 0 to 11 through the method used in the FDD NB-IoT NPRACH, and SCoffset may be configured as a predetermined value according to the starting subcarrier index value of the odd-numbered preamble repetition unit.

Characteristically, in this case, SCoffset may be configured as a smallest index among the starting subcarrier indexes (SCsel) for the even-numbered preamble repetition unit.

When this method is used, it is advantageous to reduce inter-cell interference because the starting subcarrier index may be selected by randomization.

$$SCsel = 2 \times (SCtmp \bmod 3) + SCoffset \qquad [\text{Equation 3}]$$

Table 25 is a table showing examples of starting subcarrier indices for an even-numbered preamble repetition unit for the NPRACH preamble format with G=2 and P=4.

TABLE 25

| Starting subcarrier index of odd-numbered preamble repetition unit | SCoffset | SCtmp mod 3 | Starting subcarrier index(SCsel) for even-numbered preamble repetition unit | | |
|---|---|---|---|---|---|
| | | | 0 | 1 | 2 |
| 0, 2, 4 | 7 | | 7 | 9 | 11 |
| 1, 3, 5 | 6 | | 6 | 8 | 10 |
| 6, 8, 10 | 1 | | 1 | 3 | 5 |
| 7, 9, 11 | 0 | | 0 | 2 | 4 |

(Proposed Method 2)

The starting subcarrier candidates that may be selected by the Nth preamble unit are predetermined according to the starting subcarrier index value selected by the N−1th preamble unit.

In addition, it may be configured that the Nth preamble unit is determined through a predetermined method among the starting subcarrier candidates to be selected and the corresponding index is selected.

Characteristically, it may be configured that the predetermined method is determined based on the starting subcarrier index value selected by the N−1th preamble unit and/or a Cell ID and/or an RA-RNTI value and/or the subframe index to transmit the corresponding NPRACH preamble unit.

For example, this will be described below in detail.

A method for configuring the starting subcarrier index to be selected by the Nth preamble unit by using both the starting subcarrier index value selected by the N−1th preamble unit and the Cell ID may be configured as shown in Tables 26 to 28.

Characteristically, up to $6^4=1296$ different tables may be configured, but this example indicates that three different tables are selected via Cell ID mod 3.

Table 26 is a table showing examples of starting subcarrier indices for an even-numbered preamble repetition unit for the NPRACH preamble format with G=2 and P=4 when Cell ID mod 3=0.

TABLE 26

| Starting subcarrier index (SCselected) of odd-numbered preamble repetition unit → Starting subcarrier index(SCsel) for even-numbered preamble repetition unit | | |
|---|---|---|
| 0 → 7 | 2 → 9 | 4 → 11 |
| 1 → 6 | 3 → 8 | 5 → 10 |
| 6 → 1 | 8 → 3 | 10 → 5 |
| 7 → 0 | 9 → 2 | 11 → 4 |

Table 27 is a table showing examples of starting subcarrier indices for an even-numbered preamble repetition unit for the NPRACH preamble format with G=2 and P=4 when Cell ID mod 3=1.

TABLE 27

| Starting subcarrier index (SCselected) of odd-numbered preamble repetition unit → Starting subcarrier index(SCsel) for even-numbered preamble repetition unit | | |
|---|---|---|
| 0 → 9 | 2 → 11 | 4 → 7 |
| 1 → 8 | 3 → 10 | 5 → 6 |
| 6 → 3 | 8 → 5 | 10 → 1 |
| 7 → 2 | 9 → 4 | 11 → 0 |

Table 28 is a table showing examples of starting subcarrier indices for an even-numbered preamble repetition unit for the NPRACH preamble format with G=2 and P=4 when Cell ID mod 3=2.

TABLE 28

| Starting subcarrier index (SCselected) of odd-numbered preamble repetition unit → Starting subcarrier index(SCsel) for even-numbered preamble repetition unit | | |
|---|---|---|
| 0 → 11 | 2 → 7 | 4 → 9 |
| 1 → 10 | 3 → 6 | 5 → 8 |
| 6 → 5 | 8 → 1 | 10 → 3 |
| 7 → 4 | 9 → 0 | 11 → 2 |

When proposed method 2 is used, since the starting subcarrier index may be randomly selected for each starting subcarrier index value selected by the N-lth preamble unit and/or for each specific cell ID and/or for each RA-RNTI value, it is advantageous that the inter-cell interference is reduced.

Further, since subcarriers in which the even-numbered preamble units may be selected are predetermined according to according to the starting subcarrier value selected by the odd-numbered preamble unit in the same cell, it is advantageous that a probability that preambles randomly transmitted by different UEs will collide with each other within a resource configured by the same cell decreases.

(Proposed Method 3)

In proposed method 3, it may be configured that the starting subcarrier index which may be selected by the Nth preamble unit is predetermined according to the starting subcarrier index value selected by the N-lth preamble unit. A specific example thereof will be described below.

The starting subcarrier index to be selected by the Nth preamble unit may be predetermined according to the starting subcarrier index value selected by the N-1th preamble unit and this may be configured by the equation as shown in Equations 4 and 5 and this may be expressed by the table as shown in Table 30.

$$SCsel=(SCselected \bmod 6)+SCoffset, \text{ if } SCselected \bmod 2=0 \quad \text{[Equation 4]}$$

$$SCsel=\{(SCselected-1)\bmod 6\}+SCoffset, \text{ if } SCselected \bmod 2=1 \quad \text{[Equation 5]}$$

Table 30 is a table showing examples of starting subcarrier indices for an even-numbered preamble repetition unit for the NPRACH preamble format with G=2 and P=4.

TABLE 29

| Starting subcarrier index(SCselected) of odd-numbered preamble repetition unit | SCoffset |
|---|---|
| 0, 2, 4 | 7 |
| 1, 3, 5 | 6 |
| 6, 8, 10 | 1 |
| 7, 9, 11 | 0 |

TABLE 30

| Starting subcarrier index (SCselected) of odd-numbered preamble repetition unit → Starting subcarrier index(SCsel) for even-numbered preamble repetition unit | | |
|---|---|---|
| 0 → 7 | 2 → 9 | 4 → 11 |
| 1 → 6 | 3 → 8 | 5 → 10 |
| 6 → 1 | 8 → 3 | 10 → 5 |
| 7 → 0 | 9 → 2 | 11 → 4 |

As described above, in the method for selecting the starting subcarrier index for each starting subcarrier index selected by the specific N-1th preamble unit, since the subcarriers which may be selected by the even-numbered preamble units may be are predetermined according to the starting subcarrier value selected by the odd-numbered preamble unit in the same cell, it is advantageous that a probability that the preambles randomly transmitted by different UEs will collide with each other within the resource configured by the same cell decreases.

As described above, in the method for selecting the starting subcarrier index for each starting subcarrier index selected by the specific N-1th preamble unit, since the subcarriers which may be selected by the even-numbered preamble units may be are predetermined according to the starting subcarrier value selected by the odd-numbered preamble unit in the same cell, it is advantageous that a probability that the preambles randomly transmitted by different UEs will collide with each other within the resource configured by the same cell decreases.

The specific examples of the proposed methods described above are only for convenience of description and the technical spirit proposed by this specification is not limited to the specific values which are exemplified, of course.

In Table 8 described above, the following hopping pattern may be described for preamble formats 1, 2, and 3 (i.e., preamble formats 0, 1, and 2 of agreement to be described below) with G=2 and P=4.

The following agreement is for (format 0, 1, 2) G=2 and P=4 when repetition number=1.

Tone indexes of first and third symbol groups are selected by (SFN and cell specific pseudo-random sequence) in the preamble repetition unit. An initial tone index for hopping pattern mapping is shown in Table 31 below.

TABLE 31

| Index of the tone used by the 1st symbol group | Deterministic hopping length for the 2nd within a repetition unit |
|---|---|
| 0, 2, 4, 6, 8, 10 | +3.75 kHz |
| 1, 3, 5, 7, 9, 11 | −3.75 kHz |

| Index of the tone used by the 3rd symbol group | Deterministic hopping length for the 4th within a repetition unit |
|---|---|
| 0, 1, 2, 3, 4, 5 | +22.5 kHz |
| 6, 7, 8, 9, 10, 11 | −22.5 kHz |

The initial tone index for the hopping pattern mapping follows Table 31.

Tone indexes of first symbol groups are selected by (SFN and cell specific pseudo-random sequence) in the odd-numbered preamble repetition unit.

For odd preambles transmitted with the tone indexes given for the first and third symbol groups, candidate tone indexes for the first and third symbol groups in the even preamble, with a goal of eliminating phase errors, are selected by the (SFN and) cell specific pseudo-random sequence and the candidate tone indexes are limited to one of the tone indexes in an opposite half of a bandwidth as shown in Table 32.

TABLE 32

| Odd Preamble Repetition Unit | Even Preamble Repetition Unit |
|---|---|
| Index of the tone used by the 1st symbol group | Candidate Indexes for the tone to be used by the 1st symbol group |
| 0, 2, 4, 6, 8, 10 | 1, 3, 5, 7, 9, 11 |
| 1, 3, 5, 7, 9, 11 | 0, 2, 4, 6, 8, 10 |
| Index of the tone used by the 3rd symbol group | Candidate Indexes for the tone to be used by the 3rd symbol group |
| 0, 1, 2, 3, 4, 5 | 6, 7, 8, 9, 10, 11 |
| 6, 7, 8, 9, 10, 11 | 0, 1, 2, 3, 4, 5 |

In the case of FDD, a similar hopping pattern is expressed by the equation of 3GPP standard document 36.211, so that the hopping pattern may be expressed in a similar equation even in TDD.

In FDD (frame structure type 1), the equation for expressing the hopping pattern may be shown in Equations 6 and 7.

Specifically, Equation 6 shows a hopping pattern for G=4 and P=4 for preamble formats 0 and 1 and Equation 7 shows a hopping pattern for G=6 and P=6 for preamble format 2.

$$\tilde{n}_{sc}^{RA}(i) = \begin{cases} (\tilde{n}_{sc}^{RA}(0) + f(i/4)) \bmod N_{sc}^{RA} & i \bmod 4 = 0 \text{ and } i > 0 \\ \tilde{n}_{sc}^{RA}(i-1) + 1 & i \bmod 4 = 1, 3 \text{ and } \tilde{n}_{sc}^{RA}(i-1) \bmod 2 = 0 \\ \tilde{n}_{sc}^{RA}(i-1) - 1 & i \bmod 4 = 1, 3 \text{ and } \tilde{n}_{sc}^{RA}(i-1) \bmod 2 = 1 \\ \tilde{n}_{sc}^{RA}(i-1) + 6 & i \bmod 4 = 2 \text{ and } \tilde{n}_{sc}^{RA}(i-1) < 6 \\ \tilde{n}_{sc}^{RA}(i-1) - 6 & i \bmod 4 = 2 \text{ and } \tilde{n}_{sc}^{RA}(i-1) \geq 6 \end{cases}$$ [Equation 6]

$$f(t) = \left( f(t-1) + \left( \sum_{n=10t+1}^{10t+9} c(n) 2^{n-(10t+1)} \right) \bmod (N_{sc}^{RA} - 1) + 1 \right) \bmod N_{sc}^{RA}$$

$$f(-1) = 0$$

In Equation 6, $\tilde{n}_{SC}^{RA}(0) = n_{init} \bmod N_{sc}^{RA}$ having $n_{init}$ is a subcarrier selected by the MAC layer from $\{0, 1, \ldots, N_{sc}^{PRACH} - 1\}$ and c(i) is defined as shown in Equation 8 below. In addition, a pseudo random sequence generator will be initialized to $c_{init} = N_{ID}^{Ncell}$.

$$\tilde{n}_{SC}^{RA}(i) = \begin{cases} (\tilde{n}_{SC}^{RA}(0) + f(i/6)) \bmod N_{sc}^{RA} & i \bmod 6 = 0 \text{ and } i > 0 \\ \tilde{n}_{SC}^{RA}(i-1) + 1 & i \bmod 6 = 1, 5 \text{ and } \tilde{n}_{SC}^{RA}(i-1) \bmod 2 = 0 \\ \tilde{n}_{SC}^{RA}(i-1) - 1 & i \bmod 6 = 1, 5 \text{ and } \tilde{n}_{SC}^{RA}(i-1) \bmod 2 = 1 \\ \tilde{n}_{SC}^{RA}(i-1) + 3 & i \bmod 6 = 2, 4 \text{ and } \lfloor \tilde{n}_{SC}^{RA}(i-1)/3 \rfloor \bmod 2 = 0 \\ \tilde{n}_{SC}^{RA}(i-1) - 3 & i \bmod 6 = 2, 4 \text{ and } \lfloor \tilde{n}_{SC}^{RA}(i-1)/3 \rfloor \bmod 2 = 1 \\ \tilde{n}_{SC}^{RA}(i-1) + 18 & i \bmod 6 = 3 \text{ and } \tilde{n}_{SC}^{RA}(i-1) < 18 \\ \tilde{n}_{SC}^{RA}(i-1) - 18 & i \bmod 6 = 3 \text{ and } \tilde{n}_{SC}^{RA}(i-1) \geq 18 \end{cases}$$ [Equation 7]

$$f(t) = \left( f(t-1) + \left( \sum_{n=10t+1}^{10t+9} c(n) 2^{n-(10t+1)} \right) \bmod (N_{sc}^{RA} - 1) + 1 \right) \bmod N_{sc}^{RA}$$

Here, $f(-1)=0$ and $\tilde{n}_{SC}^{RA}(0) = n_{init} \bmod N_{sc}^{RA}$ having $n_{init}$ is a subcarrier selected by the MAC layer from $\{0, 1, \ldots, N_{sc}^{NPRACH} - 1\}$ and c(i) is defined as shown in Equation 8 below. In addition, the pseudo random sequence generator will be initialized to $c_{init} = N_{ID}^{Ncell}$.

$$c(n) = (x_1(n+N_C) + x_2(n+N_C)) \bmod 2$$

$$x_1(n+31) = (x_1(n+3) + x_1(n)) \bmod 2$$

$x_2(n+31)=(x_2(n+3)+x_2(n+2)+x_2(n+1)+x_2(n)) \bmod 2$ [Equation 8]

Here, n=0, 1, ..., $M_{PN}$−1 and n=0, 1, ..., $M_{PN}$−1.

Of the parts of the hopping pattern in the TDD (frame structure type 2) to be described below, the same parts as those of the hopping pattern in the FDD will be referred to the meaning of the contents, symbols, and the like described above.

Characteristically, pseudo random hopping may be a form that is called (or generated) sequentially 2N times in total when the preamble repetition number is N and may be represented by one equation according to the symbol group index (i.e., i).

In this case, 'sequential' means that when a subcarrier index of each symbol group that requires the pseudo random hopping is selected, the pseudo random sequence is sequentially generated according to an order (or ascending order) of increasing the symbol group index.

Since P=4, one preamble includes four symbol groups, while the subcarrier index of the even-numbered preamble depends on the subcarrier index of the odd-numbered preamble.

For example, when the subcarrier index of the odd-numbered preamble (of the first symbol group) is an even number, the subcarrier index of the even-numbered preamble (of the first symbol group) needs to be an odd number, and when the subcarrier index of the odd-numbered preamble is an odd number, the subcarrier index of the even-numbered preamble needs to be an even number.

As described above, only when the subcarrier index of the odd-numbered preamble and the subcarrier index of the even-numbered preamble are different from each other, the collision between the NPRACH preambles does not occur, so that the performance at the receiver is enhanced.

However, when a frequency hopping rule in FDD is applied to repeated transmission of the NPRACH preamble with G=2 and P=4, the rule may not be satisfied between the subcarrier index of the odd-numbered preamble (or the subcarrier index of the odd-numbered preamble) and the subcarrier index of the even-numbered preamble (or the subcarrier index of the even-numbered preamble).

Therefore, the repeated transmission method of the NPRACH preamble with G=2 and P=4 in the TDD system will be described in more detail.

When P=4, since the hopping pattern of each of the 8 symbol groups has a repetitive form, modular 8 is considered as shown in Equation 9 below.

The above method is defined by referring to an FDD form disclosed in the standard document TS 36.211 as shown in Equation 9 below.

In Equation 9 below, $\tilde{n}_{SC}^{RA}(i)$ and $\tilde{n}_{SC}^{RA}(i)$ are modified or added parts and the remaining parts are the same as the FDD form defined in the standard document TS 36.211.

[Equation 9]

$$\tilde{n}_{sc}^{RA}(i) = \begin{cases} \tilde{n}_{sc}^{RA}(i) & i \bmod 8 = 0, 2 \text{ and } i > 0 \\ \tilde{n}_{sc}^{RA}(i-1)+1 & i \bmod 8 = 1, 5 \text{ and } \tilde{n}_{sc}^{RA}(i-1) \bmod 2 = 0 \\ \tilde{n}_{sc}^{RA}(i-1)-1 & i \bmod 8 = 1, 5 \text{ and } \tilde{n}_{sc}^{RA}(i-1) \bmod 2 = 1 \\ \tilde{n}_{sc}^{RA}(i-1)+6 & i \bmod 8 = 3, 7 \text{ and } \tilde{n}_{sc}^{RA}(i-1) < 6 \\ \tilde{n}_{sc}^{RA}(i-1)-6 & i \bmod 8 = 3, 7 \text{ and } \tilde{n}_{sc}^{RA}(i-1) \geq 6 \\ \tilde{n}_{sc}^{RA}(i)+1 & i \bmod 8 = 4 \text{ and } \tilde{n}_{sc}^{RA}(i-4) \bmod 2 = 0 \text{ and } \tilde{n}_{sc}^{RA}(i) \bmod 2 = 0 \\ \tilde{n}_{sc}^{RA}(i) & i \bmod 8 = 4 \text{ and } \tilde{n}_{sc}^{RA}(i-4) \bmod 2 = 0 \text{ and } \tilde{n}_{sc}^{RA}(i) \bmod 2 = 1 \\ \tilde{n}_{sc}^{RA}(i) & i \bmod 8 = 4 \text{ and } \tilde{n}_{sc}^{RA}(i-4) \bmod 2 = 1 \text{ and } \tilde{n}_{sc}^{RA}(i) \bmod 2 = 0 \\ \tilde{n}_{sc}^{RA}(i)-1 & i \bmod 8 = 4 \text{ and } \tilde{n}_{sc}^{RA}(i-4) \bmod 2 = 1 \text{ and } \tilde{n}_{sc}^{RA}(i) \bmod 2 = 1 \\ \tilde{n}_{sc}^{RA}(i)+6 & i \bmod 8 = 6 \text{ and } \tilde{n}_{sc}^{RA}(i-4) < 6 \text{ and } \tilde{n}_{sc}^{RA}(i) < 6 \\ \tilde{n}_{sc}^{RA}(i) & i \bmod 8 = 6 \text{ and } \tilde{n}_{sc}^{RA}(i-4) < 6 \text{ and } \tilde{n}_{sc}^{RA}(i) \geq 6 \\ \tilde{n}_{sc}^{RA}(i) & i \bmod 8 = 6 \text{ and } \tilde{n}_{sc}^{RA}(i-4) \geq 6 \text{ and } \tilde{n}_{sc}^{RA}(i) < 6 \\ \tilde{n}_{sc}^{RA}(i)-6 & i \bmod 8 = 6 \text{ and } \tilde{n}_{sc}^{RA}(i-4) \geq 6 \text{ and } \tilde{n}_{sc}^{RA}(i) \geq 6 \end{cases}$$

$$\tilde{n}_{sc}^{RA}(i) = \left(\tilde{n}_{sc}^{RA}(0) + f(i/2)\right) \bmod N_{sc}^{RA}$$

$$f(t) = \left(f(t-1) + \left(\sum_{n=10t+1}^{10t+9} c(n) 2^{n-(10t+1)}\right) \bmod (N_{sc}^{RA}-1) + 1\right) \bmod N_{sc}^{RA}$$

$$f(-1) = 0$$

The frequency location of the NPRACH transmission is limited to $N_{sc}^{RA}$=12 subcarriers. Frequency hopping is used in 12 subcarriers.

Here, the frequency location of an ith symbol group may be given as $n_{sc}^{RA}(i)=n_{start}+\tilde{n}_{sc}^{RA}(i)$ and defined as $n_{start}=N_{scoffset}^{NPRACH}+\lfloor n_{init}/N_{sc}^{RA} \rfloor \cdot N_{sc}^{RA}$.

A quantity $\tilde{n}_{sc}^{RA}(i)$ depends on a frame structure.

In addition, $\tilde{n}_{SC}^{RA}(0)=n_{init} \bmod N_{sc}^{RA}$ having $n_{init}$ is the subcarrier selected by the MAC layer from {0, 1, ..., $N_{sc}^{NPRACH}$−1} and the pseudo random sequence c(i) is defined as shown in Equation 8 above and the pseudo random sequence generator will be initialized to $c_{init}=N_{ID}^{Ncell}$.

Characteristically, the method used in Equation 9 above will now be described below in a situation where not one of 12 subcarrier indexes of the even-numbered preamble but one of 6 subcarrier indexes needs to be selected.

The ith symbol group satisfying i mod 8=4 is selected in a scheme shown in Table 34.

When such a scheme is used, the value selected through the pseudo random sequence shifts by ±1 subcarrier, and thus it is advantageous that expression of the equation becomes simple.

Table 34 shows an example of the subcarrier index when i mod 8=4.

TABLE 34

| | Subcarrier index chosen by pseudo random sequence | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| Selected subcarrier index for up hop | 0 | 0 | 2 | 2 | 4 | 4 | 6 | 6 | 8 | 8 | 1 | 1 |
| Selected subcarrier index for down hop | 1 | 1 | 3 | 3 | 5 | 5 | 7 | 7 | 9 | 9 | 11 | 11 |

Additionally, when a scheme of selecting one of 6 subcarrier indexes instead of one of 12 subcarrier indexes is actually applied in the situation where not one of 12 subcarrier indexes of the even-numbered preamble but one of 6 subcarrier indexes needs to be selected, a method shown in Table 35 may be considered.

Table 35 shows an example of the subcarrier index when i mod 8=4.

TABLE 35

| | Subcarrier index chosen by pseudo random sequence | | | | | |
|---|---|---|---|---|---|---|
| | 0 | 1 | 2 | 3 | 4 | 5 |
| Selected subcarrier index for up hop | 0 | 2 | 4 | 6 | 8 | 10 |
| Selected subcarrier index for down hop | 1 | 3 | 5 | 7 | 9 | 11 |

When Equation 9 above is modified by using the above scheme, Equation 9 may be expressed as shown in Equation 10 below.

That is, the above scheme corresponding to Equation 10 has an advantage that the expression of the equation is simpler than the scheme corresponding to Equation 9 above.

Further, a meaning of selecting one of 6 subcarrier indexes is clearly represented in the equation. In Equation 10 below, $\tilde{n}_{SC}^{RA}(i)$ is the modified/added part and the remaining parts are the same as the FDD form defined in the standard document TS 36.211.

The frequency locating of the NPRACH transmission is limited to $N_{sc}^{RA}=12$ subcarriers. The frequency hopping is used in 12 subcarriers.

Here, the frequency location of an ith symbol group may be given as $n_{sc}^{RA}(i)=n_{start}+\tilde{n}_{SC}^{RA}(i)$ and $n_{start}=N_{scoffset}^{NPRACH}+\lfloor n_{init}/N_{sc}^{RA} \rfloor \cdot N_{sc}^{RA}$.

In addition, $\tilde{n}_{SC}^{RA}(0)=n_{init}$ mod $N_{sc}^{RA}$ having $n_{init}$ is the subcarrier selected by the MAC layer from {0, 1, . . . , $N_{sc}^{NPRACH}-1$} and c(i) is defined as shown in Equation 8 above. Further, the pseudo random sequence generator will be initialized to $c_{init}=N_{ID}^{Ncell}$.

Figure 33:
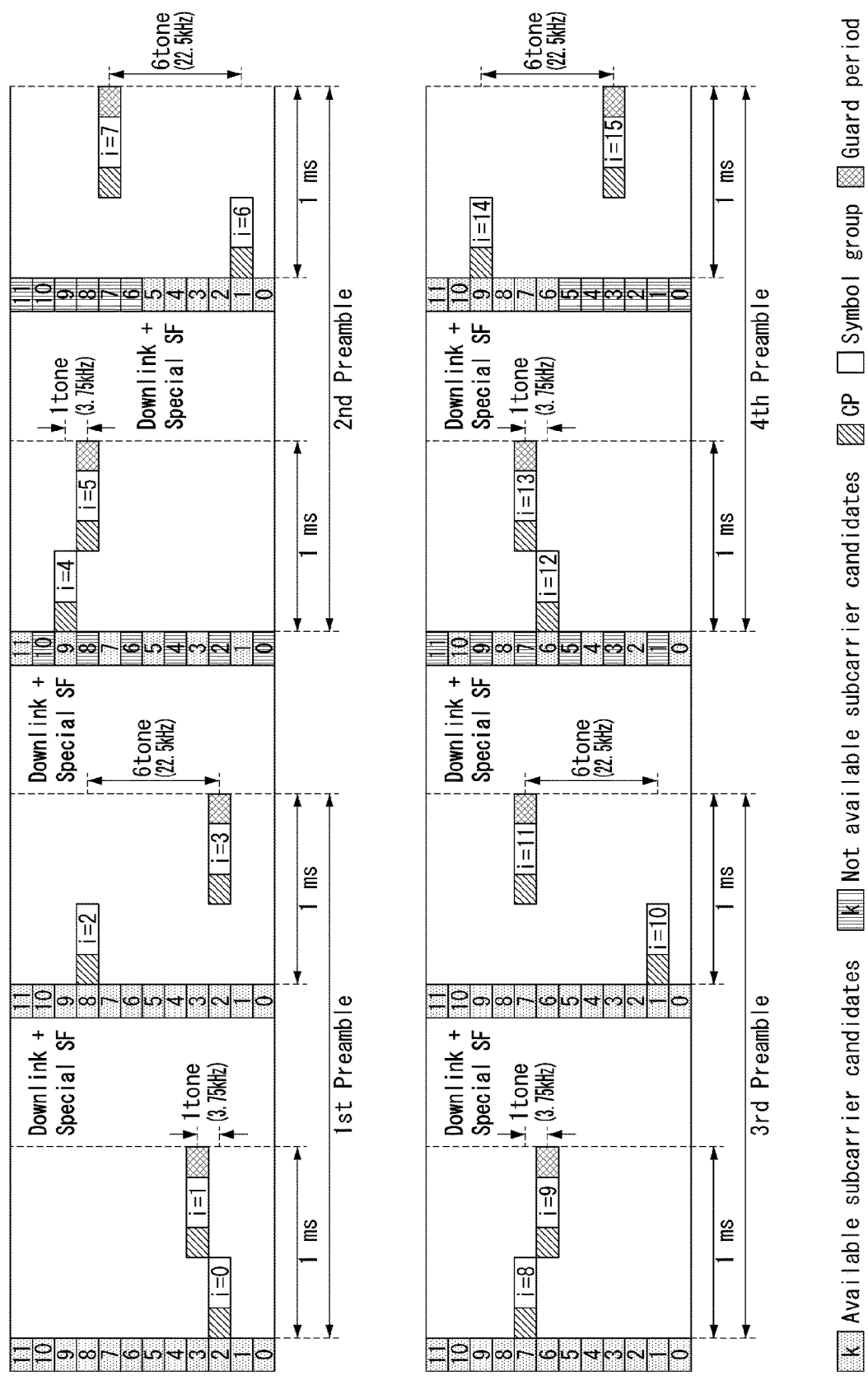
FIG. 33 is a diagram illustrating an example of an NPRACH hopping pattern having an NPRACH preamble format 1 and repetition number=4 proposed by this specification.

Preamble format 1 (i.e. preamble format 0 of agreement) is used based on the proposed equation and an example of the case where the repetition number is 4 is shown in FIG. 33.

Referring to FIG. 33, a 1st symbol group (i.e., i mod 8=0) and a 3rd symbol group (i.e., i mod 8=2) of the odd-numbered preamble (i.e., 1st and 3rd) indicates that one of 12 subcarriers may be selected.

In addition, the 1st symbol group (i.e., i mod 8=4) and the 3rd symbol group (i.e., i mod 8=6) of the even-numbered preamble (i.e., 2nd and 4th) indicates that one of 6 subcarrier indexes may be selected according to the subcarrier indexes of the 1st symbol group and the 3rd symbol group of the odd-numbered preamble which is transmitted immediately before.

FIG. 33 is a diagram illustrating an example of an NPRACH hopping pattern having NPRACH preamble format 1 and repetition number=4 proposed by this specification.

Additionally, a method for selecting two initial values in the MAC layer and using two pseudo random sequence generators is expressed as the equation as shown in Equation 11 below.

Characteristically, initialization values of two pseudo random sequence generators may be generated based on physical cell ID (PCID), and one may be $N_{ID}^{Ncell}$ like the related art and the other one may be $(N_{ID}^{Ncell}+1)$ mod 504.

In the above method, it may be configured that since two initial values need to be selected in the MAC layer, a first value of two initial values is determined as the RAPID.

[Equation 10]

$$\tilde{n}_{sc}^{RA}(i) = \begin{cases} (\tilde{n}_{sc}^{RA}(0) + f(i/2)) \mod N_{sc}^{RA} & i\mod 8 = 0, 2 \text{ and } i > 0 \\ \tilde{n}_{sc}^{RA}(i-1) + 1 & i\mod 8 = 1, 5 \text{ and } \tilde{n}_{sc}^{RA}(i-1)\mod 2 = 0 \\ \tilde{n}_{sc}^{RA}(i-1) - 1 & i\mod 8 = 1, 5 \text{ and } \tilde{n}_{sc}^{RA}(i-1)\mod 2 = 1 \\ \tilde{n}_{sc}^{RA}(i-1) + 6 & i\mod 8 = 3, 7 \text{ and } \tilde{n}_{sc}^{RA}(i-1) < 6 \\ \tilde{n}_{sc}^{RA}(i-1) - 6 & i\mod 8 = 3, 7 \text{ and } \tilde{n}_{sc}^{RA}(i-1) \geq 6 \\ ((\tilde{n}_{sc}^{RA}(0) + f(i/2)) \mod (N_{sc}^{RA}/2)) \times 2 + 1 & i\mod 8 = 4 \text{ and } \tilde{n}_{sc}^{RA}(i-4)\mod 2 = 0 \\ ((\tilde{n}_{sc}^{RA}(0) + f(i/2)) \mod (N_{sc}^{RA}/2)) \times 2 & i\mod 8 = 4 \text{ and } \tilde{n}_{sc}^{RA}(i-4)\mod 2 = 1 \\ (\tilde{n}_{sc}^{RA}(0) + f(i/2)) \mod (N_{sc}^{RA}/2) + 6 & i\mod 8 = 6 \text{ and } \tilde{n}_{sc}^{RA}(i-4) < 6 \\ (\tilde{n}_{sc}^{RA}(0) + f(i)/2)) \mod (N_{sc}^{RA}/2) & i\mod 8 = 6 \text{ and } \tilde{n}_{sc}^{RA}(i-4) \geq 6 \end{cases}$$

$$f(t) = \left( f(t-1) + \left( \sum_{n=10t+1}^{10t+9} c(n) 2^{n-(10t+1)} \right) \mod (N_{sc}^{RA} - 1) + 1 \right) \mod N_{sc}^{RA}$$

$$f(-1) = 0$$

[Equation 11]

$$\tilde{n}_{sc}^{RA}(i) = \begin{cases} (\tilde{n}_{sc}^{RA}(0) + f(i/4)) \bmod N_{sc}^{RA} & i \bmod 8 = 0 \text{ and } i > 0 \\ (\tilde{n}_{sc}^{RA}(0) + g((i-2)/4)) \bmod N_{sc}^{RA} & i \bmod 8 = 2 \text{ and } i > 2 \\ \tilde{n}_{sc}^{RA}(i-1) + 1 & i \bmod 8 = 1, 5 \text{ and } \tilde{n}_{sc}^{RA}(i-1) \bmod 2 = 0 \\ \tilde{n}_{sc}^{RA}(i-1) - 1 & i \bmod 8 = 1, 5 \text{ and } \tilde{n}_{sc}^{RA}(i-1) \bmod 2 = 1 \\ \tilde{n}_{sc}^{RA}(i-1) + 6 & i \bmod 8 = 3, 7 \text{ and } \tilde{n}_{sc}^{RA}(i-1) < 6 \\ \tilde{n}_{sc}^{RA}(i-1) - 6 & i \bmod 8 = 3, 7 \text{ and } \tilde{n}_{sc}^{RA}(i-1) \geq 6 \\ ((\tilde{n}_{sc}^{RA}(0) + f(i/4)) \bmod (N_{sc}^{RA}/2)) \times 2 + 1 & i \bmod 8 = 4 \text{ and } \tilde{n}_{sc}^{RA}(i-4) \bmod 2 = 0 \\ ((\tilde{n}_{sc}^{RA}(0) + f(i/4)) \bmod (N_{sc}^{RA}/2)) \times 2 & i \bmod 8 = 4 \text{ and } \tilde{n}_{sc}^{RA}(i-4) \bmod 2 = 1 \\ (\tilde{n}_{sc}^{RA}(0) + g((i-2)/4)) \bmod (N_{sc}^{RA}/2) + 6 & i \bmod 8 = 6 \text{ and } \tilde{n}_{sc}^{RA}(i-4) < 6 \\ (\tilde{n}_{sc}^{RA}(0) + g((i-2)/4)) \bmod (N_{sc}^{RA}/2) & i \bmod 8 = 6 \text{ and } \tilde{n}_{sc}^{RA}(i-4) \geq 6 \end{cases}$$

$$f(t) = \left( f(t-1) + \left( \sum_{n=10t+1}^{10t+9} c(n) 2^{n-(10t+1)} \right) \bmod (N_{sc}^{RA} - 1) + 1 \right) \bmod N_{sc}^{RA}$$

$$f(-1) = 0$$

$$g(t) = \left( g(t-1) + \left( \sum_{n=10t+1}^{10t+9} c'(n) 2^{n-(10t+1)} \right) \bmod (N_{sc}^{RA} - 1) + 1 \right) \bmod N_{sc}^{RA}$$

$$g(-1) = 0$$

The frequency location of the NPRACH transmission is limited to $N_{sc}^{RA}=12$ subcarriers. The frequency hopping is used in 12 subcarriers.

Here, the frequency location of the ith symbol group may be given as $n_{sc}^{RA}(i) = n_{start} + \tilde{n}_{sc}^{RA}(i)$ and $n_{start} = N_{scoffset}^{NPRACH} + \lfloor n_{init}/N_{sc}^{RA} \rfloor \cdot N_{sc}^{RA}$.

In addition, $\tilde{n}_{SC}^{RA}(0) = n_{init} \bmod N_{sc}^{RA}$ having $n_{init}$ is the subcarrier selected by the MAC layer from $\{0, 1, \ldots, N_{sc}^{NPRACH}-1\}$, $\tilde{n}_{SC}^{RA}(2) = n'_{init} \bmod N_{sc}^{RA}$ having $n'_{init}$ is a second subcarrier selected by the MAC layer from $\{0, 1, \ldots, N_{sc}^{NPRACH}-1\}$, and $c(i)$ is defined as shown in Equation 8 above.

In addition, the pseudo random sequence generator will be initialized to $c_{iinit} = N_{ID}^{Ncell}$.

Further, pseudo random sequence $c'(n)$ is defined as shown in Equation 8 above and the pseudo random sequence generator will be initialized to $c_{init} = (N_{ID}^{Ncell} + 1) \bmod 504$.

Additionally, a method for selecting two initial values in the MAC layer, but using one pseudo random sequence generators is expressed as the equation as shown in Equation 12 below. In this method, it may be configured that since two initial values need to be selected in the MAC layer, the first value of two initial values is determined as the RAPID.

[Equation 12]

$$\tilde{n}_{sc}^{RA}(i) = \begin{cases} (\tilde{n}_{sc}^{RA}(0) + f(i/2)) \bmod N_{sc}^{RA} & i \bmod 8 = 0, 2 \text{ and } i > 2 \\ \tilde{n}_{sc}^{RA}(i-1) + 1 & i \bmod 8 = 1, 5 \text{ and } \tilde{n}_{sc}^{RA}(i-1) \bmod 2 = 0 \\ \tilde{n}_{sc}^{RA}(i-1) - 1 & i \bmod 8 = 1, 5 \text{ and } \tilde{n}_{sc}^{RA}(i-1) \bmod 2 = 1 \\ \tilde{n}_{sc}^{RA}(i-1) + 6 & i \bmod 8 = 3, 7 \text{ and } \tilde{n}_{sc}^{RA}(i-1) < 6 \\ \tilde{n}_{sc}^{RA}(i-1) - 6 & i \bmod 8 = 3, 7 \text{ and } \tilde{n}_{sc}^{RA}(i-1) \geq 6 \\ ((\tilde{n}_{sc}^{RA}(0) + f(i/2)) \bmod (N_{sc}^{RA}/2)) \times 2 + 1 & i \bmod 8 = 4 \text{ and } \tilde{n}_{sc}^{RA}(i-4) \bmod 2 = 0 \\ ((\tilde{n}_{sc}^{RA}(0) + f(i/2)) \bmod (N_{sc}^{RA}/2)) \times 2 & i \bmod 8 = 4 \text{ and } \tilde{n}_{sc}^{RA}(i-4) \bmod 2 = 1 \\ (\tilde{n}_{sc}^{RA}(0) + f(i/2)) \bmod (N_{sc}^{RA}/2) + 6 & i \bmod 8 = 6 \text{ and } \tilde{n}_{sc}^{RA}(i-4) < 6 \\ (\tilde{n}_{sc}^{RA}(0) + f(i)/2)) \bmod (N_{sc}^{RA}/2) & i \bmod 8 = 6 \text{ and } \tilde{n}_{sc}^{RA}(i-4) \geq 6 \end{cases}$$

$$f(t) = \left( f(t-1) + \left( \sum_{n=10t+1}^{10t+9} c(n) 2^{n-(10t+1)} \right) \bmod (N_{sc}^{RA} - 1) + 1 \right) \bmod N_{sc}^{RA}$$

$$f(-1) = 0$$

The frequency location of the NPRACH transmission is limited to Nr=$^{12}$ subcarriers. The frequency hopping is used in 12 subcarriers.

Here, the frequency location of the ith symbol group may be given as $n_{sc}^{RA}(i)=n_{start}+\tilde{n}_{SC}^{RA}(i)$ and $n_{start}=N_{scoffset}^{NPRACH}+\lfloor n_{init}/N_{sc}^{RA}\rfloor \cdot N_{sc}^{RA}$.

In addition, $\tilde{n}_{SC}^{RA}(0)=n_{init}$ mod $N_{sc}^{RA}$ having $n_{init}$ is a first subcarrier selected by the MAC layer from $\{0, 1, \ldots, N_{sc}^{NPRACH}-1\}$, $\tilde{n}_{SC}^{RA}(2)=n'_{init}$ mod $N_{sc}^{RA}$ having $n'_{init}$ is a second subcarrier selected by the MAC layer from $\{0, 1, \ldots, N_{sc}^{NPRACH}-1\}$, and c(i) is defined as shown in Equation 8 above.

In addition, the pseudo random sequence generator will be initialized to $c_{init}=N_{ID}^{Ncell}$.

Further, in Table 8 above, the following hopping pattern may be described for preamble formats 0, 2A (i.e., preamble formats 0-a, 1-a of agreement) with G=3 and P=6.

In this case, 'sequential' means that when a subcarrier index of each symbol group that requires the pseudo random hopping is selected, the pseudo random sequence is sequentially generated according to an order in which the symbol group index becomes larger.

Characteristically, since P=6, one preamble has 6 symbol groups, so that the hopping pattern is repeated every 6 symbol groups, and as a result, modular 6 is considered.

The hopping pattern is prepared as below by referring to the form defined in the standard document TS 36.211.

In the equation below, $\tilde{n}_{SC}^{RA}(i)$ is the modified/added part and the remaining part is the same as the FDD form defined in the standard document TS 36.211.

$$\tilde{n}_{sc}^{RA}(i) = \begin{cases} (\tilde{n}_{sc}^{RA}(0) + f(i/3))\bmod N_{sc}^{RA} & i\bmod 6 = 0, 3 \text{ and } i > 0 \\ \tilde{n}_{sc}^{RA}(i-1) + 1 & i\bmod 6 = 1, 2 \text{ and } \tilde{n}_{sc}^{RA}(i-1)\bmod 2 = 0 \\ \tilde{n}_{sc}^{RA}(i-1) - 1 & i\bmod 6 = 1, 2 \text{ and } \tilde{n}_{sc}^{RA}(i-1)\bmod 2 = 1 \\ \tilde{n}_{sc}^{RA}(i-1) + 6 & i\bmod 6 = 4, 5 \text{ and } \tilde{n}_{sc}^{RA}(i-1) < 6 \\ \tilde{n}_{sc}^{RA}(i-1) - 6 & i\bmod 6 = 4, 5 \text{ and } \tilde{n}_{sc}^{RA}(i-1) \geq 6 \end{cases}$$ [Equation 13]

$$f(t) = \left(f(t-1) + \left(\sum_{n=10t+1}^{10t+9} c(n)2^{n-(10t+1)}\right)\bmod(N_{sc}^{RA}-1) + 1\right)\bmod N_{sc}^{RA}$$

$$f(-1) = 0$$

The following agreement is for (format 0-a, 1-a) G=3 and P=6.

Tone indexes of first and fourth symbol groups are selected by (SFN and cell specific pseudo-random sequence) in the preamble repetition unit. Initial tone indexes of first and fourth symbol groups for the hopping pattern mapping are shown in Tables 36 and 37 below.

Table 36 below shows examples of hopping patterns for second and third symbol groups in the repetition unit.

TABLE 36

| Index of the tone used by the 1st symbol group | Hopping pattern for the 2nd and 3rd symbol group within a repetition unit |
| --- | --- |
| 0, 2, 4, 6, 8, 10 | +3.75 kHz, −3.75 kHz |
| 1, 3, 5, 7, 9, 11 | −3.75 kHz, +3.75 kHz |

Table 37 below shows examples of hopping patterns for fifth and sixth symbol groups in the repetition unit.

TABLE 37

| Index of the tone used by the 4th symbol group | Hopping pattern for the 5th and 6th symbol group within a repetition unit |
| --- | --- |
| 0, 1, 2, 3, 4, 5 | +22.5 kHz, −22.5 kHz |
| 6, 7, 8, 9, 10, 11 | −22.5 kHz, +22.5 kHz, |

Similarly to the above description, since the similar hopping pattern is defined in the standard document TS 36.211 in the case of FDD, the hopping pattern may be defined in the similar equation even in TDD.

Characteristically, pseudo random hopping may be a form that is called (or generated) sequentially 2N times in total when the preamble repetition number is N and may be represented by one equation according to the symbol group index (i.e., i).

The frequency location of the NPRACH transmission is limited to $N_{sc}^{RA}$=12 subcarriers. The frequency hopping is used in 12 subcarriers.

Here, the frequency location of the ith symbol group may be given as $n_{sc}^{RA}(i)=n_{start}+\tilde{n}_{SC}^{RA}(i)$ and $n_{start}=N_{scoffset}^{NPRACH}+\lfloor n_{init}/N_{sc}^{RA}\rfloor \cdot N_{sc}^{RA}$.

In addition, $\tilde{n}_{SC}^{RA}(0)=n_{init}$ mod $N_{sc}^{RA}$ having $n_{init}$ is a first subcarrier selected by the MAC layer from $\{0, 1, \ldots, N_{sc}^{NPRACH}-1\}$ and c(i) is defined as shown in Equation 8 above. In addition, the pseudo random sequence generator will be initialized to $c_{init}=N_{ID}^{Ncell}$.

Figure 34:
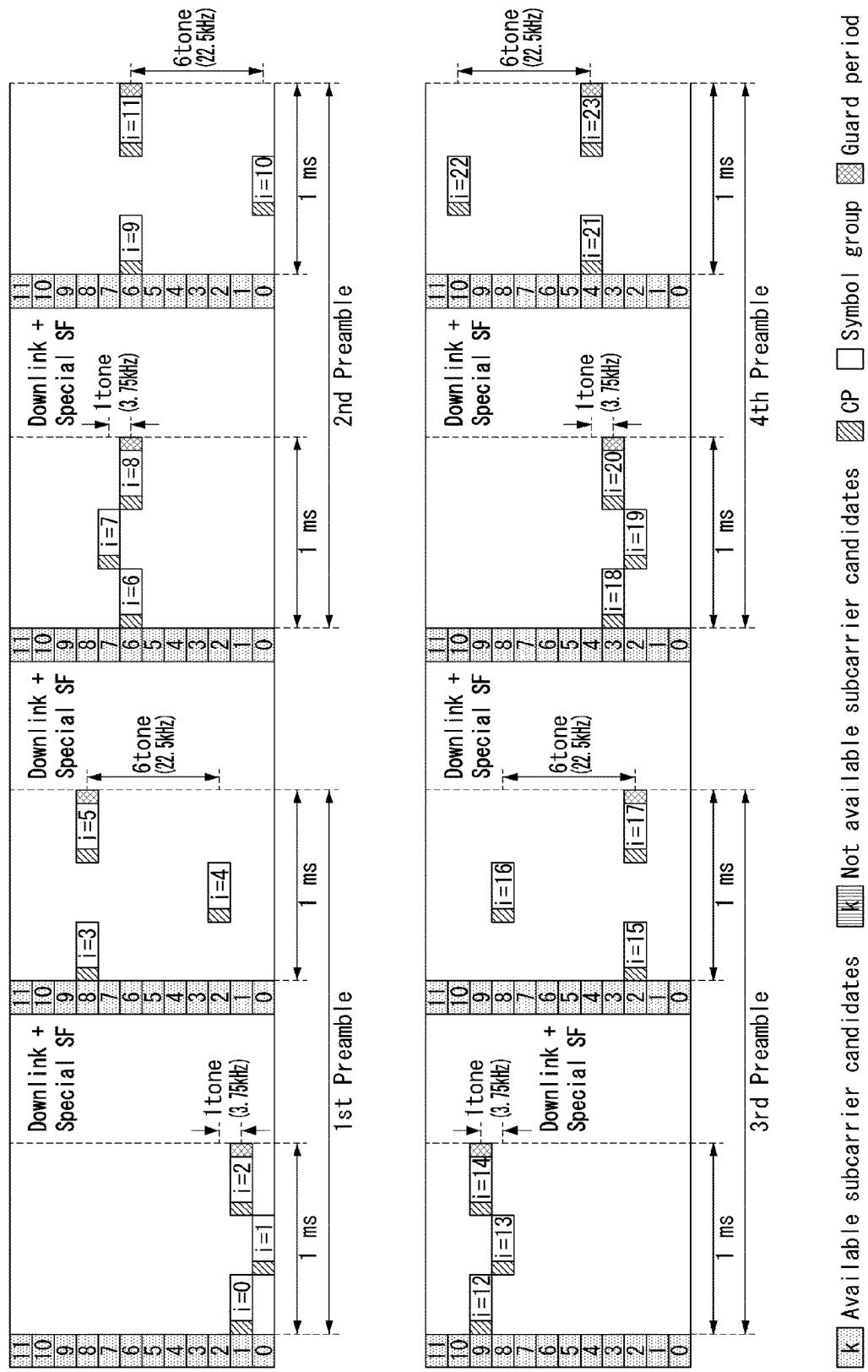
FIG. 34 is a diagram illustrating an example of an NPRACH hopping pattern having an NPRACH preamble format 0 and repetition number=4 proposed by this specification.

Preamble format 0 (i.e. preamble format 0-a of agreement) is used based on Equation 13 proposed above and an example of the case where the repetition number is 4 is shown in FIG. 34.

Referring to FIG. 34, a 1st symbol group (i.e., i mod 6=0) and a 3rd symbol group (i.e., i mod 6=3) of each preamble indicate that one of 12 subcarrier indexes may be selected.

Characteristically, in the case of G=3 and P=6, it can be seen that there is no 'not available subcarrier candidate' as compared with the case of G=2 and P=4 described above.

FIG. 34 is a diagram illustrating an example of an NPRACH hopping pattern having NPRACH preamble format 0 and repetition number=4 proposed by this specification.

Both CID and SFN may be considered in $c_{init}$ of Equation 13, which is advantageous in terms of reducing the inter-cell interference.

For example, $c_{init}$=CID+SFN may be configured.

Here, a difference between Equation 15 above and the equation defined in FDD is a function related to determining the frequency location (or subcarrier index) of the first symbol group among three consecutive symbol groups.

That is, in TDD, f(i/3) is used as shown in Equation 15 and in FDD, f(i/4) is used.

A technical reason for using f(i/3) in TDD is that (i) the number of consecutive symbol groups at 1 ms may be limited to three by the UL/DL configuration and f(i/3) is used for applying the pseudo random sequence in order to minimize the collision between the first symbol groups in each of the first consecutive symbol groups and the second consecutive symbol groups and (ii) the pseudo random sequence may be used in the ascending order without interruption only by applying f(i/3).

Additionally, the method for selecting two initial values in the MAC layer and using two pseudo random sequence generators is expressed as the equation as shown in Equation 14.

Characteristically, the initialization values of two pseudo random sequence generators may be generated based on the PCID, and one may be $N_{ID}^{Ncell}$ like the related art and the other one may be $(N_{ID}^{Ncell}+1)$ mod 504.

In this method, it may be configured that since two initial values need to be selected by the MAC layer, the first value of two initial values is determined as the RAPID.

[Equation 14]
$$\tilde{n}_{sc}^{RA}(i) = \begin{cases} (\tilde{n}_{sc}^{RA}(0) + f(i/3)) \bmod N_{sc}^{RA} & i \bmod 6 = 0 \text{ and } i > 0 \\ (\tilde{n}_{sc}^{RA}(0) + g((i-3)/3)) \bmod N_{sc}^{RA} & i \bmod 6 = 3 \text{ and } i > 3 \\ \tilde{n}_{sc}^{RA}(i-1) + 1 & i \bmod 6 = 1, 2 \text{ and } \tilde{n}_{sc}^{RA}(i-1) \bmod 2 = 0 \\ \tilde{n}_{sc}^{RA}(i-1) - 1 & i \bmod 6 = 1, 2 \text{ and } \tilde{n}_{sc}^{RA}(i-1) \bmod 2 = 1 \\ \tilde{n}_{sc}^{RA}(i-1) + 6 & i \bmod 6 = 4, 5 \text{ and } \tilde{n}_{sc}^{RA}(i-1) < 6 \\ \tilde{n}_{sc}^{RA}(i-1) - 6 & i \bmod 6 = 4, 5 \text{ and } \tilde{n}_{sc}^{RA}(i-1) \geq 6 \end{cases}$$

$$f(t) = \left(f(t-1) + \left(\sum_{n=10t+1}^{10t+9} c(n)2^{n-(10t+1)}\right) \bmod (N_{sc}^{RA} - 1) + 1\right) \bmod N_{sc}^{RA}$$

$$f(-1) = 0$$

$$g(t) = \left(g(t-1) + \left(\sum_{n=10t+1}^{10t+9} c'(n)2^{n-(10t+1)}\right) \bmod (N_{sc}^{RA} - 1) + 1\right) \bmod N_{sc}^{RA}$$

$$g(-1) = 0$$

The frequency location of the NPRACH transmission is limited to $Nr=12$ subcarriers. Frequency hopping is used in 12 subcarriers.

Here, the frequency location of an ith symbol group may be given as $n_{sc}^{RA}(i) = n_{start} + \tilde{n}_{sc}^{RA}(i)$ and defined as $n_{start} = N_{scoffset}^{NPRACH} + \lfloor n_{init}/N_{sc}^{RA} \rfloor \cdot N_{sc}^{RA}$.

A quantity $\tilde{n}_{sc}^{RA}(i)$ depends on a frame structure.

In addition, $\tilde{n}_{SC}^{RA}(0) = n_{init} \bmod N_{sc}^{RA}$ having $n_{init}$ is the first subcarrier selected by the MAC layer from $\{0, 1, \ldots, N_{sc}^{NPRACH}-1\}$ and $\tilde{n}_{SC}^{RA}(2) = n'_{init} \bmod N_{sc}^{RA}$ having $n'_{init}$ is the second subcarrier selected by the MAC layer from $\{0, 1, \ldots, N_{sc}^{NPRACH}-1\}$, and the pseudo random sequence c(i) is defined as shown in Equation 8 above and the pseudo random sequence generator will be initialized to $c_{init} = N_{ID}^{Ncell}$.

Further, pseudo random sequence c'(n) is defined as shown in Equation 8 above and the pseudo random sequence generator will be initialized to $c_{init} = (N_{ID}^{Ncell}+1) \bmod 504$.

Additionally, a method for selecting two initial values in the MAC layer, but using one pseudo random sequence generators is expressed as the equation as shown in Equation 15 below.

In this method, it may be configured that since two initial values need to be selected in the MAC layer, a first value of two initial values is determined as the RAPID.

[Equation 15]
$$\tilde{n}_{sc}^{RA}(i) = \begin{cases} (\tilde{n}_{sc}^{RA}(0) + f(i/3)) \bmod N_{sc}^{RA} & i \bmod 6 = 0, 3 \text{ and } i > 3 \\ \tilde{n}_{sc}^{RA}(i-1) + 1 & i \bmod 6 = 1, 2 \text{ and } \tilde{n}_{sc}^{RA}(i-1) \bmod 2 = 0 \\ \tilde{n}_{sc}^{RA}(i-1) - 1 & i \bmod 6 = 1, 2 \text{ and } \tilde{n}_{sc}^{RA}(i-1) \bmod 2 = 1 \\ \tilde{n}_{sc}^{RA}(i-1) + 6 & i \bmod 6 = 4, 5 \text{ and } \tilde{n}_{sc}^{RA}(i-1) < 6 \\ \tilde{n}_{sc}^{RA}(i-1) - 6 & i \bmod 6 = 4, 5 \text{ and } \tilde{n}_{sc}^{RA}(i-1) \geq 6 \end{cases}$$

-continued $$f(t) = \left(f(t-1) + \left(\sum_{n=10t+1}^{10t+9} c(n)2^{n-(10t+1)}\right) \bmod\left(N_{sc}^{RA} - 1\right) + 1\right) \bmod N_{sc}^{RA}$$

$$f(-1) = 0$$

The frequency location of the NPRACH transmission is limited to $N_{sc}^{RA}=12$ subcarriers. The frequency hopping is used in 12 subcarriers.

Here, the frequency location of the ith symbol group may be given as $n_{sc}^{RA}(i)=n_{start}+\tilde{n}_{SC}^{RA}(i)$ and defined as $n_{start}=N_{scoffset}^{NPRACH}+\lfloor n_{init}/N_{sc}^{RA} \rfloor \cdot N_{sc}^{RA}$.

In addition, $\tilde{n}_{SC}^{RA}(0)=n_{init}$ mod $N_{sc}^{RA}$ having $n_{init}$ is the first subcarrier selected by the MAC layer from {0, 1, . . . , $N_{sc}^{NPRACH}-1$} and $\tilde{n}_{SC}^{RA}(2)=n'_{init}$ mod $N_{sc}^{RA}$ having $n'_{init}$ is a second subcarrier selected by the MAC layer from {0, 1, . . . , $N_{sc}^{NPRACH}-1$}, and the pseudo random sequence c(i) is defined as shown in Equation 8 above.

In addition, the pseudo random sequence generator will be initialized to $c_{init}=N_{ID}^{Ncell}$.

Additionally, when two independent values are selected in the MAC layer, it may be configured that the RAPID is determined according to a combination of two independent tone indexes.

That is, in the related art, one value is selected in the MAC layer, and a system in which the value is RAPID is provided, but in the method proposed by this specification, it may be configured that the RAPID is generated through a specific equation using two independent values.

For example, when a first selected value is N in the MAC layer and a second selected value is M, the RAPID value may be configured as $(N*N_{sc}^{NPRACH})+(M \text{ mod } N_{sc}^{RA})$.

In this case, characteristically, $N_{sc}^{RA}$ may become 12. In this case, $N_{sc}^{NPRACH}$ may represent the total number of subcarriers allocated to the corresponding NPRACH resource, and N and M may be configured to be selected as one of {0, 1, . . . , $N_{sc}^{NPRACH}-1$, $N_{sc}^{NPRACH}$}.

When the same result is expressed, but the result is slightly differently expressed, the RAPID value may be configured as $(N*N_{sc}^{NPRACH})+M$.

Here, it may be configured that as N, one among {0, 1, . . . , $N_{sc}^{NPRACH}-1$, $N_{sc}^{NPRACH}$} is selected and as M, one among {0, 1, . . . , $N_{sc}^{RA}-1$, $N_{sc}^{RA}$} is selected.

In this case, characteristically, $N_{sc}^{RA}$ may become 12.

For convenience of appreciation, when a specific value (or number) is substituted, if $N_{sc}^{NPRACH}$ is 12, the total RAPID value may become 12*12=144 and if $N_{sc}^{NPRACH}$ is 24, the total RAPID value may become 24*12=288.

In a case where $N_{sc}^{NPRACH}$ is 36 and in a case where $N_{sc}^{NPRACH}$ is 48, the total RAPID values may be 36*12=432, and 48*12=576, respectively.

In the case of the above configuration, the total RAPID value becomes larger than the existing 64 RAPIDs (i.e., since a largest value is 576, a total of 10 bits are required), and as a result, it may be configured that the RAPID value is expressed by a combination of a field (i.e., 6 bits) indicating the existing RAPID value in the RAR and a new field (e.g., 4 bits) using reserved bits.

When this method is used, it is advantageous that the maximum RAPID value may be larger than 48 which is the maximum RAPID value of the existing FDD NPRACH and it is advantageous that the UE may have a higher degree of freedom in performing the RACH procedure.

Figure 35:
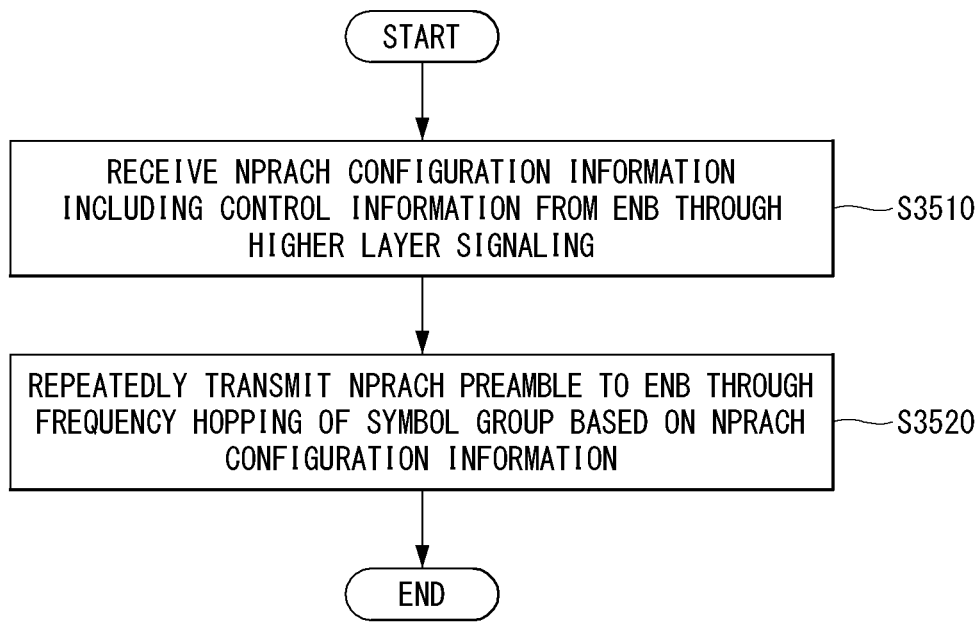
FIG. 35 is a flowchart illustrating an example of an operating method of a UE for transmitting a PRACH preamble proposed by this specification.

FIG. 35 is a diagram illustrating an example of an operating method of a UE for transmitting an NPRACH preamble proposed by this specification.

Specifically, FIG. 35 illustrates an operating method of a UE for transmitting a narrowband physical random access channel (NPRACH) preamble in a wireless communication system that supports time division duplexing (TDD).

First, the UE receives NPRACH configuration information including control information for the number of repeated NPRACH preambles including symbol groups from the eNB through upper layer signaling (S3510).

The upper layer signaling may be RRC signaling.

Then, the UE repeatedly transmits to the eNB the NPRACH preamble through the frequency hopping of the symbol group on the basis of the NPRACH configuration information (S3520).

The NPRACH preamble may include two consecutive symbol groups and four consecutive symbol groups.

A preamble format of the NPRACH preamble may be 0, 1 or 2.

The frequency location of the symbol group may be determined based on a first parameter associated with a starting subcarrier and a second parameter associated with the frequency hopping.

Specifically, the frequency location $N_{SC}^{RA}(i)$ of the symbol group may be expressed as $n_{sc}^{RA}(i)=n_{start}+\tilde{n}_{SC}^{RA}(i)$.

The first parameter represents $n_{start}$ and the second parameter represents $\tilde{n}_{SC}^{RA}(i)$.

If the NPRACH preamble is repeated N times, the NPRACH preamble may be expressed as a first NPRACH preamble, a second NPRACH preamble, a third NPRACH preamble, . . . , and an Nth NPRACH preamble in sequence.

The second parameter for the first symbol group of the first NPRACH preamble may be determined by an MAC layer.

In addition, the second parameter for the symbol group of the second NPRACH preamble may be defined by the second parameter for the symbol group of the first NPRACH preamble, and a third parameter generated based on a pseudo random sequence and a symbol group index of the second NPRACH preamble.

The second parameter may represent a subcarrier index corresponding to any one of 0 to 11, subcarriers 0 to 11.

A method of positioning a frequency to which the frequency hopping for the first symbol group of the second NPRACH preamble is applied will be described in more detail.

Here, the first symbol group of the second NPRACH preamble refers to a first symbol group to a fifth symbol group and may refer to a symbol group in which a symbol group index i is 4.

The second parameter for the first symbol group of the second NPRACH preamble is determined based on a first value and a second value.

The first value may be a value of the second parameter for the first symbol group of the first NPRACH preamble and the second value may be a value generated based on a pseudo random sequence and an index of the first symbol group of the second NPRACH preamble.

A rule of determining the second parameter for the first symbol group of the second NPRACH preamble will be described in more detail.

First, when the first value is an even number, the value of the second parameter for the first symbol group of the second NPRACH preamble may be defined as an odd number based on the first value and the second value.

For example, when the first value is 0, 2, 4, 6, 8 or 10 and the second value is 0, 2, 4, 6, 8 or 10, the second parameter for the first symbol group of the second NPRACH preamble may be a value obtained by adding 1 to the second value.

In addition, when the first value is 0, 2, 4, 6, 8 or 10 and the second value is 1, 3, 5, 7, 9 or 11, the second parameter for the first symbol group of the second NPRACH preamble may be the second value.

Alternatively, when the first value is an odd number, the value of the second parameter for the first symbol group of the second NPRACH preamble may be defined as an even number based on the first value and the second value.

In addition, when the first value is 1, 3, 5, 7, 9 or 11 and the second value is 0, 2, 4, 6, 8 or 10, the second parameter for the first symbol group of the second NPRACH preamble may be the second value.

In addition, when the first value is 1, 3, 5, 7, 9 or 11 and the second value is 1, 3, 5, 7, 9 or 11, the second parameter for the first symbol group of the second NPRACH preamble may be a value obtained by subtracting 1 from the second value.

The equation for the above description is represented by Equation 9 described above.

Next, a rule of determining a second parameter for the third symbol group of the second NPRACH preamble will be described in more detail.

The second parameter for the third symbol group of the second NPRACH preamble is determined based on a third value and a fourth value.

The third value may be a value of the second parameter for the third symbol group of the first NPRACH preamble and the fourth value may be a value generated based on a pseudo random sequence and an index of the third symbol group of the second NPRACH preamble.

For example, when the third value is 0, 1, 2, 3, 4 or 5 and the fourth value is 0, 1, 2, 3, 4 or 5, the second parameter for the third symbol group of the second NPRACH preamble may be a value obtained by adding 6 to the fourth value.

In addition, when the third value is 0, 1, 2, 3, 4 or 5 and the fourth value is 6, 7, 8, 9, 10 or 11, the second parameter for the third symbol group of the second NPRACH preamble may be the fourth value.

When the third value is 6, 7, 8, 9, 10 or 11 and the fourth value is 0, 1, 2, 3, 4 or 5, the second parameter for the third symbol group of the second NPRACH preamble may be the fourth value.

In addition, when the third value is 6, 7, 8, 9, 10 or 11 and the fourth value is 6, 7, 8, 9, 10 or 11, the second parameter for the third symbol group of the second NPRACH preamble may be a value obtained by subtracting 6 from the fourth value.

The third parameter may be defined by $(\tilde{n}_{SC}^{RA}(0)+f(i/2))$ mod $N_{sc}^{RA}$ and the $\tilde{n}_{SC}^{RA}(0)$ may be the second parameter for the first symbol group of the first NPRACH preamble.

As described above, the second parameter for each of the symbol groups included in the first NPRACH preamble and the second NPRACH preamble may be defined by Equation 9 described above.

Additionally, the UE may receive configuration information related to an uplink-downlink configuration from the eNB.

In addition, in the case where there is no valid uplink subframe to transmit the consecutive symbol groups on the basis of the configuration information, the method may further include dropping the consecutive symbol groups by the UE.

The parameters described above may be parameters determined by the UE or also parameters predefined or implemented in a chip of the UE (or a processor of the UE).

The parameters predefined or implemented in the chip of the UE may be interpreted to mean that the UE does not perform an operation for calculating or determining the corresponding parameter to perform a specific value or a specific procedure.

The contents in which the method for repeatedly transmitting the NPRACH preamble is implemented by the UE will be described in more detail with reference to FIGS. 35, 37, and 38.

In a wireless communication system supporting the time division duplexing (TDD), the UE for transmitting the narrowband physical random access channel (NPRACH) preamble may include a transmitter for transmitting a radio signal, a receiver for receiving the radio signal, and a processor functionally connected with the transmitter and the receiver.

The processor of the UE controls the receiver to receive NPRACH configuration information including control information for the number of repeated NPRACH preambles including symbol groups from the eNB through upper layer signaling. The upper layer signaling may be RRC signaling.

Then, the processor of the UE controls the transmitter to repeatedly transmit to the eNB the NPRACH preamble through the frequency hopping of the symbol group on the basis of the NPRACH configuration information.

The NPRACH preamble may include two consecutive symbol groups and four consecutive symbol groups.

A preamble format of the NPRACH preamble may be 0, 1 or 2.

The frequency location of the symbol group may be determined based on a first parameter associated with a starting subcarrier and a second parameter associated with the frequency hopping.

Specifically, the frequency location $N_{SC}^{RA}(i)$ of the symbol group may be expressed as $n_{sc}^{RA}(i)=n_{start}+\tilde{n}_{SC}^{RA}(i)$.

The first parameter represents $n_{start}$ and the second parameter represents $\tilde{n}_{SC}^{RA}(i)$.

If the NPRACH preamble is repeated N times, the NPRACH preamble may be expressed as a first NPRACH preamble, a second NPRACH preamble, a third NPRACH preamble, . . . , and an Nth NPRACH preamble in sequence.

The second parameter for the first symbol group of the first NPRACH preamble may be determined by an MAC layer.

In addition, the second parameter for the symbol group of the second NPRACH preamble may be defined by the second parameter for the symbol group of the first NPRACH preamble, and a third parameter generated based on a pseudo random sequence and a symbol group index of the second NPRACH preamble.

Here, the third parameter may be a parameter determined by the UE or also a parameter predefined or implemented in a chip of the UE (or a processor of the UE).

The parameter predefined or implemented in the chip of the UE may be interpreted to mean that the UE does not perform an operation for calculating or determining the corresponding parameter to perform a specific value or a specific procedure.

The second parameter may represent a subcarrier index corresponding to any one of 0 to 11, subcarriers 0 to 11.

A method of positioning a frequency to which the frequency hopping for the first symbol group of the second NPRACH preamble is applied will be described in more detail.

Here, the first symbol group of the second NPRACH preamble refers to a first symbol group to a fifth symbol group and may refer to a symbol group in which a symbol group index i is 4.

The second parameter for the first symbol group of the second NPRACH preamble is determined based on a first value and a second value.

The first value may be a value of the second parameter for the first symbol group of the first NPRACH preamble and the second value may be a value generated based on a pseudo random sequence and an index of the first symbol group of the second NPRACH preamble.

A rule of determining the second parameter for the first symbol group of the second NPRACH preamble will be described in more detail.

First, when the first value is an even number, the value of the second parameter for the first symbol group of the second NPRACH preamble may be defined as an odd number based on the first value and the second value.

For example, when the first value is 0, 2, 4, 6, 8 or 10 and the second value is 0, 2, 4, 6, 8 or 10, the second parameter for the first symbol group of the second NPRACH preamble may be a value obtained by adding 1 to the second value.

In addition, when the first value is 0, 2, 4, 6, 8 or 10 and the second value is 1, 3, 5, 7, 9 or 11, the second parameter for the first symbol group of the second NPRACH preamble may be the second value.

Alternatively, when the first value is an odd number, the value of the second parameter for the first symbol group of the second NPRACH preamble may be defined as an even number based on the first value and the second value.

In addition, when the first value is 1, 3, 5, 7, 9 or 11 and the second value is 0, 2, 4, 6, 8 or 10, the second parameter for the first symbol group of the second NPRACH preamble may be the second value.

In addition, when the first value is 1, 3, 5, 7, 9 or 11 and the second value is 1, 3, 5, 7, 9 or 11, the second parameter for the first symbol group of the second NPRACH preamble may be a value obtained by subtracting 1 from the second value.

The equation for the above description is represented by Equation 9 described above.

Next, a rule of determining a second parameter for the third symbol group of the second NPRACH preamble will be described in more detail.

The second parameter for the third symbol group of the second NPRACH preamble is determined based on a third value and a fourth value.

The third value may be a value of the second parameter for the third symbol group of the first NPRACH preamble and the fourth value may be a value generated based on a pseudo random sequence and an index of the third symbol group of the second NPRACH preamble.

For example, when the third value is 0, 1, 2, 3, 4 or 5 and the fourth value is 0, 1, 2, 3, 4 or 5, the second parameter for the third symbol group of the second NPRACH preamble may be a value obtained by adding 6 to the fourth value.

In addition, when the third value is 0, 1, 2, 3, 4 or 5 and the fourth value is 6, 7, 8, 9, 10 or 11, the second parameter for the third symbol group of the second NPRACH preamble may be the fourth value.

When the third value is 6, 7, 8, 9, 10 or 11 and the fourth value is 0, 1, 2, 3, 4 or 5, the second parameter for the third symbol group of the second NPRACH preamble may be the fourth value.

In addition, when the third value is 6, 7, 8, 9, 10 or 11 and the fourth value is 6, 7, 8, 9, 10 or 11, the second parameter for the third symbol group of the second NPRACH preamble may be a value obtained by subtracting 6 from the fourth value.

The third parameter may be defined by $(\tilde{n}_{SC}^{RA}(0)+f(i/2))$ mod $N_{sc}^{RA}$ and the $\tilde{n}_{SC}^{RA}(0)$ may be the second parameter for the first symbol group of the first NPRACH preamble.

As described above, the second parameter for each of the symbol groups included in the first NPRACH preamble and the second NPRACH preamble may be defined by Equation 9 described above.

Additionally, the processor of the UE may control the receiver to receive configuration information related to an uplink-downlink configuration from the eNB and control to drop the consecutive symbol groups when there is no valid uplink subframe to transmit the consecutive symbol groups based on the configuration information.

A method for transmitting the NPRACH preamble when G=3 and P=6 will be described with reference to FIG. 35.

First, the UE receives NPRACH configuration information including first control information for the number of repeated NPRACH preambles including symbol groups from the eNB through upper layer signaling.

Then, the UE repeatedly transmits to the eNB the NPRACH preamble through the frequency hopping between the symbol groups on the basis of the NPRACH configuration information.

Here, the frequency location of the symbol group is determined based on a first parameter associated with a starting subcarrier and a second parameter associated with the frequency hopping, and more detailed contents thereof will be described with reference to FIG. 35.

The NPRACH preamble may include first three consecutive symbol groups and second three consecutive symbol groups.

A first symbol group of the first three consecutive symbol groups and a first symbol group of the second three consecutive symbol groups may be defined by an MAC layer, and a parameter generated based on a pseudo random sequence and a symbol group index, respectively.

The second parameter for each symbol group included in the NPRACH preamble may be defined by Equation 13 described above.

Additionally, the UE may receive configuration information related to an uplink-downlink configuration from the eNB.

In addition, when there is no valid uplink subframe to transmit the consecutive symbol groups on the basis of the configuration information, the method may further include dropping the consecutive symbol groups by the UE.

Figure 36:
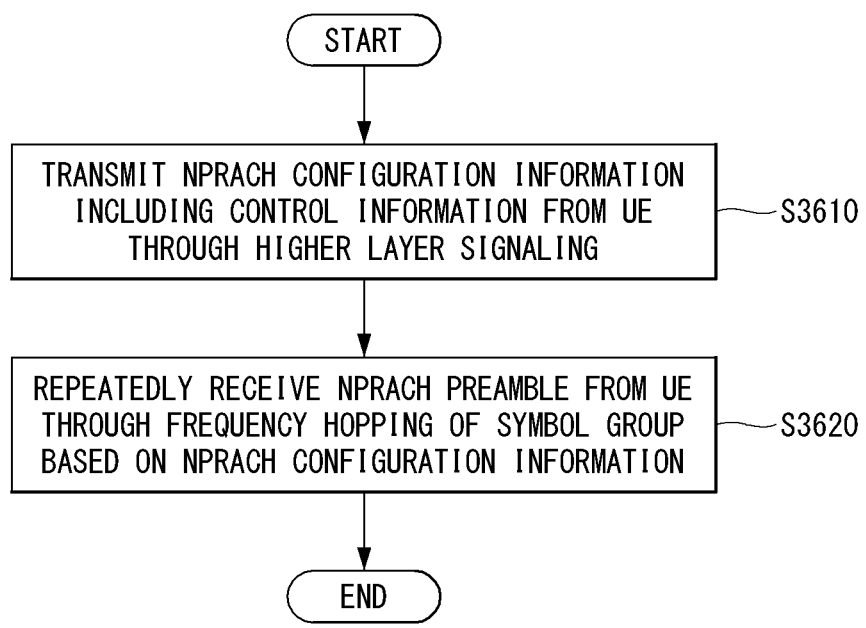
FIG. 36 is a flowchart illustrating an example of an operation method of an eNB for repeatedly receiving an NPRACH preamble proposed by this specification.

FIG. 36 is a flowchart illustrating an example of an operating method of an eNB for repeatedly receiving an NPRACH preamble proposed by this specification.

Specifically, FIG. 36 illustrates an operating method of an eNB for receiving a narrowband physical random access channel (NPRACH) preamble in a wireless communication system that supports time division duplexing (TDD).

First, the eNB transmits NPRACH configuration information including control information for the number of repeated NPRACH preambles including symbol groups to the UE through upper layer signaling (S3610). The upper layer signaling may be RRC signaling.

In addition, the eNB repeatedly receives the NPRACH preamble from the UE through the frequency hopping of the symbol group (S3620).

The NPRACH preamble may include two consecutive symbol groups and four consecutive symbol groups.

A preamble format of the NPRACH preamble may be 0, 1 or 2.

The frequency location of the symbol group may be determined based on a first parameter associated with a starting subcarrier and a second parameter associated with the frequency hopping.

Specifically, the frequency location $N_{SC}^{RA}(i)$ of the symbol group may be expressed as $n_{sc}^{RA}(i)=n_{start}+\tilde{n}_{SC}^{RA}(i)$.

The first parameter represents $n_{start}$ and the second parameter represents $n_{SC}^{RA}(i)$.

If the NPRACH preamble is repeated N times, the NPRACH preamble may be expressed as a first NPRACH preamble, a second NPRACH preamble, a third NPRACH preamble, ..., and an Nth NPRACH preamble in sequence.

The second parameter for the first symbol group of the first NPRACH preamble may be determined by an MAC layer.

In addition, the second parameter for the symbol group of the second NPRACH preamble may be defined by the second parameter for the symbol group of the first NPRACH preamble, and a third parameter generated based on a pseudo random sequence and a symbol group index of the second NPRACH preamble.

The second parameter may represent a subcarrier index corresponding to any one of 0 to 11, subcarriers 0 to 11.

A method of positioning a frequency to which the frequency hopping for the first symbol group of the second NPRACH preamble is applied will be described in more detail.

Here, the first symbol group of the second NPRACH preamble refers to a first symbol group to a fifth symbol group and may refer to a symbol group in which a symbol group index i is 4.

The second parameter for the first symbol group of the second NPRACH preamble is determined based on a first value and a second value.

The first value may be a value of the second parameter for the first symbol group of the first NPRACH preamble and the second value may be a value generated based on a pseudo random sequence and an index of the first symbol group of the second NPRACH preamble.

A rule of determining the second parameter for the first symbol group of the second NPRACH preamble will be described in more detail.

First, when the first value is an even number, the value of the second parameter for the first symbol group of the second NPRACH preamble may be defined as an odd number based on the first value and the second value.

For example, when the first value is 0, 2, 4, 6, 8 or 10 and the second value is 0, 2, 4, 6, 8 or 10, the second parameter for the first symbol group of the second NPRACH preamble may be a value obtained by adding 1 to the second value.

In addition, when the first value is 0, 2, 4, 6, 8 or 10 and the second value is 1, 3, 5, 7, 9 or 11, the second parameter for the first symbol group of the second NPRACH preamble may be the second value.

Alternatively, when the first value is an odd number, the value of the second parameter for the first symbol group of the second NPRACH preamble may be defined as an even number based on the first value and the second value.

In addition, when the first value is 1, 3, 5, 7, 9 or 11 and the second value is 0, 2, 4, 6, 8 or 10, the second parameter for the first symbol group of the second NPRACH preamble may be the second value.

In addition, when the first value is 1, 3, 5, 7, 9 or 11 and the second value is 1, 3, 5, 7, 9 or 11, the second parameter for the first symbol group of the second NPRACH preamble may be a value obtained by subtracting 1 from the second value.

The equation for the above description is represented by Equation 9 described above.

Next, a rule of determining a second parameter for the third symbol group of the second NPRACH preamble will be described in more detail.

The second parameter for the third symbol group of the second NPRACH preamble is determined based on a third value and a fourth value.

The third value may be a value of the second parameter for the third symbol group of the first NPRACH preamble and the fourth value may be a value generated based on a pseudo random sequence and an index of the third symbol group of the second NPRACH preamble.

For example, when the third value is 0, 1, 2, 3, 4 or 5 and the fourth value is 0, 1, 2, 3, 4 or 5, the second parameter for the third symbol group of the second NPRACH preamble may be a value obtained by adding 6 to the fourth value.

In addition, when the third value is 0, 1, 2, 3, 4 or 5 and the fourth value is 6, 7, 8, 9, 10 or 11, the second parameter for the third symbol group of the second NPRACH preamble may be the fourth value.

When the third value is 6, 7, 8, 9, 10 or 11 and the fourth value is 0, 1, 2, 3, 4 or 5, the second parameter for the third symbol group of the second NPRACH preamble may be the fourth value.

In addition, when the third value is 6, 7, 8, 9, 10 or 11 and the fourth value is 6, 7, 8, 9, 10 or 11, the second parameter for the third symbol group of the second NPRACH preamble may be a value obtained by subtracting 6 from the fourth value.

The third parameter may be defined by $(\tilde{n}_{SC}^{RA}(0)+f(i/2))$ mod $N_{sc}^{RA}$ and the $\tilde{n}_{SC}^{RA}(0)$ may be the second parameter for the first symbol group of the first NPRACH preamble.

As described above, the second parameter for each of the symbol groups included in the first NPRACH preamble and the second NPRACH preamble may be defined by Equation 9 described above.

Additionally, the eNB may transmit configuration information related to an uplink-downlink configuration to the UE.

Here, when there is no valid uplink subframe to transmit the consecutive symbol groups, the consecutive symbol groups may be dropped.

The parameters described above may be parameters determined by the eNB or also parameters predefined or implemented in a chip of the eNB (or a processor of the eNB).

The parameter predefined or implemented in the chip of the eNB may be interpreted to mean that the eNB does not perform an operation for calculating or determining the corresponding parameter to perform a specific value or a specific procedure.

The contents in which the method for repeatedly receiving the NPRACH preamble is implemented by the eNB will be described in more detail with reference to FIGS. 36 to 38.

In a wireless communication system supporting the time division duplexing (TDD), the eNB for receiving the narrowband physical random access channel (NPRACH) preamble may include a transmitter for transmitting a radio signal, a receiver for receiving the radio signal, and a processor functionally connected with the transmitter and the receiver.

The processor of the eNB controls the transmitter to transmit NPRACH configuration information including control information for the number of repeated NPRACH preambles including symbol groups to the UE through upper layer signaling. The upper layer signaling may be RRC signaling.

In addition, the processor of the eNB controls the receiver to repeatedly receive the NPRACH preamble from the UE through the frequency hopping of the symbol group.

The NPRACH preamble may include two consecutive symbol groups and four consecutive symbol groups.

A preamble format of the NPRACH preamble may be 0, 1 or 2.

The frequency location of the symbol group may be determined based on a first parameter associated with a starting subcarrier and a second parameter associated with the frequency hopping.

Specifically, the frequency location $N_{SC}^{RA}(i)$ of the symbol group may be expressed as $n_{sc}^{RA}(i)=n_{start}+\tilde{n}_{SC}^{RA}(i)$.

The first parameter represents $n_{start}$ and the second parameter represents $n_{SC}^{RA}(i)$.

If the NPRACH preamble is repeated N times, the NPRACH preamble may be expressed as a first NPRACH preamble, a second NPRACH preamble, a third NPRACH preamble, . . . , and an Nth NPRACH preamble in sequence.

The second parameter for the first symbol group of the first NPRACH preamble may be determined by an MAC layer.

In addition, the second parameter for the symbol group of the second NPRACH preamble may be defined by the second parameter for the symbol group of the first NPRACH preamble, and a third parameter generated based on a pseudo random sequence and a symbol group index of the second NPRACH preamble.

The second parameter may represent a subcarrier index corresponding to any one of 0 to 11, subcarriers 0 to 11.

A method of positioning a frequency to which the frequency hopping for the first symbol group of the second NPRACH preamble is applied will be described in more detail.

Here, the first symbol group of the second NPRACH preamble refers to a first symbol group to a fifth symbol group and may refer to a symbol group in which a symbol group index i is 4.

The second parameter for the first symbol group of the second NPRACH preamble is determined based on a first value and a second value.

The first value may be a value of the second parameter for the first symbol group of the first NPRACH preamble and the second value may be a value generated based on a pseudo random sequence and an index of the first symbol group of the second NPRACH preamble.

A rule of determining the second parameter for the first symbol group of the second NPRACH preamble will be described in more detail.

First, when the first value is an even number, the value of the second parameter for the first symbol group of the second NPRACH preamble may be defined as an odd number based on the first value and the second value.

For example, when the first value is 0, 2, 4, 6, 8 or 10 and the second value is 0, 2, 4, 6, 8 or 10, the second parameter for the first symbol group of the second NPRACH preamble may be a value obtained by adding 1 to the second value.

In addition, when the first value is 0, 2, 4, 6, 8 or 10 and the second value is 1, 3, 5, 7, 9 or 11, the second parameter for the first symbol group of the second NPRACH preamble may be the second value.

Alternatively, when the first value is an odd number, the value of the second parameter for the first symbol group of the second NPRACH preamble may be defined as an even number based on the first value and the second value.

In addition, when the first value is 1, 3, 5, 7, 9 or 11 and the second value is 0, 2, 4, 6, 8 or 10, the second parameter for the first symbol group of the second NPRACH preamble may be the second value.

In addition, when the first value is 1, 3, 5, 7, 9 or 11 and the second value is 1, 3, 5, 7, 9 or 11, the second parameter for the first symbol group of the second NPRACH preamble may be a value obtained by subtracting 1 from the second value.

The equation for the above description is represented by Equation 9 described above.

Next, a rule of determining a second parameter for the third symbol group of the second NPRACH preamble will be described in more detail.

The second parameter for the third symbol group of the second NPRACH preamble is determined based on a third value and a fourth value.

The third value may be a value of the second parameter for the third symbol group of the first NPRACH preamble and the fourth value may be a value generated based on a pseudo random sequence and an index of the third symbol group of the second NPRACH preamble.

For example, when the third value is 0, 1, 2, 3, 4 or 5 and the fourth value is 0, 1, 2, 3, 4 or 5, the second parameter for the third symbol group of the second NPRACH preamble may be a value obtained by adding 6 to the fourth value.

In addition, when the third value is 0, 1, 2, 3, 4 or 5 and the fourth value is 6, 7, 8, 9, 10 or 11, the second parameter for the third symbol group of the second NPRACH preamble may be the fourth value.

When the third value is 6, 7, 8, 9, 10 or 11 and the fourth value is 0, 1, 2, 3, 4 or 5, the second parameter for the third symbol group of the second NPRACH preamble may be the fourth value.

In addition, when the third value is 6, 7, 8, 9, 10 or 11 and the fourth value is 6, 7, 8, 9, 10 or 11, the second parameter for the third symbol group of the second NPRACH preamble may be a value obtained by subtracting 6 from the fourth value.

The third parameter may be defined by $(\tilde{n}_{SC}^{RA}(0)+f(i/2))$ mod $N_{SC}^{RA}$ and the $\tilde{n}_{SC}^{RA}(0)$ may be the second parameter for the first symbol group of the first NPRACH preamble.

As described above, the second parameter for each of the respective symbol groups included in the first NPRACH preamble and the second NPRACH preamble may be defined by Equation 9 described above.

Additionally, the processor of the eNB controls the transmitter to transmit configuration information related to an uplink-downlink configuration to the UE.

Here, when there is no valid uplink subframe to transmit the consecutive symbol groups, the consecutive symbol groups may be dropped.

The parameters described above may be parameters determined by the eNB or also parameters predefined or implemented in a chip of the eNB (or a processor of the eNB).

The parameter predefined or implemented in the chip of the eNB may be interpreted to mean that the eNB does not perform an operation for calculating or determining the corresponding parameter to perform a specific value or a specific procedure.

A method for receiving the NPRACH preamble when G=3 and P=6 will be described with reference to FIG. 36.

First, the eNB transmits NPRACH configuration information including first control information for the number of repeated NPRACH preambles including symbol groups to the UE through upper layer signaling.

In addition, the eNB repeatedly receives the NPRACH preamble from the UE through the frequency hopping between the symbol groups.

Here, the frequency location of the symbol group is determined based on a first parameter associated with a starting subcarrier and a second parameter associated with the frequency hopping, and more detailed contents thereof will be described with reference to FIG. 36.

The NPRACH preamble may include first three consecutive symbol groups and second three consecutive symbol groups.

A first symbol group of the first three consecutive symbol groups and a first symbol group of the second three consecutive symbol groups may be defined by an MAC layer, and a parameter generated based on a pseudo random sequence and a symbol group index, respectively.

The second parameter for each symbol group included in the NPRACH preamble may be defined by Equation 13 described above.

Additionally, the eNB may transmit configuration information related to an uplink-downlink configuration to the UE.

Then, when there is no valid uplink subframe to transmit the consecutive symbol groups, the eNB may drop the consecutive symbol groups.

Overview of Devices to which Present Invention is Applicable

Figure 37:
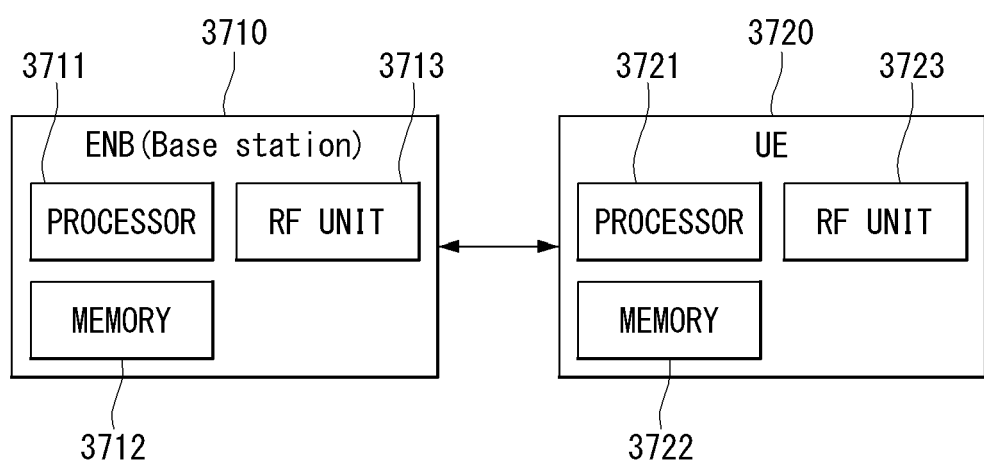
FIG. 37 illustrates a block diagram of a wireless communication device to which methods proposed by this specification may be applied.

FIG. 37 illustrates a block diagram of a wireless communication device to which methods proposed by this specification may be applied.

Referring to FIG. 37, a wireless communication system includes an eNB 3710 and multiple user equipments 3720 positioned within an area of the base station.

Each of the eNB and the UE may be expressed as a wireless device.

The eNB includes a processor 3711, a memory 3712, and a radio frequency (RF) module 3713. The processor 3711 implements a function, a process, and/or a method which are proposed in FIGS. 1 to 16 above. Layers of a radio interface protocol may be implemented by the processor. The memory is connected with the processor to store various information for driving the processor. The RF module is connected with the processor to transmit and/or receive a radio signal.

The UE includes a processor 3721, a memory 3722, and an RF module 3723.

The processor implements a function, a process, and/or a method which are proposed in FIGS. 1 to 36 above. Layers of a radio interface protocol may be implemented by the processor. The memory is connected with the processor to store various information for driving the processor. The RF module is connected with the processor to transmit and/or receive a radio signal.

The memories 3712 and 3722 may be positioned inside or outside the processors 3711 and 3721 and connected with the processor by various well-known means.

Further, the eNB and/or the UE may have a single antenna or multiple antennas.

The antennas 3714 and 3724 serve to transmit and receive the radio signals.

Figure 38:
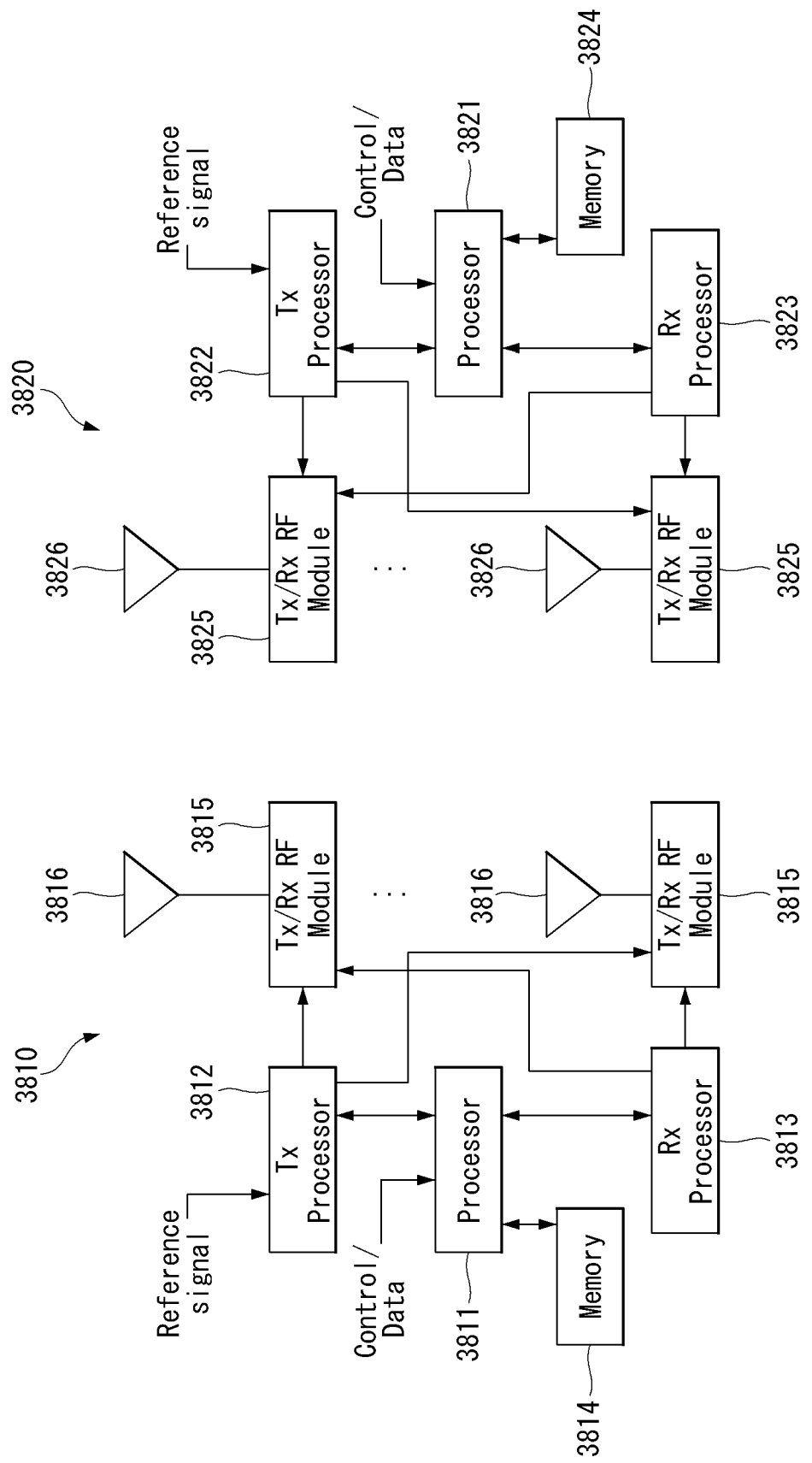
FIG. 38 illustrates another example of the block diagram of the wireless communication device to which methods proposed by this specification may be applied.

FIG. 38 illustrates another example of the block diagram of the wireless communication device to which methods proposed in this specification may be applied.

Referring to FIG. 38, a wireless communication system includes an eNB 3810 and multiple user equipments 3820 positioned within an area of the base station. The eNB may be represented by a transmitting apparatus and the UE may be represented by a receiving apparatus, or vice versa. The eNB and the UE include processors 3811.3821 and 3814.3824, memories 3815.3825 and 3812.3822, one or more Tx/Rx radio frequency (RF) modules 3813.3823 and 3816.3826, Tx processors 2112 and 2122, Rx processors 2113 and 2123, and antennas 2116 and 2126. The processor implements a function, a process, and/or a method which are described above. More specifically, a higher layer packet from a core network is provided to the processor 3811 in DL (communication from the eNB to the UE). The processor implements a function of an L2 layer. In the DL, the processor provides multiplexing between a logical channel and a transmission channel and allocation of radio resources to the UE 3820, and takes charge of signaling to the UE. The transmit (TX) processor 3812 implement various signal processing functions for an L1 layer (i.e., physical layer). The signal processing functions facilitate forward error correction (FEC) at the UE and include coding and interleaving. Encoded and modulated symbols are divided into parallel streams, each stream is mapped to an OFDM subcarrier, multiplexed with a reference signal (RS) in a time and/or frequency domain, and combined together by using inverse fast Fourier transform (IFFT) to create a physical channel carrying a time domain OFDMA symbol stream. An OFDM stream is spatially precoded in order to create multiple spatial streams. Respective spatial streams may be provided to different antennas 3816 via individual Tx/Rx modules (or transceivers, 3815). Each Tx/Rx module may modulate an RF carrier into each spatial stream for transmission. In the UE, each Tx/Rx module (or transceiver, 3825) receives a signal through each antenna 3826 of each Tx/Rx module. Each Tx/Rx module reconstructs information modulated with the RF carrier and provides the reconstructed information to the receive (RX) processor 3823. The RX processor implement various signal processing functions of layer 1. The RX processor may perform spatial processing on information in order to reconstruct an arbitrary spatial stream which is directed for the UE. When multiple spatial streams are directed to the UE, the multiple spatial streams may be combined into a single OFDMA symbol stream by multiple RX processors. The RX processor transforms the OFDMA symbol stream from the time domain to the frequency domain by using fast Fourier transform (FFT). A frequency domain signal includes individual OFDMA symbol streams for respective subcarriers of the OFDM signal. Symbols on the respective subcarriers and the reference signal are reconstructed and demodulated by determining most likely signal arrangement points transmitted by the base station. The soft decisions may be based on channel estimation values. The soft decisions are decoded and deinterleaved to reconstruct data and control signals originally transmitted by the eNB on the physical channel. The corresponding data and control signals are provided to the processor 3821.

UL (communication from the UE to the base station) is processed by the eNB 3810 in a scheme similar to a scheme described in association with a receiver function in the UE 3820. Each Tx/Rx module 3825 receives the signal through each antenna 3826. Each Tx/Rx module provides the RF carrier and information to the RX processor 3823. The processor 3821 may be associated with the memory 3824 storing a program code and data. The memory may be referred to as a computer readable medium.

In the embodiments described above, the components and the features of the present invention are combined in a predetermined form. Each component or feature should be considered as an option unless otherwise expressly stated. Each component or feature may be implemented not to be associated with other components or features. Further, the embodiment of the present invention may be configured by associating some components and/or features. The order of the operations described in the embodiments of the present invention may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present invention may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present invention may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present invention may be embodied in other specific forms without departing from essential characteristics of the present invention. Accordingly, the aforementioned detailed description should not be construed as restrictive in all terms and should be exemplarily considered. The scope of the present invention should be determined by rational construing of the appended claims and all modifications within an equivalent scope of the present invention are included in the scope of the present invention.

INDUSTRIAL APPLICABILITY

An example in which the present invention is applied to the 3GPP LTE/LTE-A system is described primarily, but the present invention can be applied to various wireless communication systems including NR, etc., in addition to the 3GPP LTE/LTE-A system.

The invention claimed is:

1. A method of transmitting, by a user equipment (UE), a narrowband physical random access channel (NPRACH) preamble in a wireless communication system supporting time division duplexing (TDD), the method comprising:
receiving, from a base station (BS), NPRACH configuration information via a higher layer signaling; and
transmitting, to the BS, the NPRACH preamble based on the NPRACH configuration information,
wherein, based on a preamble format 1-a, the NPRACH preamble consisting of a preamble repetition unit is repeatedly transmitted, wherein the preamble repetition unit consists of 6 symbol groups,
wherein the 6 symbol groups consist of 3 time-contiguous symbol groups,
wherein the NPRACH preamble is transmitted based on two consecutive uplink subframes related to uplink/downlink configuration 1 or uplink/downlink configuration 4, and
wherein, based on the 3 time-contiguous symbol groups overlapping with an invalid uplink subframe among the two consecutive uplink subframes:
the 3 time-contiguous symbol groups are dropped, and
based on a remaining uplink subframe among the two consecutive uplink subframes being a valid uplink subframe:
the valid uplink subframe is not used for the transmission of the NPRACH preamble, and
the valid uplink subframe is related to a resource to which a narrowband physical uplink shared channel (NPUSCH) is mapped.

2. The method of claim 1, wherein information for whether each uplink subframe is valid or invalid is received via the higher layer signaling.

3. The method of claim 1, wherein each symbol group consists a cyclic prefix (CP) and at least one symbol.

4. A user equipment (UE) configured to transmit a narrowband physical random access channel (NPRACH) preamble in a wireless communication system supporting time division duplexing (TDD), the UE comprising:
at least one transceiver;
at least one processor; and
at least one computer memory connected to the at least one processor and storing instructions that, based on being executed by the at least one processor, perform operations comprising:
receiving, from a base station (BS), NPRACH configuration information via a higher layer signaling; and
transmitting, to the BS, the NPRACH preamble based on the NPRACH configuration information,
wherein, based on a preamble format 1-a, the NPRACH preamble consisting of a preamble repetition unit is repeatedly transmitted, wherein the preamble repetition unit consists of 6 symbol groups,
wherein the 6 symbol groups consist of 3 time-contiguous symbol groups,
wherein the NPRACH preamble is transmitted based on two consecutive uplink subframes related to uplink/downlink configuration 1 or uplink/downlink configuration 4,
wherein, based on the 3 time-contiguous symbol groups overlapping with an invalid uplink subframe among the two consecutive uplink subframes:
the 3 time-contiguous symbol groups are dropped, and
based on a remaining uplink subframe among the two consecutive uplink subframes being a valid uplink subframe:
the valid uplink subframe is not used for the transmission of the NPRACH preamble, and
the valid uplink subframe is related to a resource to which a narrowband physical uplink shared channel (NPUSCH) is mapped.

5. The UE of claim 4, wherein information for whether each uplink subframe is valid or invalid is received via the higher layer signaling.

6. The UE of claim 4, wherein each symbol group consists a cyclic prefix (CP) and at least one symbol.

7. A base station (BS) configured to receive a narrowband physical random access channel (NPRACH) preamble in a wireless communication system supporting time division duplexing (TDD), the BS comprising:
- at least one transceiver;
- at least one processor; and
- at least one computer memory connected to the at least one processor and storing instructions that, based on being executed by the at least one processor, perform operations comprising:
- transmitting, to a user equipment (UE), NPRACH configuration information via a higher layer signaling; and
- receiving, from the UE, the NPRACH preamble based on the NPRACH configuration information,
- wherein, based on a preamble format 1-a, the NPRACH preamble consisting of a preamble repetition unit is repeatedly received, wherein the preamble repetition unit consists of 6 symbol groups, consisting of symbol groups, and
- wherein the 6 symbol groups consist of 3 time-contiguous symbol groups,
- wherein the NPRACH preamble is received based on two consecutive uplink subframes related to uplink/downlink configuration 1 or uplink/downlink configuration 4,
- wherein, based on the 3 time-contiguous symbol groups overlapping with an invalid uplink subframe among the two consecutive uplink subframes:
  - the 3 time-contiguous symbol groups are dropped, and
  - based on a remaining uplink subframe among the two consecutive uplink subframes being a valid uplink subframe:
    - the valid uplink subframe is not used for the reception of the NPRACH preamble, and
    - the valid uplink subframe is related to a resource to which a narrowband physical uplink shared channel (NPUSCH) is mapped.

8. The BS of claim 7, wherein information for whether each uplink subframe is valid or invalid is transmitted via the higher layer signaling.

9. The BS of claim 7, wherein each symbol group consists a cyclic prefix (CP) and at least one symbol.

* * * * *